US010431821B2

(12) United States Patent
Matsui et al.

(10) Patent No.: US 10,431,821 B2
(45) Date of Patent: Oct. 1, 2019

(54) CATHODE ACTIVE MATERIAL, CATHODE, BATTERY, BATTERY PACK, ELECTRONIC APPARATUS, ELECTRIC VEHICLE, ELECTRIC STORAGE APPARATUS, AND ELECTRIC POWER SYSTEM

(71) Applicant: Murata Manufacturing Co., Ltd., Kyoto (JP)

(72) Inventors: Takaaki Matsui, Fukushima (JP); Takehiko Ishii, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 187 days.

(21) Appl. No.: 13/960,997

(22) Filed: Aug. 7, 2013

(65) Prior Publication Data

US 2014/0058598 A1    Feb. 27, 2014

(30) Foreign Application Priority Data

Aug. 22, 2012 (JP) .................. 2012-183217
Jul. 4, 2013 (JP) .................. 2013-140810

(51) Int. Cl.
  *H01M 4/52* (2010.01)
  *B60W 10/06* (2006.01)
  (Continued)

(52) U.S. Cl.
  CPC ............ *H01M 4/523* (2013.01); *B60W 10/06* (2013.01); *B60W 10/08* (2013.01); *B60W 20/00* (2013.01);
  (Continued)

(58) Field of Classification Search
  CPC .. H01M 2220/20; H01M 4/523; H01M 4/131; H01M 10/052; H01M 4/525;
  (Continued)

(56) References Cited

U.S. PATENT DOCUMENTS 5,631,105 A * 5/1997 Hasegawa ............. H01M 4/485
                                            423/594.15
5,792,574 A * 8/1998 Mitate .................. H01M 4/525
                                            429/218.1
(Continued)

FOREIGN PATENT DOCUMENTS

CN    101162777    4/2008
JP    08-213015    8/1996
(Continued)

OTHER PUBLICATIONS

Kim, Yong Jeong, Hyemin Kim, Byoungsoo Kim, Donggi Ahn, Joon-Gon Lee, Tae-Joon Kim, Dongyeon Son, Jaephil Cho, Young-Woon Kim, and Byungwoo Park. "Electrochemical Stability of Thin-Film LiCoO3 Cathodes by Aluminum-Oxide Coating." ChemInform 34.27 (2003): n. pag. Web.*

(Continued)

*Primary Examiner* — Lisa S Park
(74) *Attorney, Agent, or Firm* — K&L Gates LLP

(57) ABSTRACT

A cathode active material includes a first cathode material configured of a layered rocksalt type lithium metal oxide, the layered rocksalt type lithium metal oxide including lithium and a metal other than lithium, the metal configured of nickel (Ni), or nickel (Ni) and the like. A site occupancy of metal ions other than lithium at a 3a site obtained by Rietveld analysis of a powder X-ray diffraction pattern of the first cathode material in a cathode in a discharged state is about 5% or less, and a site occupancy of metal ions other than the metal occupying a part of a 3b site at the 3b site is about 1% or over, and the cathode active material is covered with a coating film, and an exposed amount of the cathode active material exposed from the coating film is within a range from about 0.05% to about 8% both inclusive.

10 Claims, 24 Drawing Sheets

(51) Int. Cl.
  *B60W 10/08*  (2006.01)
  *B60W 20/00*  (2016.01)
  *H01M 4/131*  (2010.01)
  *H01M 4/36*  (2006.01)
  *H01M 4/485*  (2010.01)
  *H01M 4/505*  (2010.01)
  *H01M 4/525*  (2010.01)
  *H01M 10/052*  (2010.01)

(52) U.S. Cl.
  CPC ......... *H01M 4/131* (2013.01); *H01M 4/366* (2013.01); *H01M 4/485* (2013.01); *H01M 4/505* (2013.01); *H01M 4/525* (2013.01); *H01M 10/052* (2013.01); *Y02E 60/122* (2013.01); *Y02T 10/7011* (2013.01); *Y10S 903/93* (2013.01)

(58) Field of Classification Search
  CPC ...... H01M 4/505; H01M 4/485; H01M 4/366; B60W 20/00; B60W 10/08; B60W 10/06; Y02E 60/122; Y02T 10/7011; Y10S 903/93
  See application file for complete search history.

(56) References Cited

U.S. PATENT DOCUMENTS

| | | | |
|---|---|---|---|
| 6,274,272 | B1 | 8/2001 | Peres et al. |
| 2007/0141470 | A1* | 6/2007 | Nakura ................ H01M 4/131 429/231.3 |
| 2008/0226988 | A1* | 9/2008 | Minami .............. H01M 2/1673 429/231.5 |
| 2010/0033135 | A1 | 2/2010 | Nishida et al. |
| 2011/0059351 | A1* | 3/2011 | Kohno ................ H01M 4/366 429/163 |
| 2011/0117463 | A1* | 5/2011 | Lienkamp et al. ........... 429/433 |
| 2011/0183200 | A1* | 7/2011 | Odani et al. .................. 429/200 |
| 2013/0266843 | A1 | 10/2013 | Hara et al. |

FOREIGN PATENT DOCUMENTS

| | | |
|---|---|---|
| JP | 09-298061 | 11/1997 |
| JP | 11-025980 | 1/1999 |
| JP | 2000-082466 | 3/2000 |
| JP | 2000-113890 A | 4/2000 |
| JP | 2011-238416 | 11/2001 |
| JP | 2002-100358 A | 4/2002 |
| JP | 2002-128526 A | 5/2002 |
| JP | 2002-279987 A | 9/2002 |
| JP | 2003-338277 | 11/2003 |
| JP | 2004-119218 | 4/2004 |
| JP | 2004-127675 A | 4/2004 |
| JP | 2005-332713 A | 12/2005 |
| JP | 2006-228733 | 8/2006 |
| JP | 2006-332020 | 12/2006 |
| JP | 2008-117611 A | 5/2008 |
| JP | 2008-228518 A | 9/2008 |
| JP | 2008-282667 | 11/2008 |
| JP | 4216669 B2 | 1/2009 |
| JP | 2010-097947 | 4/2010 |
| JP | 2011-065887 A | 3/2011 |
| JP | 2012-138335 A | 7/2012 |
| WO | 2008/091028 | 7/2008 |
| WO | 2012/081621 A1 | 6/2012 |
| WO | WO2012081621 | 6/2012 |

OTHER PUBLICATIONS

Oh, Yuhong, Donggi Ahn, Seunghoon Nam, and Byungwoo Park. "The Effect of Al2O3-coating Coverage on the Electrochemical Properties in LiCoO2 Thin Films." J Solid State Electrochem Journal of Solid State Electrochemistry 14.7 (2009): 1235-240. Web.*

Read, Jeffrey, Jeff Wolfenstine, Donald Foster, and Wishvender Behl. "Loss of Rate Capability in LiMn2O4 / Carbon Cells." ResearchGate. Army Research Laboratory, 2000. Web. May 4, 2016.*

Office Action issued in Chinese Application 2013103565841 dated Aug. 3, 2015 (23 pages).

Office Action issued in Chinese Application 2013103565841 dated Apr. 14, 2016 (16 pages).

Japanese Office Action (with English translation) dated Nov. 8, 2016 in corresponding Japanese application No. 2013-140810 (8 pages).

* cited by examiner

CATHODE ACTIVE MATERIAL, CATHODE, BATTERY, BATTERY PACK, ELECTRONIC APPARATUS, ELECTRIC VEHICLE, ELECTRIC STORAGE APPARATUS, AND ELECTRIC POWER SYSTEM

CROSS REFERENCES TO RELATED APPLICATIONS

The present application claims priority to Japanese Priority Patent Application JP 2012-183217 filed in the Japan Patent Office on Aug. 22, 2012, JP 2013-140810 filed in the Japan Patent Office on Jul. 4, 2013, the entire content of which is hereby incorporated by reference.

BACKGROUND

The present application relates to a cathode active material, a cathode, a battery, a battery pack, an electronic apparatus, an electric vehicle, an electric storage apparatus, and an electric power system.

In recent years, along with widespread use of portable apparatuses such as video cameras, cellular phones, notebook personal computers, demand for small, lightweight and high-capacity secondary batteries as power supplies for the portable apparatuses are increasing. As a cathode active material for a secondary battery responding to such demand, in addition to lithium cobalt oxide ($LiCoO_2$), lithium metal composite oxides such as lithium nickel oxide ($LiNiO_2$) having the same layered structure with a R-3m space group as lithium cobalt oxide ($LiCoO_2$) and lithium manganese oxide ($LiMn_2O_4$) having a normal spinel structure with a Rd3m space group have been put into practical use.

Whereas lithium cobalt oxide has a discharge capacity of about 150 mAh/g, lithium nickel oxide has a discharge capacity of about 180 mAh/g to about 200 mAh/g. Since nickel (Ni) as a raw material of lithium nickel oxide is lower in cost than cobalt (Co), lithium nickel oxide is superior also in cost to lithium cobalt oxide. Moreover, nickel is higher in raw material supply stability than cobalt. Therefore, lithium nickel oxide is superior also in raw material supply stability to nickel cobalt oxide.

On the other hand, a cathode active material using lithium nickel oxide has advantages of large theoretical capacity and high discharge potential; however, the crystal structure of lithium nickel oxide collapses with repetition of a charge-discharge cycle. As a result, a battery using lithium nickel oxide as a cathode active material has some issues such as a decline in discharge capacity and degradation in thermal stability.

To solve such issues, systems in which $LiMn_2O_2$ is mixed into nickel cobalt lithium manganese oxide or lithium nickel oxide with higher stability than lithium nickel oxide are widely used as cathode active materials. However, even though these systems are used as the cathode active materials, it is still necessary to improve cycle life performance and to suppress an increase in resistance during a cycle.

In Japanese Unexamined Patent Application Publication Nos. H08-213015, 2011-238416, and H09-298061, various proposals for lithium metal composite oxides are provided. For example, in Japanese Unexamined Patent Application Publication No. H08-213015, to improve self-discharge characteristics and cycle characteristics of a lithium secondary battery, there is proposed a lithium metal composite oxide represented by $Li_xNi_aCo_bMCO_2$, where $0.8 \leq x \leq 1.2$, $0.01 \leq a \leq 0.99$, $0.01 \leq b \leq 0.99$, $0.01 \leq c \leq 0.3$, $0.8 \leq a+b+c \leq 1.2$ are satisfied, and M is one or more kinds of elements selected from a group configured of Al, V, Mn, Fe, Cu, and Zn.

In Japanese Unexamined Patent Application Publication No. 2011-238416, there is proposed a lithium nickel composite oxide with a layered rocksalt structure in which each of a lattice constant, an occupancy of lithium at a 3b site, and an occupancy of nickel at a 3a site obtained by a result of Rietveld analysis of a powder X-ray diffraction pattern is within a specific range. The lithium nickel composite oxide is obtained through finding a correlation between the occupancy at a lithium site (the 3a site) and the occupancy at a transition metal site (the 3b site) and the lattice constant obtained by the result of Rietveld analysis of the powder X-ray diffraction pattern, and discharge capacity and charge-discharge cycle characteristics. According to Japanese Unexamined Patent Application Publication No. 2011-238416, in the case where the lithium nickel composite oxide has a layered rock salt structure, and each of the lattice constant, the occupancy of lithium at the 3b site, and the occupancy of nickel at the 3a site obtained by the result of Rietveld analysis of the powder X-ray diffraction pattern is within a specific range, other sites are appropriately occupied by lithium and nickel to stabilize the crystal structure of the lithium nickel composite oxide; therefore, the lithium nickel composite oxide obtains stable and large discharge capacity and superior cycle characteristics as a cathode material.

In Japanese Unexamined Patent Application Publication No. H09-298061 there are proposed a cathode active material for nonaqueous electrolyte secondary battery which is allowed to be stably manufactured in an industrial-scale production process and has high initial discharge capacity and low resistance, and use of a spray dry method as a method of manufacturing the cathode active material. Japanese Unexamined Patent Application Publication No. H09-298061 proposes a cathode active material with high initial capacity in which a site occupancy of metal ions other than lithium at a 3a site and a site occupancy of metal ions other than nickel, cobalt, and manganese at a 3b site obtained by Rietveld analysis of a powder X-ray diffraction pattern are 5% or less and 10% or less, respectively, and an average particle diameter is 2 μm to 6 μm.

SUMMARY

In batteries, longer life and higher power are desired. In particular, in a battery for high-power use, it is desirable to suppress an increase in resistance during a cycle.

It is desirable to provide a cathode active material, a cathode, and a battery which are capable of suppressing an increase in resistance and improving cycle characteristics, a battery pack, an electronic apparatus, an electric vehicle, an electric storage apparatus, and an electric power system each of which uses them.

According to an embodiment of the present application, there is provided a cathode active material including a first cathode material configured of a layered rocksalt type lithium metal oxide, the layered rocksalt type lithium metal oxide including lithium and a metal other than lithium, the metal configured of nickel (Ni), or nickel (Ni) and one or more selected from a group configured of cobalt (Co), iron (Fe), manganese (Mn), copper (Cu), zinc (Zn), aluminum (Al), chromium (Cr), vanadium (V), titanium (Ti), magnesium (Mg), and zirconium (Zr), in which a site occupancy of metal ions other than lithium at a 3a site obtained by Rietveld analysis of a powder X-ray diffraction pattern of the first cathode material in a cathode in a discharged state is about 5% or less, and a site occupancy of metal ions other than the metal occupying a part of a 3b site at the 3b site is about 1% or over, and the cathode active material is covered with a coating film, and an exposed amount of the cathode active material exposed from the coating film is within a range from about 0.05% to about 8% both inclusive.

According to an embodiment of the present application, there is provided a cathode provided with a cathode active material, the cathode active material including a first cathode material configured of a layered rocksalt type lithium metal oxide, the layered rocksalt type lithium metal oxide including lithium and a metal other than lithium, the metal configured of nickel (Ni), or nickel (Ni) and one or more selected from a group configured of cobalt (Co), iron (Fe), manganese (Mn), copper (Cu), zinc (Zn), aluminum (Al), chromium (Cr), vanadium (V), titanium (Ti), magnesium (Mg), and zirconium (Zr), in which a site occupancy of metal ions other than lithium at a 3a site obtained by Rietveld analysis of a powder X-ray diffraction pattern of the first cathode material in a cathode in a discharged state is about 5% or less, and a site occupancy of metal ions other than the metal occupying a part of a 3b site at the 3b site is about 1% or over, and the cathode active material is covered with a coating film, and an exposed amount of the cathode active material exposed from the coating film is within a range from about 0.05% to about 8% both inclusive.

According to an embodiment of the present application, there is provided a battery including: a cathode; an anode; and an electrolyte, in which the cathode includes a cathode active material, the cathode active material includes a first cathode material configured of a layered rocksalt type lithium metal oxide, the layered rocksalt type lithium metal oxide including lithium and a metal other than lithium, the metal configured of nickel (Ni), or nickel (Ni) and one or more selected from a group configured of cobalt (Co), iron (Fe), manganese (Mn), copper (Cu), zinc (Zn), aluminum (Al), chromium (Cr), vanadium (V), titanium (Ti), magnesium (Mg), and zirconium (Zr), a site occupancy of metal ions other than lithium at a 3a site obtained by Rietveld analysis of a powder X-ray diffraction pattern of the first cathode material in a cathode in a discharged state is about 5% or less, and a site occupancy of metal ions other than the metal occupying a part of a 3b site at the 3b site is about 1% or over, and the cathode active material is covered with a coating film, and an exposed amount of the cathode active material exposed from the coating film is within a range from about 0.05% to about 8% both inclusive. Charge at this time is performed under charge conditions according to specifications of the battery, such as a condition that the battery be charged at a charge voltage of 4.1 V to 4.3 V and a charge current of 1 C.

According to an embodiment of the present application, there is provided a battery pack including: a battery including a cathode, an anode, and an electrolyte, the cathode including a cathode active material; a control section controlling the battery; and a package containing the battery, in which the cathode active material includes a first cathode material configured of a layered rocksalt type lithium metal oxide, the layered rocksalt type lithium metal oxide including lithium and a metal other than lithium, the metal configured of nickel (Ni), or nickel (Ni) and one or more selected from a group configured of cobalt (Co), iron (Fe), manganese (Mn), copper (Cu), zinc (Zn), aluminum (Al), chromium (Cr), vanadium (V), titanium (Ti), magnesium (Mg), and zirconium (Zr), a site occupancy of metal ions other than lithium at a 3a site obtained by Rietveld analysis of a powder X-ray diffraction pattern of the first cathode material in the cathode in a discharged state is about 5% or less, and a site occupancy of metal ions other than the metal occupying a part of a 3b site at the 3b site is about 1% or over, and the cathode active material is covered with a coating film, and an exposed amount of the cathode active material exposed from the coating film is within a range from about 0.05% to about 8% both inclusive.

According to an embodiment of the present application, there is provided an electronic apparatus including a battery, the electronic apparatus receiving electric power from the battery, the battery including a cathode, an anode, and an electrolyte, the cathode including a cathode active material, in which the cathode active material includes a first cathode material configured of a layered rocksalt type lithium metal oxide, the layered rocksalt type lithium metal oxide including lithium and a metal other than lithium, the metal configured of nickel (Ni), or nickel (Ni) and one or more selected from a group configured of cobalt (Co), iron (Fe), manganese (Mn), copper (Cu), zinc (Zn), aluminum (Al), chromium (Cr), vanadium (V), titanium (Ti), magnesium (Mg), and zirconium (Zr), a site occupancy of metal ions other than lithium at a 3a site obtained by Rietveld analysis of a powder X-ray diffraction pattern of the first cathode material in the cathode in a discharged state is about 5% or less, and a site occupancy of metal ions other than the metal occupying a part of a 3b site at the 3b site is about 1% or over, and the cathode active material is covered with a coating film, and an exposed amount of the cathode active material exposed from the coating film is within a range from about 0.05% to about 8% both inclusive.

According to an embodiment of the present application, there is provided an electric vehicle including: a battery including a cathode, an anode, and an electrolyte, the cathode including a cathode active material; a converter receiving electric power from the battery and then converting the electric power into driving force for vehicle; and a controller performing information processing relating to vehicle control based on information on the battery, in which the cathode active material includes a first cathode material configured of a layered rocksalt type lithium metal oxide, the layered rocksalt type lithium metal oxide including lithium and a metal other than lithium, the metal configured of nickel (Ni), or nickel (Ni) and one or more selected from a group configured of cobalt (Co), iron (Fe), manganese (Mn), copper (Cu), zinc (Zn), aluminum (Al), chromium (Cr), vanadium (V), titanium (Ti), magnesium (Mg), and zirconium (Zr), a site occupancy of metal ions other than lithium at a 3a site obtained by Rietveld analysis of a powder X-ray diffraction pattern of the first cathode material in the cathode in a discharged state is about 5% or less, and a site occupancy of metal ions other than the metal occupying a part of a 3b site at the 3b site is about 1% or over, and the cathode active material is covered with a coating film, and an exposed amount of the cathode active material exposed from the coating film is within a range from about 0.05% to about 8% both inclusive.

According to an embodiment of the present application, there is provided an electric storage apparatus including a battery, the electric storage apparatus supplying electric power to an electronic apparatus connected to the battery, the battery including a cathode, an anode, and an electrolyte, the cathode including a cathode active material, in which the cathode active material includes a first cathode material configured of a layered rocksalt type lithium metal oxide, the layered rocksalt type lithium metal oxide including lithium and a metal other than lithium, the metal configured of nickel (Ni), or nickel (Ni) and one or more selected from a group configured of cobalt (Co), iron (Fe), manganese (Mn), copper (Cu), zinc (Zn), aluminum (Al), chromium (Cr), vanadium (V), titanium (Ti), magnesium (Mg), and zirconium (Zr), a site occupancy of metal ions other than lithium at a 3a site obtained by Rietveld analysis of a powder X-ray diffraction pattern of the first cathode material in the cathode in a discharged state is about 5% or less, and a site occupancy of metal ions other than the metal occupying a part of a 3b site at the 3b site is about 1% or over, and the cathode active material is covered with a coating film, and an exposed amount of the cathode active material exposed from the coating film is within a range from about 0.05% to about 8% both inclusive.

According to an embodiment of the present application, there is provided an electric power system receiving electric power from a battery or supplying electric power from a generator or an electric power network to the battery, the battery including a cathode, an anode, and an electrolyte, the cathode including a cathode active material, the cathode active material including a first cathode material configured of a layered rocksalt type lithium metal oxide, the layered rocksalt type lithium metal oxide including lithium and a metal other than lithium, the metal configured of nickel (Ni), or nickel (Ni) and one or more selected from a group configured of cobalt (Co), iron (Fe), manganese (Mn), copper (Cu), zinc (Zn), aluminum (Al), chromium (Cr), vanadium (V), titanium (Ti), magnesium (Mg), and zirconium (Zr), in which a site occupancy of metal ions other than lithium at a 3a site obtained by Rietveld analysis of a powder X-ray diffraction pattern of the first cathode material in the cathode in a discharged state is about 5% or less, and a site occupancy of metal ions other than the metal occupying a part of a 3b site at the 3b site is about 1% or over, and the cathode active material is covered with a coating film, and an exposed amount of the cathode active material exposed from the coating film is within a range from about 0.05% to about 8% both inclusive.

According to the embodiments of the present application, an increase in resistance is allowed to be suppressed, and cycle characteristics are improvable.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the technology, and are incorporated in and constitute a part of this specification. The drawings illustrate embodiments and, together with the specification, serve to explain the principles of the technology.

FIG. 7A illustrates an appearance of a nonaqueous electrolyte battery according to an embodiment of the present application, FIG. 7B illustrates a configuration of the nonaqueous electrolyte battery, and FIG. 7C illustrates a bottom surface of the nonaqueous electrolyte battery illustrated in FIG. 7A.

FIGS. 8A and 8B illustrate configuration examples of a cathode, and FIGS. 8C and 8D illustrate configuration examples of an anode.

FIG. 9A illustrates a configuration example of a laminate electrode body according to an embodiment of the present application, FIG. 9B illustrates a configuration example of a battery device according to the embodiment of the present application, and FIG. 9C illustrates a configuration example of the laminate electrode body according to the embodiment of the present application.

DETAILED DESCRIPTION

Some embodiments of the present application will be described in detail below referring to the accompanying drawings. It is to be noted that description will be given in the following order.
1. First Embodiment (First example of battery)
2. Second Embodiment (Second example of battery)
3. Third Embodiment (Third example of battery)
4. Fourth Embodiment (Fourth example of battery)
5. Fifth Embodiment (Examples of battery module and the like)
6. Sixth Embodiment (Example of battery pack using batteries)
7. Seventh Embodiment (Example of electric storage system using batteries)
8. Other Embodiments (Modifications)

1. First Embodiment

Configuration of Battery

Figure 1:
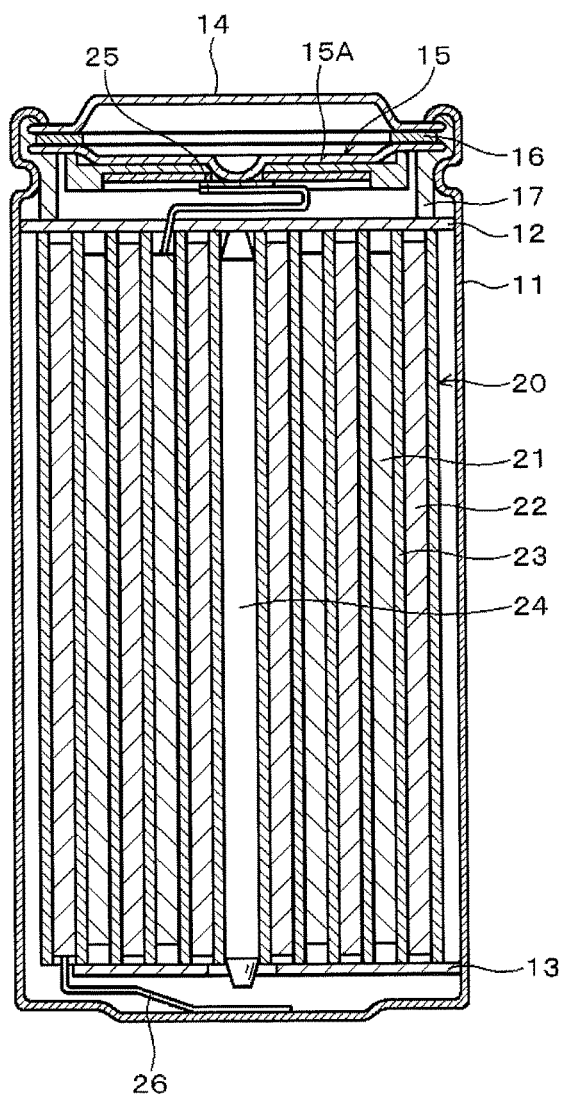
FIG. 1 is a sectional view illustrating a configuration example of a nonaqueous electrolyte battery according to an embodiment of the present application.
Figure 2:
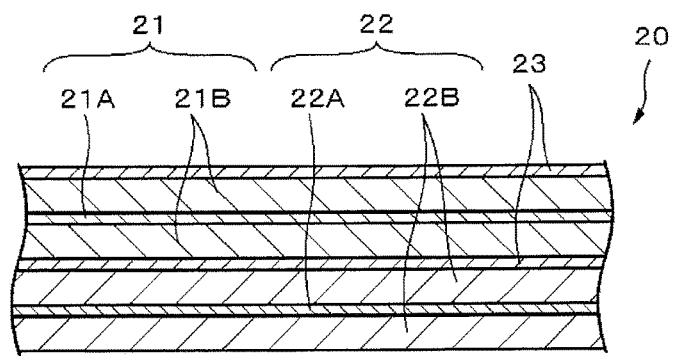
FIG. 2 is an enlarged sectional view illustrating a part of a spirally wound electrode body illustrated in FIG. 1.
Figure 3A:
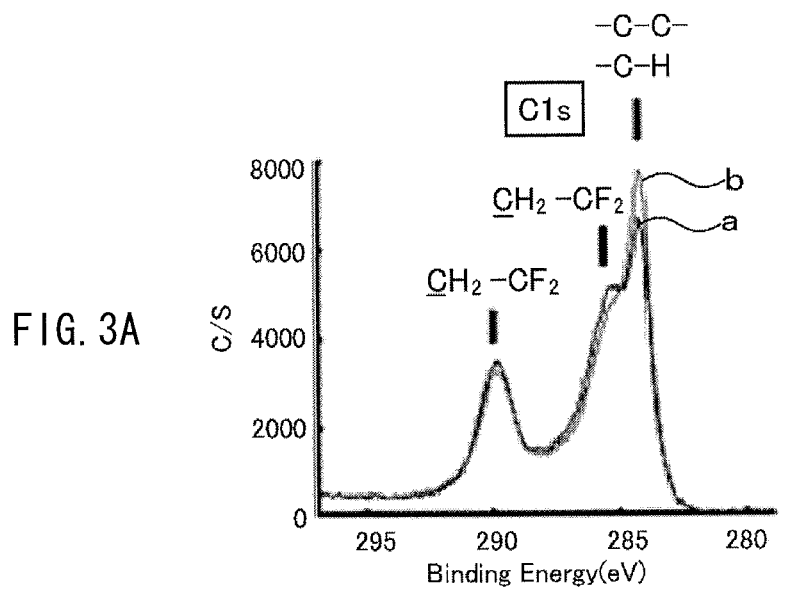
FIGS. 3A, 3B, 3C, and 3D are graphs illustrating examples of XPS measurement results.
Figure 3B:
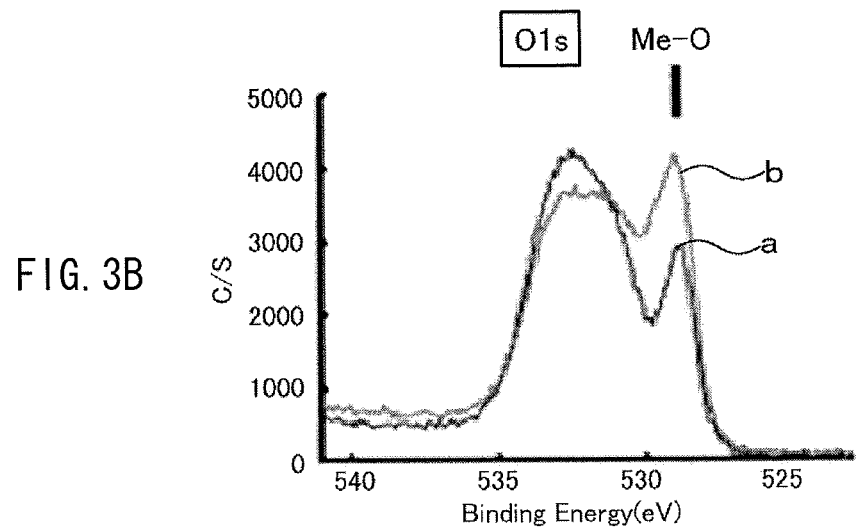
Figure 3C:
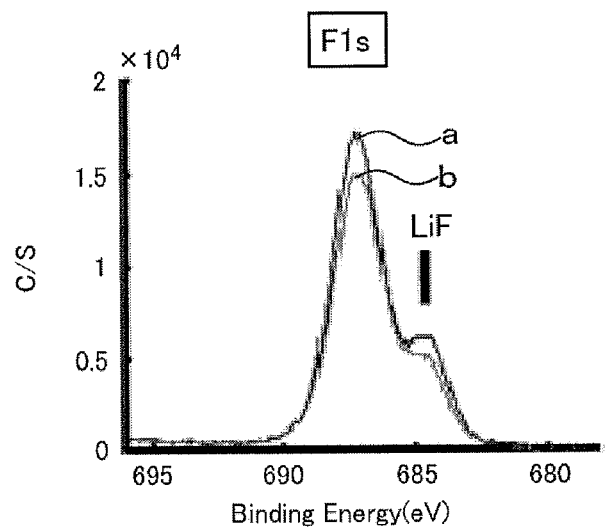
Figure 3D:
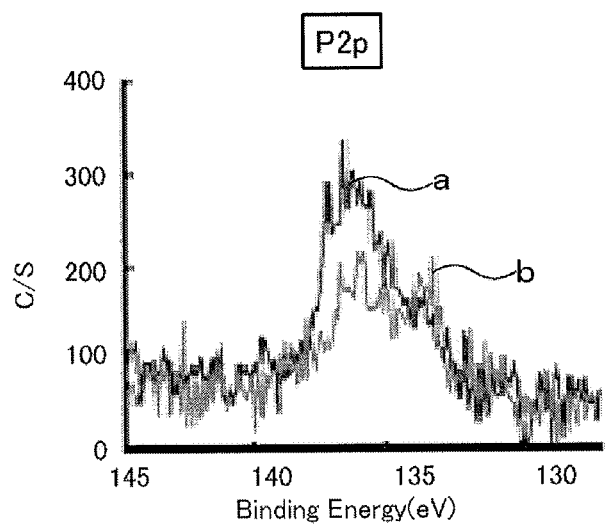
Figure 4A:
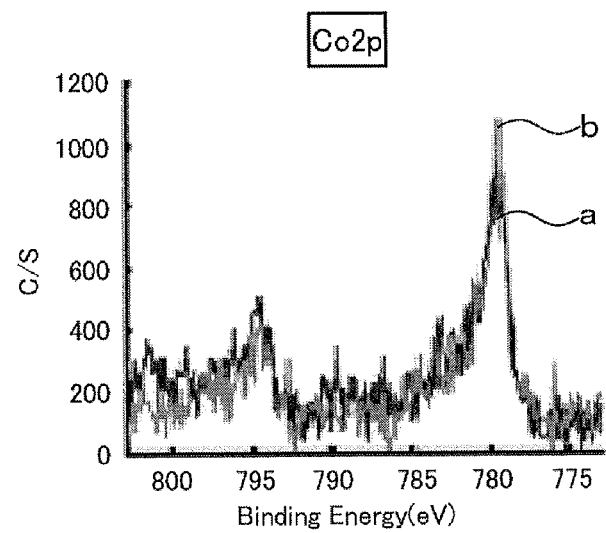
FIGS. 4A, 4B, 4C, and 4D are graphs illustrating examples of XPS measurement results.
Figure 4B:
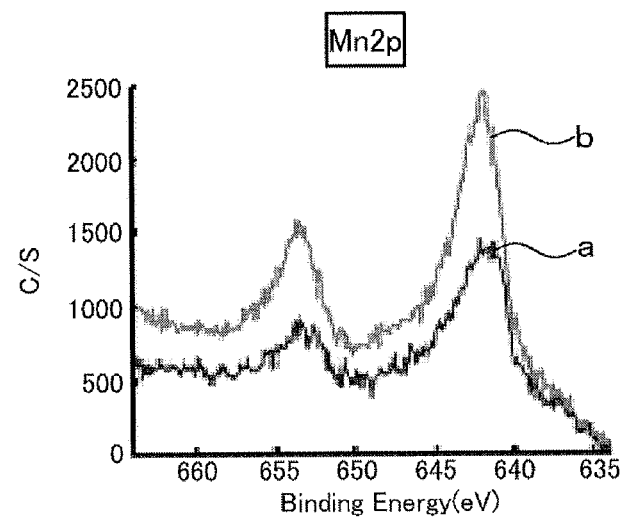
Figure 4C:
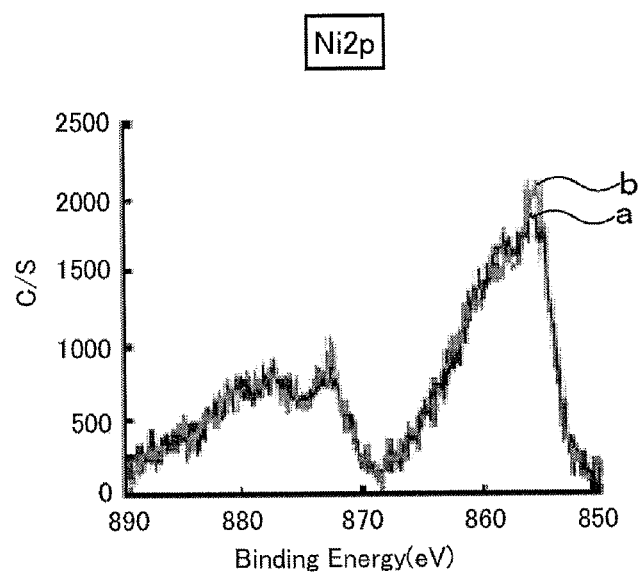
Figure 4D:
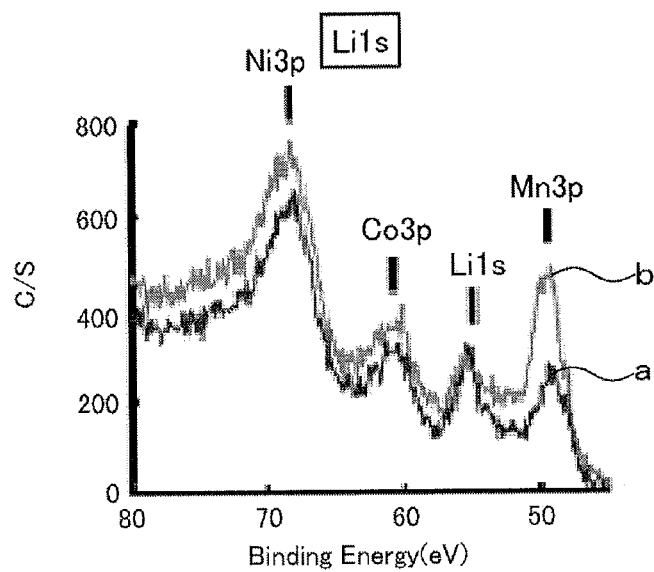

A nonaqueous electrolyte battery according to a first embodiment of the present application will be described below referring to FIGS. 1 and 2. FIG. 1 illustrates a sectional configuration of the nonaqueous electrolyte battery according to the first embodiment of the present application. FIG. 2 illustrates an enlarged view of a part of a spirally wound electrode body 20 illustrated in FIG. 1. The nonaqueous electrolyte battery may be, for example, a chargeable and dischargeable secondary battery. The nonaqueous electrolyte battery may be, for example, a lithium-ion secondary battery in which capacity of an anode 22 is represented based on insertion and extraction of lithium as an electrode reactant.

The nonaqueous electrolyte battery is configured through containing the spirally wound electrode body 20 and a pair of insulating plates 12 and 13 in a substantially hollow cylindrical-shaped battery can 11. The spirally wound electrode body 20 is formed through laminating and spirally winding a cathode 21 and an anode 22 with a separator 23 in between. Such a battery configuration using a cylindrical battery can 11 is referred to as cylindrical type.

The battery can 11 has a hollow configuration in which an end of the battery can 11 is closed and the other end thereof is opened, and the battery can 11 is made of, for example, iron (Fe), aluminum (Al), or an alloy thereof. It is to be noted that a surface of the battery can 11 may be plated with nickel (Ni) or the like. The pair of insulating plates 12 and 13 are so disposed as to sandwich the spirally wound electrode body 20 and as to extend in a direction perpendicular to a peripheral winding surface of the spirally wound electrode body 20.

In the open end of the battery can 11, a battery cover 14, a safety valve mechanism 15, and a positive temperature coefficient (PTC) device 16 are caulked by a gasket 17 to seal the battery can 11. The battery cover 14 is made of, for example, a material similar to that of the battery can 11. The safety valve mechanism 15 and the PTC device 16 are disposed inside the battery cover 14. The safety valve mechanism 15 is electrically connected to the battery cover 14 through the PTC device 16. In the safety valve mechanism 15, when an internal pressure in the battery increases to a certain extent or higher due to an internal short circuit or external application of heat, a disk plate 15A is flipped to disconnect the electrical connection between the battery cover 14 and the spirally wound electrode body 20. The PTC device 16 prevents abnormal heat generation caused by a large current through increasing resistance (limiting a current) with an increase in temperature. The gasket 17 is made of, for example, an insulating material, and its surface may be coated with asphalt.

The spirally wound electrode body 20 is formed through laminating and spirally winding the cathode 21 and the anode 22 with the separator 23 in between. A center pin 24 may be inserted into the center of the spirally wound electrode body 20. In the spirally wound electrode body 20, a cathode lead 25 made of aluminum or the like is connected to the cathode 21, and an anode lead 26 made of nickel or the like is connected to the anode 22. The cathode lead 25 is connected to the safety valve mechanism 15 by welding or the like, and is electrically connected to the battery cover 14, and the anode lead 26 is connected to the battery can 11 by welding or the like, and is electrically connected to the battery can 11.

(Cathode)

The cathode 21 includes a cathode current collector 21A having a pair of facing surfaces and cathode active material layers 21B disposed on both of the surfaces of the cathode current collector 21A. Alternatively, the cathode active material layer 21B may be disposed on only one of the surfaces of the cathode current collector 21A.

The cathode current collector 21A is formed of, for example, a metal material such as aluminum, nickel, or stainless steel.

The cathode active material layer 21B includes, as cathode active materials, one or more kinds of cathode materials capable of inserting and extracting lithium, and may include any other material such as a binder or a conductor, if necessary.

(Cathode Active Material)

One example and another example of the cathode active material according to an embodiment of the present application will be described below. The one example of the cathode active material is a cathode active material using only a first cathode material. The other example is a cathode active material using a mixture of the first cathode material and a second cathode material.

In the embodiment of the present application, powder and electrode design for the cathode active material are improved in terms of crystal structure and an exposed amount of an active material; therefore, compared to related art, an increase in resistance is allowed to be further suppressed, and cycle performance is further improvable. It is to be noted that, when a surface of the active material is not appropriately covered with a coating film, an initial output is fine, but the surface of the active material reacts to be amorphous due to variation with time over cycles, and degradation in cycle characteristics and an increase in resistance are pronounced. Moreover, when initial cation mixing (site exchange between lithium ions and metal ions other than the lithium ions) is high, the initial output is fine; however, cation mixing further proceeds by variation with time over cycles, and the crystal structure of the active material is deformed, and the surface of the active material reacts to be amorphous. Accordingly, degradation in cycle characteristics and an increase in resistance become pronounced.

Moreover, for example, materials proposed in Japanese Unexamined Patent Application Publication Nos. H08-213015, 2011-238416, and H09-298061 are not sufficient to achieve longer life and higher output. For example, in a cathode material in Japanese Unexamined Patent Application Publication No. H08-213015, or the like, a combination of cobalt and nickel is basically used, and a third element is added to the combination to achieve stabilization of the crystal structure, or the like while maintaining potential characteristics of these elements; however, it is still not sufficient to achieve longer life and higher output.

(One Example of Cathode Active Material)

The one example of the cathode active material will be described below. The one example of the cathode active material is a cathode active material using only the first cathode material.

(First Cathode Material)

The first cathode material is a layered rocksalt-type oxide belonging to an R-3m space group. Examples of the layered rocksalt-type oxide include a layered rocksalt-type lithium metal oxide including lithium and a metal other than lithium. The metal is configured of nickel (Ni), or nickel (Ni) and one or more selected from a group configured of cobalt (Co), iron (Fe), manganese (Mn), copper (Cu), zinc (Zn), aluminum (Al), chromium (Cr), vanadium (V), titanium (Ti), magnesium (Mg), and zirconium (Zr). The lithium metal oxide is a layered rocksalt-type lithium nickel oxide including lithium, and at least nickel. An example of the lithium nickel oxide is a lithium nickel oxide including at least nickel (Ni) and one or more kinds selected from a group configured of cobalt (Co), iron (Fe), manganese (Mn), copper (Cu), zinc (Zn), aluminum (Al), chromium (Cr), vanadium (V), titanium (Ti), magnesium (Mg), and zirconium (Zr). A more specific example of the lithium nickel oxide is a lithium metal oxide represented by an expression (1):

$$Li_v M2_w M2_x M3_y O_z \quad \text{Expression (1)}$$

where v, w, x, y, and z satisfy $0.8<v<1.2$, $w+x+y\leq 1$, $0.45\leq w\leq 1$, $0\leq x\leq 1$, $0\leq y\leq 1$, and $0<z<3$, M1 is nickel (Ni), and each of M2 and M3 is one or more kinds selected from a group configured of cobalt (Co), iron (Fe), manganese (Mn), copper (Cu), zinc (Zn), aluminum (Al), chromium (Cr), vanadium (V), titanium (Ti), magnesium (Mg), and zirconium (Zr).

More specific examples of the lithium nickel oxide represented by the expression (1) include  $Li_v Ni_{0.5} CO_{0.2} Mn_{0.3} O_2$, where "v" is synonymous with the above-described "v", $Li_v Ni_{1/3} CO_{1/3} Mn_{1/3} O_2$, where "v" is synonymous with the above-described "v", $Li_v Ni_{0.8} Co_{0.15} Al_{0.50} O_2$, and $Li_v Ni_{0.7} CO_{0.1} Mn_{0.2} O_2$, where "v" is synonymous with the above-described "v".

In the cathode active material, it is preferable that a site occupancy of metal ions other than lithium at a 3a site obtained by Rietveld analysis of a powder X-ray diffraction pattern of the first cathode material in a cathode in a discharged state be about 5% or less, and a site occupancy of metal ions other than the metal which is configured of nickel or nickel and one or more selected from a group configured of cobalt (Co), iron (Fe), manganese (Mn), copper (Cu), zinc (Zn), aluminum (Al), chromium (Cr), vanadium (V), titanium (Ti), magnesium (Mg), and zirconium (Zr), and occupies a part of a 3b site at the 3b site be about 1% or over.

The cathode active material according to the embodiment of the present application is capable of obtaining superior characteristic through appropriately varying a cation mixing amount. In other words, if the site occupancy of metal ions other than lithium at the 3a site is out of the above-described range, there is a tendency to degrade characteristics as an active material. Therefore, the site occupancy of metal ions other than lithium at the 3a site is preferably about 5% or less. If the site occupancy of metal ions other than the metal which is configured of nickel or nickel and one or more selected from a group configured of cobalt (Co), iron (Fe), manganese (Mn), copper (Cu), zinc (Zn), aluminum (Al), chromium (Cr), vanadium (V), titanium (Ti), magnesium (Mg), and zirconium (Zr) and occupies a part of the 3b site at the 3b site is out of the above-described range, there is a tendency to degrade characteristics as the active material. Therefore, the site occupancy of metal ions other than the metal occupying the 3b site at the 3b site is preferably about 1% or over. It is to be noted that, in Rietveld analysis of the first cathode material, a crystal structure model in which the site occupancy of metal ions other than lithium at the 3a site and the site occupancy of metal ions other than the metal occupying a part of the 3b site at the 3b site are equal to each other is assumed. Therefore, in a case where the site occupancy of metal ions other than lithium at the 3a site is about 5% or less, the site occupancy of metal ions other than the metal occupying a part of the 3b site at the 3b site is substantially determined to be about 5% or less; therefore, an upper limit of the site occupancy of metal ions other than the metal occupying the 3b site at the 3 site is not specified.

Moreover, in the cathode active material, a volume of a regular octahedron structure that is obtained by Rietveld analysis of a powder X-ray diffraction pattern of a cathode in a discharged state, and is configured of the 3b site occupied by one or more selected from a group configured of nickel (Ni), cobalt (Co), iron (Fe), manganese (Mn), copper (Cu), zinc (Zn), aluminum (Al), chromium (Cr), vanadium (V), titanium (Ti), magnesium (Mg), and zirconium (Zr), and oxygen is preferably within a range from about 9 cubic angstroms to about 10.5 cubic angstroms both inclusive, because superior characteristics are obtained. It is to be noted that 1 angstrom is equal to $10^{-10}$ m.

(Rietveld Analysis of X-Ray Diffraction Pattern)

Rietveld analysis of an X-ray diffraction pattern is performed by the following way, for example. A cell (a battery) using a cathode including the above-described cathode active material is charged once, and then the cell is discharged at a discharge current of 0.1 C until reaching 2.5 V, and the cathode is taken out of the cell in such a discharged state, and powder X-ray diffraction measurement using a CuKα ray as an X-ray source is performed on the cathode to perform the Rietveld analysis. For example, the powder X-ray diffraction measurement may be performed on the cathode with an X-ray diffractometer, and the Rietveld analysis may be performed with use of analysis software (for example, RIETAN2000). Examples of the above-described cell before being charged include a cell which has never been charged, and a cell which has never been charged after manufacturing or has been subjected to 1 cycle to 10 cycles of charge and discharge (a commercially available unused cell, and the like). Even if the above-described measurement and analysis are performed on any of these cells, results of the measurement and analysis are substantially equal or similar.

It is to be noted that Rietveld analysis is, in summary, an analysis method of refining a crystal structure parameter from a diffraction intensity obtained by X-ray diffraction measurement, that is, a technique of assuming a crystal structure model, and refining various parameters of a crystal structure so as to allow an X-ray diffraction pattern derived from the crystal structure model by calculation to match a measured X-ray diffraction pattern. It may be assumed that 100% of the crystal structure model of the first cathode material belongs to the R3-m space group, and its 3a site is occupied by Li and $Ni^{2+}$ with an ionic radium close to that of $Li^+$, its 3b site is occupied by the above-described metal and the same amount of Li as the amount of the above-described $Ni^{2+}$, and its 6c site is occupied by O. For example, in the case of the lithium metal oxide represented by the expression (1), as the crystal structure model, $[Li_{v-m}Ni_m]_{3a\ site}[Li_mNi_{w-m}M2_xM3_y]_{3b\ site}[O_2]_{6c\ site}$ may be assumed.

(Exposed Amount)

An exposed amount of the cathode active material exposed from a coating film is preferably within a range from about 0.05% to about 8% both inclusive. If the exposed amount is less than about 0.05%, the active material is covered too much with the coating film, thereby resulting in degradation in characteristics, and if the exposed amount exceeds about 8%, the surface of the active material is too exposed, thereby resulting in degradation in characteristics. It is to be noted that examples of a component of the exposed from the coating film include a resolvent of electrolyte salt such as Li salt covering the surface of the active material, and an organic matter mainly including a resolvent of an electrolytic solution component such as a resolvent of a solvent.

(Measurement of Exposed Amount)

The exposed amount of the cathode active material exposed from the coating film is measured by the following way, for example. A cell (a battery) using a cathode including the above-described cathode active material is charged once, and then the cell is discharged at a discharge current of 0.1 C until reaching 2.5 V, and the cathode is taken out of the cell in such a discharged state, and XPS (X-ray photoelectron spectroscopy) measurement is performed on the cathode. With use of an XPS spectrum obtained at this time, the exposed amount is determined based on the following expression. The exposed amount is defined by the exposed amount (%)=a ratio of a metal element at the 3b site by XPS/a ratio of oxygen by XPS (%). For example, in the case of $Li_vNi_wCo_xMn_yO_z$, the exposed amount is determined by the exposed amount (%)=a ratio of (Mn2p3+Co2p3+Ni3p)/a ratio of (Li1s+C1s+O1s+F1s+P2p+S2p+Mn2p3+Co2p3+Ni3p). Examples of the above-described cell before being charged include a cell which has never been charged, and a cell which has been subjected to 1 cycle to 10 cycles of charge and discharge from a state in which the cell has never been charged (a commercially available unused cell, and the like). Even if measurement of the above-described exposed amount is performed on any of these cells, results of the measurement are substantially equal or similar.

It is to be noted that examples of XPS measurement are illustrated in FIGS. 3A to 3D and FIGS. 4A to 4D. The examples are results of measurement on Examples 1-1 and 1-2 which will be described later. A line "a" in each of the diagrams indicates an XPS spectrum in Example 1-1, and a line "b" in each of the diagrams indicates an XPS spectrum in Example 1-2.

(Other Characteristics of Cathode Active Material)

Preferably, the cathode active material does not have a diffraction peak at a diffraction angle $2\theta=31°\pm1°$ in an X-ray diffraction pattern. Such a cathode active material is preferable, because the cathode active material does not contain impurities.

In the cathode active material, an intensity ratio "IA/IB" between an intensity of a peak A at a diffraction angle $2\theta=18.5°\pm1°$ of a (001) plane of the first cathode material and an intensity a peak B at a diffraction angle $28=44.4°\pm1°$ of a (104) plane of the first cathode material which are determined by the X-ray diffraction pattern is preferably about 1.5 or over. It is to be noted that IA is a peak intensity of the peak A, IB is a peak intensity of the peak B. The larger the intensity ratio "IA/IB' is, the more rigid the crystal structure is, and the more favorably lithium is inserted and extracted.

In the first cathode material, an average of a half-value width of a (003) plane, a half-value width of a (101) plane, and a half-value width of a (104) plane determined from the X-ray diffraction pattern is preferably within a range from about 0.135 to about 0.155 both inclusive. If the average of the half-value widths is small, crystallinity tends to be high, and capacity tends to be decreased. If the average of the half-value widths is large, crystallinity is low, and if crystallinity is low, particles are too large in size, and lithium diffusion tends to be inhibited. Therefore, the first cathode material preferably has the above-described average of the half-value widths.

(Another Example of Cathode Active Material)

Another example of the cathode active material will be described below. The example of the cathode active material is a cathode active material using a mixture of the first cathode material and the second cathode material.

(First Cathode Material)

The first cathode material is similar to the above-described one example.

(Second Cathode Material)

Examples of the second cathode material include an oxide with a spinel crystal structure belonging to an Fd3m space group. The oxide with the spinel crystal structure is a lithium metal oxide with a spinel crystal structure including lithium and manganese. A more specific example of the lithium metal oxide with the spinel crystal structure is a lithium metal oxide represented by an expression (2).

$$Li_aM4_bMn_cO_4 \hspace{2cm} \text{Expression (2)}$$

where M4 is one or more kinds selected from a group configured of aluminum (Al), cobalt (Co), nickel (Ni), magnesium (Mg), zirconium (Zr), and titanium (Ti), and a, b, and c satisfy $0.8<a<1.2$, $b+c\leq2$, $0\leq b$, and $c\leq2$.

(Exposed Amount)

In the other example of the cathode active material, as with the one example of the cathode active material, the exposed amount of the cathode active material exposed from the coating film is preferably within a range from about 0.05% to about 8% both inclusive. The component of the exposed from the coating film, a method of measuring the exposed amount, and the like are similar to those described above, and will not be further described.

(Mixture Ratio)

In the cathode active material, a mixture ratio of the first cathode material and the second cathode material preferably satisfies the following relationship so as to obtain superior characteristics. Namely, 0<a mass ratio of the first cathode material≤40 and 60≤a mass ratio of the second cathode material<100 are preferably satisfied, where a total of the mass ratio of the first cathode material and the mass ratio of the second cathode material is 100.

(Method of Preparing Cathode Active Material)

The above-described cathode active material may be formed by, for example, a coprecipitation method, a solid-phase method, or the like. It is to be noted that, when the first cathode material is formed, the coprecipitation method is preferably used.

(Coprecipitation Method)

In the coprecipitation method, for example, a precursor such as a coprecipitated hydroxide precursor which includes a transition metal (Co, Ni, Mn, or the like) forming a target lithium metal oxide in one particle is formed in advance, and then a Li compound (Li salt) is mixed with the precursor, and the precursor is fired.

When the coprecipitated hydroxide precursor is formed, a compound in which each transition metal (Mn, Ni, Co, or the like) is uniformly mixed is preferably formed. It is to be noted that the precursor is not limited to hydroxide, and any insoluble salt, such as carbonate and citric salt, in which an element is uniformly present at the atomic level may be used in a manner similar to hydroxide. Moreover, a precursor with higher bulk density may be formed with use of crystallization reaction using a complexing agent, or the like.

Raw materials of the coprecipitated hydroxide precursor include metal compounds which include a metal forming lithium metal oxide. Examples of the metal compound include Mn compounds, Co compounds, and Al compounds. The Mn compounds include manganese oxide, manganese carbonate, manganese sulfate, manganese nitrate, manganese acetate, and the like. The Ni compounds include nickel hydroxide, nickel carbonate, nickel sulfate, nickel nitrate, nickel acetate, and the like. The Co compounds include cobalt sulfate, cobalt nitrate, cobalt acetate, and the like. The Al compounds include aluminum hydroxide, aluminum oxide, and the like.

The Li compounds include lithium carbonate, lithium hydroxide, lithium peroxide, lithium oxide, lithium nitrate, lithium sulfate, lithium acetate, and the like.

As the raw material used to form the coprecipitated hydroxide precursor, any raw material causing precipitation reaction with an alkali solution in any form may be used; however, a metal salt with high solubility is preferably used.

(Solid-Phase Method)

In the solid-phase method, Li salt and salt of each metal which form a target lithium metal oxide are mixed to from a mixture, and the mixture is fired.

As the Li salt, lithium carbonate, lithium hydroxide, lithium peroxide, lithium oxide, lithium nitrate, lithium sulfate, lithium acetate, or the like is used. Examples of the salt of each metal include Ni salt, Co salt, Mn salt, and Al salt. As the Ni salt, nickel carbonate, nickel hydroxide, nickel oxyhydroxide, nickel oxide, nickel nitrate, nickel sulfate, nickel acetate, or the like is used. As the Co salt, cobalt carbonate, cobalt hydroxide, cobalt oxide, cobalt nitrate, cobalt sulfate, cobalt acetate, or the like is used. As the Mn salt, manganese carbonate, manganese hydroxide, manganese oxide, manganese nitrate, manganese sulfate, manganese acetate, or the like is used. As the Al salt, aluminum hydroxide, aluminum oxide, or the like are used.

Lithium larger or smaller in amount than a composition ratio is added to these raw materials (metal salts), and they are mixed to form a mixture, and the mixture is fired in an oxygen atmosphere or air at a temperature of about 600° to about 900°. Thus, a target lithium metal oxide is obtained.

(Solid-Phase Forming Method)

A target lithium metal oxide may be obtained by a solid-phase forming method in which raw materials (metal salts) of the target lithium metal oxide are mixed to form a mixture and the mixture is compression molded, and then is fired.

(Method of forming first cathode material (active material with different occupancies at 3a site and 3b site in cathode active material))

The occupancies at the 3a site and the 3b site in the cathode active material may be changed mainly through changing a ratio between lithium and metal during preparation, a firing temperature, or a synthesizing method. As used herein, the term "ratio between lithium and metal during preparation" refers to "ratio between lithium and metal" in raw materials.

For example, when the first cathode material is formed, the coprecipitation method is preferably used.

For example, when the ratio between lithium and metal during preparation is less than about 1.0 in mole ratio, and the firing temperature is about 900° or over, the cation mixing amount of the active material is allowed to be increased. In other words, a sample in which the site occupancy of metal ions other than the metal which is configured of nickel or nickel and one or more selected from a group configured of cobalt (Co), iron (Fe), manganese (Mn), copper (Cu), zinc (Zn), aluminum (Al), chromium (Cr), vanadium (V), titanium (Ti), magnesium (Mg), and zirconium (Zr), and occupies a part of the 3b site at the 3b site by Rietveld analysis is within a range from about 1% to about 5% both inclusive is obtainable.

For example, when the ratio between lithium and metal during preparation is within a range from about 1.0 to about 1.15 both inclusive in mole ratio, and the firing temperature is set to about 600° or more and less than about 900°, the cation mixing amount is allowed to be decreased. In other words, a sample in which the site occupancy of metal ions other than the metal which is configured of nickel (Ni), or nickel (Ni) and one or more selected from a group configured of cobalt (Co), iron (Fe), manganese (Mn), copper (Cu), zinc (Zn), aluminum (Al), chromium (Cr), vanadium (V), titanium (Ti), magnesium (Mg), and zirconium (Zr), and occupies a part of the 3b site at the 3b site by Rietveld analysis is within a range from about 1% to about 5% both inclusive is obtainable.

(Cell with Different Exposed Amount of Cathode Active Material)

The exposed amount of the cathode active material exposed from the coating film may be changed by the following method, for example. The exposed amount of the cathode active material exposed from the coating film is allowed to be changed through changing the cation mixing amount of the above-described first cathode material, or by a cell warming process in which, after a cell is assembled, the cell is put into a constant temperature bath at a predetermined temperature. Thus, an electrode in which the exposed amount of the cathode active material exposed from the coating film is within a predetermined range, or a cell using the electrode is allowed to be formed.

The one example and the other example of the cathode active material may further include a cathode material other than the first cathode material and the second cathode material. Examples of the other cathode material include other lithium metal oxides such as lithium phosphate compounds with an olivine crystal structure, and inorganic compounds not including lithium such as $MnO_2$, $V_2O_5$, $V_6O_{13}$, NiS, and MoS.

(Binder)

Examples of the binder include synthetic rubber such as styrene butadiene-based rubber, fluorine-based rubber, and ethylene propylene diene and polymer materials such as polyvinylidene fluoride. Only one kind selected from them or a combination of two or more kinds selected from them may be used.

Examples of the conductor include carbon materials such as graphite and carbon black. Only one kind selected from them, or a combination of two or more kinds selected from them may be used. It is to be noted that the conductor may be a metal material, a conductive polymer, or the like, as long as the metal material, the conductive polymer, or the like is a material having electrical conductivity.

(Anode)

The anode 22 includes an anode current collector 22A having a pair of facing surfaces and anode active material layers 22B disposed on both of the surfaces of the anode current collector 22A. Alternatively, the anode active material layer 22B may be disposed on only one of the surfaces of the anode current collector 22A.

The anode current collector 22A is formed of, for example, a metal material such as copper, nickel, or stainless steel.

The anode active material layer 22B includes, as anode active materials, one or more kinds of anode materials capable of inserting and extracting lithium, and may include any other material such as a binder or a conductor, if necessary. In the anode active material layer 22B, the chargeable capacity of the anode material is preferably larger than the discharge capacity of the cathode 21 to prevent unintended deposition of lithium metal during charge and discharge. It is to be noted that, as the binder and the conductor, a binder and a conductor similar to those described in the cathode may be used.

Examples of the anode material capable of inserting and extracting lithium include carbon materials. Examples of the carbon materials include non-graphitizable carbon, graphitizable carbon, artificial graphite such as MCMB (mesocarbon microbead), natural graphite, pyrolytic carbons, cokes, graphites, glass-like barbons, organic polymer compound fired bodies, carbon blacks, carbon fibers, and activated carbon. Cokes include pitch coke, needle coke, and petroleum coke. The organic polymer compound fired bodies are formed through firing and carbonizing a polymer material such as a phenolic resin or a furan resin at an appropriate temperature. Some of the organic polymer compound fired bodies may be classified into non-graphitizable carbon or graphitizable carbon.

In addition to the above-described carbon materials, examples of the anode material capable of inserting and extracting lithium include a material capable of inserting and extracting lithium and including one or more kinds selected from a group configured of metal elements and metalloid elements as constituent elements, because high energy density is obtainable. Such an anode material may be any one of the simple substances, alloys, and compounds of metal elements and metalloid elements, or a material including a phase of one or more kinds selected from them at least in part. It is to be noted that the alloy refers to an alloy including two or more kinds of metal elements and an alloy including one or more kinds of metal elements and one or more kinds of metalloid elements. Moreover, the alloy may include a non-metal element. The texture of the alloy may be a solid solution, a eutectic (eutectic mixture), an intermetallic compound, or the coexistence of two or more kinds selected from them.

Examples of the above-described metal elements and the above-described metalloid elements include metal elements and metalloid elements capable of forming an alloy with lithium. Specific examples include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). In particular, one or both of silicon and tin are preferable, and silicon is more preferable, because silicon and tin have a high capability of inserting and extracting lithium, and high energy density is obtainable accordingly.

An anode material including one or both of silicon and tin may be the simple substance, an alloy, or a compound of silicon, the simple substance, an alloy, or a compound of tin, or a material including a phase of one or more kinds selected from them at least in part.

Examples of alloys of Si include materials including, as second constituent elements other than Si, one or more kinds selected from a group configured of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr). Examples of the alloy of tin include a material including, as second constituent elements other than tin (Sn), one or more kinds selected from a group configured of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium(Cr).

Examples of compounds of tin and compounds of silicon include compounds including oxygen (O) or carbon (C), and the compounds may include the above-described second constituent element in addition to tin (Sn) or silicon (Si).

In particular, as the anode material including one or both of silicon (Si) and tin (Sn), for example, an anode material including tin (Sn) as a first constituent element, and a second constituent element and a third constituent element is preferable. The anode material may be used together with any of the above-described anode materials. The second constituent element is one or more kinds selected from a group configured of cobalt (Co), iron (Fe), magnesium (Mg), titanium (Ti), vanadium (V), chromium (Cr), manganese (Mn), nickel (Ni), copper (Cu), zinc (Zn), gallium (Ga), zirconium (Zr), niobium (Nb), molybdenum (Mo), silver (Ag), indium (In), cerium (Ce), hafnium (Hf), tantalum (Ta), tungsten (W), bismuth (Bi), and silicon (Si). The third constituent element is one or more kinds selected from a group configured of boron (B), carbon (C), aluminum (Al), and phosphorus (P). When the second constituent element and the third constituent element are included, cycle characteristics are improved.

In particular, a SnCoC-containing material in which tin (Sn), cobalt (Co), and carbon (C) are included as constituent elements, the carbon (C) content is within a range from about 9.9 mass % to about 29.7 mass % both inclusive, and the ratio of cobalt (Co) to a total of tin (Sn) and cobalt (Co) (Co/(Sn+Co)) is within a range from about 30 mass % to about 70 mass % both inclusive is preferable, because high energy density is obtainable in such a composition range.

The SnCoC-containing material may further include any other constituent element, if necessary. As the other constituent element, for example, silicon (Si), iron (Fe), nickel (Ni), chromium (Cr), indium (In), niobium (Nb), germanium (Ge), titanium (Ti), molybdenum (Mo), aluminum (Al), phosphorus (P), gallium (Ga), bismuth(Bi), or the like is preferable, and two or more kinds selected from them may be included, because capacity characteristics or cycle characteristics are further improved.

It is to be noted that the SnCoC-containing material includes a phase including tin (Sn), cobalt (Co), and carbon (C), and the phase preferably has a low crystalline structure or an amorphous structure. Moreover, in the SnCoC-containing material, at least a part of carbon as a constituent element is preferably bonded to a metal element or a metalloid element as another constituent element, because it is considered that degradation in cycle characteristics is caused by cohesion or crystallization of tin (Sn) or the like, and when carbon is bonded to another element, such cohesion or crystallization is suppressed.

An example of a measurement method of checking the bonding state of an element is X-ray photoelectron spectroscopy (XPS). In the XPS, in the case of graphite, the peak of the 1s orbit (C1s) of carbon is observed at 284.5 eV in an apparatus in which energy calibration is performed to allow the peak of the 4f orbit (Au4f) of a gold atom to be obtained at 84.0 eV. Moreover, in the case of surface contamination carbon, the peak of C1s of the surface contamination carbon is observed at 284.8 eV. On the other hand, in the case where charge density of the carbon element is increased, for example, in the case where carbon is bonded to a metal element or a metalloid element, the peak of C1s is observed in a region lower than 284.5 eV. In other words, when the peak of a composite wave of C1s obtained in the SnCoC-containing material is observed in a region lower than 284.5 eV, at least a part of carbon (C) included in the SnCoC-containing material is bonded to a metal element or a metalloid element as the other constituent element.

It is to be noted that, in the XPS, for example, the peak of C1s is used to correct an energy axis of a spectrum. In general, since surface contamination carbon is present on a material surface, the peak of C1s of the surface contamination carbon is defined at 284.8 eV, and is used as energy reference. In the XPS, the waveform of the peak of C1s is obtained as a form including the peak of the surface contamination carbon and the peak of carbon in the SnCoC-containing material; therefore, the peak of the surface contamination carbon and the peak of carbon are separated by, for example, analysis with use of commercially available software. In the analysis of the waveform, the position of a main peak existing on a lowest binding energy side is used as an energy reference (284.8 eV).

Moreover, examples of the anode material capable of inserting and extracting lithium include metal oxides and polymer compounds. Examples of metal oxides include lithium titanate ($Li_4Ti_5O_{12}$), iron oxide, ruthenium oxide, and molybdenum oxide, and examples of the polymer compounds include polyacetylene, polyaniline, and polypyrrole.

It is to be noted that the anode material capable of inserting and extracting lithium may be any anode material other than the above-described anode materials. Moreover, two or more kinds arbitrarily selected from the above-described anode materials may be mixed.

The anode active material layer 22B may be formed by, for example, a vapor-phase method, a liquid-phase method, a thermal spraying method, a firing method, a coating method, or a combination of two or more kinds selected from these methods. When the anode active material layer 22B is formed with use of the vapor-phase method, the liquid-phase method, the thermal spraying method, the firing method, or a combination of two or more kinds selected from these methods, the anode active material layer 22B and the anode current collector 22A are preferably alloyed with each other in a part or a whole of an interface therebetween. More specifically, in this case, it is preferable that, in the interface therebetween, a constituent element of the anode current collector 22A be diffused into the anode active material layer 22B, or a constituent element of the anode active material layer 22B be diffused into the anode current collector 22A, or they be diffused into each other, because damage due to swelling and shrinkage of the anode active material layer 22B caused by charge and discharge is allowed to be suppressed, and electronic conductivity between the anode active material layer 22B and the anode current collector 22A are improvable.

Examples of the vapor-phase method include a physical deposition method and a chemical deposition method. More specific examples of the vapor-phase method include a vacuum deposition method, a sputtering method, an ion plating method, a laser ablation method, a thermal chemical vapor deposition (CVD) method, and a plasma chemical vapor deposition method. As the liquid-phase method, known techniques such as electroplating or electroless plating may be used. In the firing method, a particulate anode active material is mixed with a binder or the like to form a mixture, and the mixture is dispersed in a solvent to perform coating with the mixture, and then the mixture is heated at a higher temperature than the melting point of the binder or the like. As the firing method, known techniques such as an atmosphere firing method, a reaction firing method, and a hot press firing method may be used.

(Separator)

The separator 23 isolates between the cathode 21 and the anode 22 to allow lithium ions to pass therethrough while preventing a short circuit of a current due to contact between the cathode 21 and the anode 22. The separator 23 is configured of, for example, a porous film of a synthetic resin such as polytetrafluoroethylene, polypropylene, or polyethylene, or a porous film of ceramic, and may be configured of a laminate film formed by laminating two or more kinds of porous films. The separator 23 is impregnated with an electrolytic solution which is a liquid electrolyte.

(Electrolytic Solution)

The electrolytic solution is formed through dissolving an electrolyte salt in a nonaqueous solvent, and exhibits ionic conductivity through ionizing the electrolyte salt. The separator 23 is impregnated with the electrolytic solution. The electrolytic solution is not specifically limited, and as the electrolytic solution, a nonaqueous solvent-based electrolytic solution in related art is used.

(Electrolyte Salt)

Examples of the electrolyte salt include lithium hexafluorophosphate ($LiPF_6$), lithium bis(pentafluoroethanesulfonyl)imide ($Li(C_2F_5SO_2)_2N$), lithium perchlorate ($LiClO_4$), lithium hexafluoroarsenate ($LiAsF_6$), lithium tetrafluoroborate ($LiBF_4$), lithium trifluoromethanesulfonate ($LiSO_3CF_3$), lithium bis(trifluoromethane-sulfonyl)imide ($Li(CF_3SO_2)_2N$), lithium tris(trifluoromethanesulfonyl) methyl ($LiC(SO_2CF_3)_3$), lithium chloride (LiCl), lithium bromide (LiBr), $LiB(C_6H_5)_4$, $LiCH_3SO_3$, $LiCF_3SO_3$, $LiN(SO_2CF_3)_2$, $LiAlCl_4$, $LiSiF_6$, difluoro(oxalato-O,O') lithium borate, and lithium bis(oxalato) borate. $LiPF_6$ is specifically preferable, because high ionic conductivity is obtainable, and cycle characteristics are improvable. Only one kind selected from them or a combination of two or more kinds selected from them may be used as the electrolyte salt.

(Nonaqueous Solvent)

Examples of the nonaqueous solvent in which the electrolyte salt is dissolved include ethylene carbonate, propylene carbonate, butylene carbonate, vinylene carbonate, dimethyl carbonate, diethyl carbonate, ethyl methyl carbonate, 4-fluoro-1,3-dioxolane-2-one, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, ethyl propionate, acetonitrile, glutaronitrile, adiponitrile, methoxyacetonitrile, 3-methoxypropionitrile, N,N-dimethyl formamide, N-methylpyrrolidinone, N-methyloxazolidinone, nitromethane, nitroethane, sulfolane, dimethyl sulfoxide, trimethyl phosphate, triethyl phosphate, ethylene sulfite, and ambient temperature molten salts such as bistrifluoromethylsulfonyl imide, and trimethylhexylammonium. In particular, ethylene carbonate, propylene carbonate, vinylene carbonate, 4-fluoro-1,3-dioxolane-2-one, dimethyl carbonate, ethyl methyl carbonate, and ethylene sulfite are preferable, because superior charge-discharge capacity characteristics and superior charge-discharge cycle characteristics are obtainable. Only one kind selected from them or a combination of two or more kinds selected from them may be used as the solvent.

(Method of Manufacturing Battery)

The nonaqueous electrolyte battery may be manufactured by, for example, the following manufacturing method.

(Manufacturing of Cathode)

First of all, the cathode 21 is formed. First, the cathode active material, the binder, and the conductor are mixed to form a cathode mixture, and then the cathode mixture is dispersed in an organic solvent to form paste-form cathode mixture slurry. Next, both surfaces of the cathode current collector 21A are uniformly coated with the cathode mixture slurry by a doctor blade, a barcoater, or the like, and the cathode mixture slurry is dried to form a coating film. Finally, the coating film is compression molded by a roller press or the like while applying heat, if necessary, to form the cathode active material layer 21B. In this case, compression molding may be repeated a plurality of times.

(Manufacturing of Anode)

Next, the anode 22 is formed. First, the anode material and the binder, and, if necessary, the conductor are mixed to form an anode mixture, and then the anode mixture is dispersed in an organic solvent to form paste-form anode mixture slurry. Next, both surfaces of the anode current collector 22A are uniformly coated with the anode mixture slurry by a doctor blade, a barcoater, or the like, and the anode mixture slurry is dried to form a coating film. Finally, the coating film is compression molded by a roller press or the like while applying heat, if necessary, to form the anode active material layer 22B.

It is to be noted that the anode 22 may be manufactured by the following way. First, the anode current collector 22A configured of electrolytic copper foil or the like is prepared, and then the anode material is deposed on both surfaces of the anode current collector 22A by a vapor-phase method such as an evaporation method to form a plurality of anode active material particles. After that, if necessary, an oxide-containing film is formed by a liquid-phase method such as a liquid-phase deposition method, or a metal material is formed by a liquid-phase method such as an electrolytic plating method, or both of the oxide-containing film and the metal material are formed, thereby forming the anode active material layer 22B.

(Assembling of Battery)

The nonaqueous electrolyte battery is assembled by the following way. First, the cathode lead 25 and the anode lead 26 are attached to the cathode current collector 21A and the anode current collector 22A, respectively, by welding or the like. Next, the cathode 21 and the anode 22 are laminated with the separator 23 in between, and they are spirally wound to form the spirally wound electrode body 20, then the center pin 24 is inserted into the center of the spirally wound electrode body 20. Next, the spirally wound electrode body 20 sandwiched between the pair of insulating plates 12 and 13 is contained in the battery can 11, and an end of the cathode lead 25 and an end of the anode lead 26 are welded to the safety valve mechanism 15 and the battery can 11, respectively.

Next, the above-described electrolytic solution is injected into the battery can 11 to impregnate the separator 23 with the electrolytic solution. Finally, the battery cover 14, the safety valve mechanism 15, and the PTC device 16 are caulked and fixed in the open end of the battery can 11 by the gasket 17. After that, to change the exposed amount of the cathode active material, if necessary, a warming process under predetermined conditions such as immersing in a constant temperature bath is performed. Thus, the nonaqueous electrolyte battery illustrated in FIGS. 1 and 2 is completed.

2. Second Embodiment

Configuration of Battery

Figure 5:
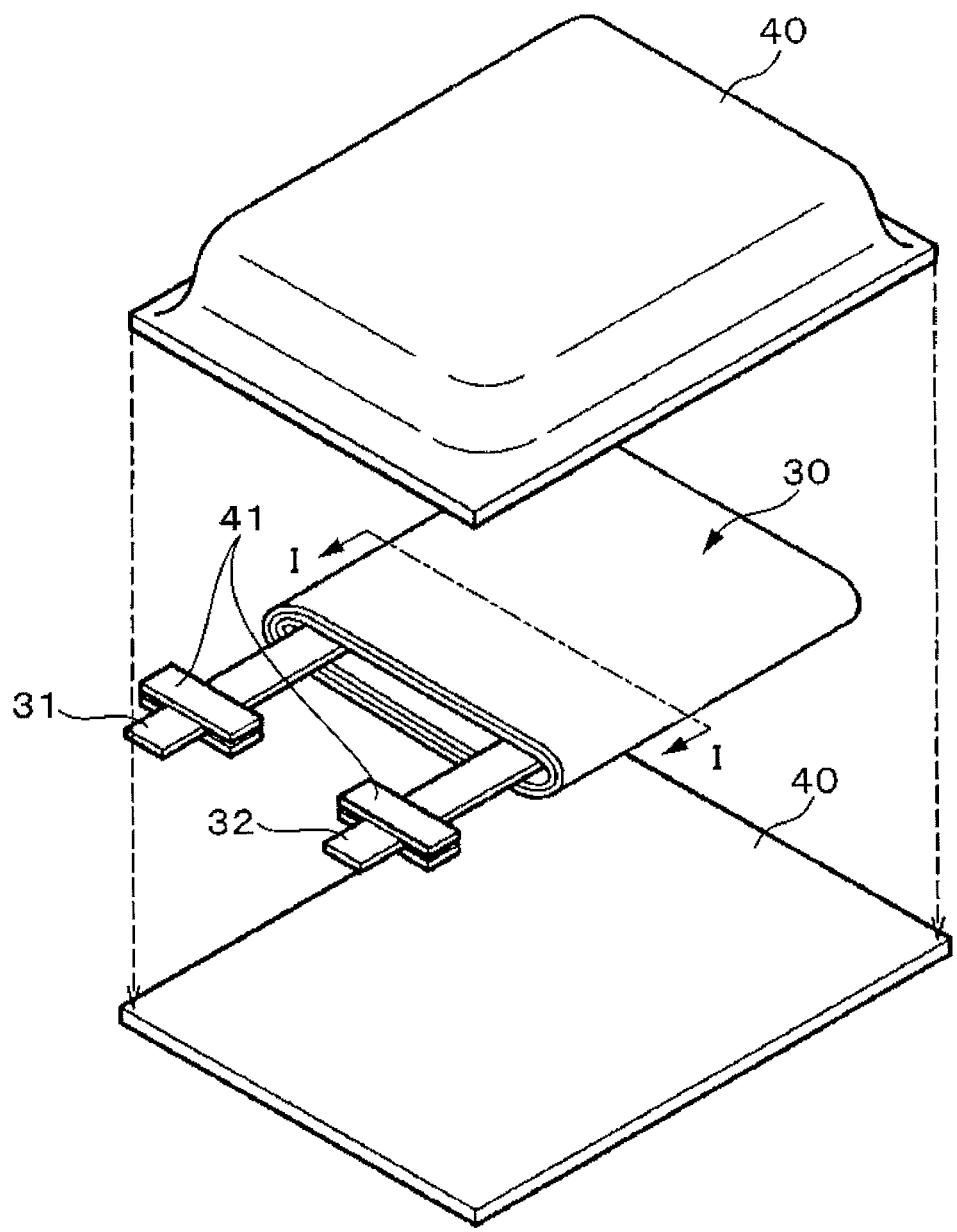
FIG. 5 is an exploded perspective view illustrating a configuration example of a nonaqueous electrolyte battery according to an embodiment of the present application.
Figure 6:
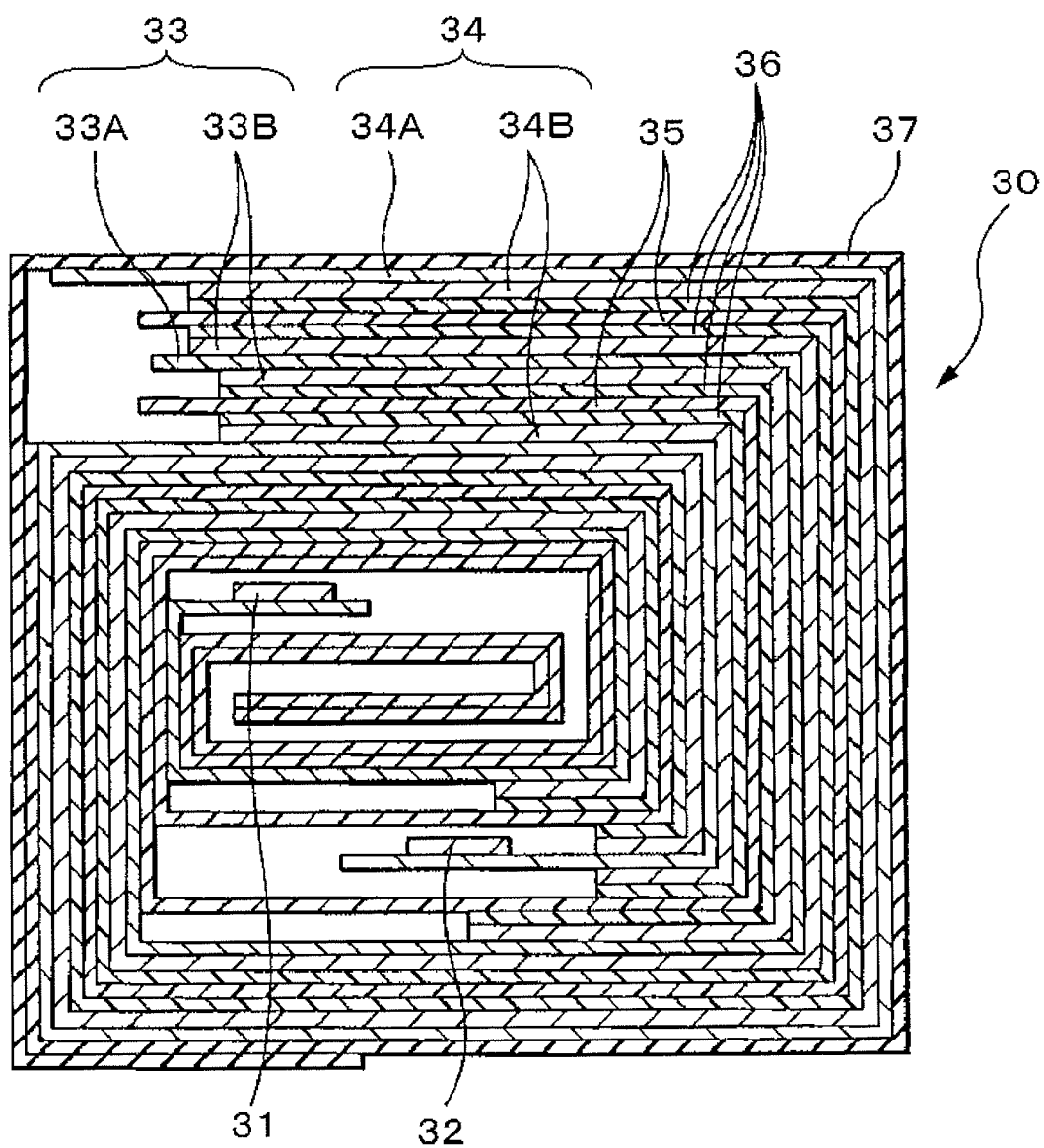
FIG. 6 is a sectional view of a spirally wound electrode body illustrated in FIG. 5.

A nonaqueous electrolyte battery according to a second embodiment of the present application will be described below. FIG. 5 illustrates an exploded perspective configuration of the nonaqueous electrolyte battery according to the second embodiment of the present application, and FIG. 6 illustrates an enlarged sectional view taken along a line I-I of a spirally wound electrode body 30 illustrated in FIG. 5.

The nonaqueous electrolyte battery is configured mainly through containing, in film-shaped package members 40, the spirally wound electrode body 30 to which a cathode lead 31 and an anode lead 32 are attached. A battery configuration using the film-shaped package members 40 is referred to as laminate film type.

The cathode lead 31 and the anode lead 32 are drawn, for example, from the interiors of the package members 40 to outside in the same direction. The cathode lead 31 is made of, for example, a metal material such as aluminum, and the anode lead 32 is made of, for example, a metal material such as copper, nickel, or stainless steel. These metal materials each may have, for example, a sheet shape or a mesh shape.

The package members 40 has, for example, a configuration formed through disposing resin layers on both surfaces of a metal layer made of metal foil, such as an aluminum laminate film formed through laminating a nylon film, aluminum foil, and a polyethylene film in this order. As a typical configuration of each of the package members 40, the package members 40 each have a laminate configuration formed through laminating an outer resin layer, a metal layer, and an inner resin layer. For example, the package members 40 are configured through adhering edge portions of two rectangular aluminum laminate films to each other by fusion bonding or an adhesive to allow the inner resin layers to face the spirally wound electrode body 30. The outer resin layer and the inner resin layer may be configured of a plurality of layers.

Metal materials forming the metal layer may have a function as a barrier film with moisture permeability resistance, and aluminum (Al) foil, stainless steel (SUS) foil, nickel (Ni) foil, plated iron (Fe) foil, and the like may be used. In particular, aluminum foil which is thin and lightweight and has superior processability is preferably used. In particular, in terms of processability, for example, annealed aluminum (JIS A8021P-O), (JIS A8079P-O), or (JIS A1N30-O) is preferably used.

The metal layer preferably has a thickness of about 30 µm to about 150 µm both inclusive. In the case where the thickness is less than about 30 µm, material strength is degraded. Moreover, in the case where the thickness exceeds about 150 µm, processing is extremely difficult, and the thickness of the laminate film 52 is increased to cause a decline in volume efficiency of the nonaqueous electrolyte battery.

The inner resin layers are portions which are dissolved by heat and welded to each other, and polyethylene (PE), cast polypropylene (CPP), polyethylene terephthalate (PET), low density polyethylene (LDPE), high density polyethylene (HDPE), linear low density polyethylene (LLDPE), and the like may be used, and two or more kinds selected from them may be used.

As the outer resin layer, in terms of beauty of appearance, toughness, flexibility and the like, a polyolefin-based resin, a polyamide-based resin, a polyimide-based resin, polyester, or the like is used. More specifically, nylon (Ny), polyethylene terephthalate (PET), polyethylene naphthalate (PEN), polybutylene terephthalate (PBT), or polybutylene naphthalate (PBN) may be used, and two or more kinds selected from them may be used.

Adhesive films 41 for preventing the entry of outside air are inserted between each package member 40 and the cathode lead 31 and between each package member 40 and the anode lead 32. The adhesive films 41 are made of a material having adhesion to the cathode lead 31 and the anode lead 32. Examples of the material having adhesion include polyolefin resins such as polyethylene, polypropylene, modified polyethylene, and modified polypropylene.

It is to be noted that, instead of the aluminum laminate film with the above-described laminate configuration, the package members 40 may be configured of a laminate film with any other laminate configuration, or may be configured of polymer films of polypropylene or the like, or metal films.

FIG. 6 illustrates a sectional configuration taken along a line I-I of the spirally wound electrode body 30 illustrated in FIG. 5. The spirally wound electrode body 30 is formed through laminating a cathode 33 and an anode 34 with a separator 35 and an electrolyte 36 in between, and spirally winding them. An outermost portion of the spirally wound electrode body 30 is protected with a protective tape 37.

The cathode 33 is formed, for example, through disposing a cathode active material layer 33B on both surfaces of a cathode current collector 33A. The anode 34 is formed, for example, through disposing an anode active material layer 34B on both surfaces of an anode current collector 34A, and the anode active material layer 34B is disposed to face the cathode active material layer 33B. The configurations of the cathode current collector 33A, the cathode active material layer 33B, the anode current collector 34A, and the anode active material layer 34B are similar to those of the cathode current collector 21A, the cathode active material layer 21B, the anode current collector 22A, and the anode active material layer 22B, respectively.

The electrolyte 36 includes an electrolytic solution similar to that in the first embodiment and a polymer compound holding the electrolytic solution. The electrolyte 36 may be, for example, a so-called gel electrode. The gel electrolyte is preferable, because high ionic conductivity (for example, 1 mS/cm or over at room temperature) is obtainable, and leakage of the electrolytic solution is prevented.

Examples of the polymer compound include polyacrylonitrile, polyvinylidene fluoride, a copolymer of vinylidene fluoride and hexafluoropyrene, polytetrafluoroethylene, polyhexafluoropropylene, polyethylene oxide, polypropylene oxide, polyphosphazene, polysiloxane, polyvinyl acetate, polyvinyl alcohol, poly(methyl methacrylate), polyacrylic acids, polymethacrylic acids, styrene-butadiene rubber, nitrile-butadiene rubber, polystyrene, and polycarbonate. Only one kind selected from them or a combination of two or more kinds selected from them may be used. In particular, polyacrylonitrile, polyvinylidene fluoride, polyhexafluoropropylene, or polyethylene oxide is preferable, because they are electrochemically stable.

(Method of Manufacturing Battery)

The nonaqueous electrolyte battery may be manufactured by, for example, any of the following three kinds of methods (first to third manufacturing methods).

(First Manufacturing Method)

In the first manufacturing method, first, by steps similar to the above-described steps of forming the cathode 21 and the anode 22 in the first embodiment, the cathode active material layers 33B are formed on both surfaces of the cathode current collector 33A to form the cathode 33. Moreover, the anode active material layers 34B are formed on both surfaces of the anode current collector 34A to form the anode 34.

Next, a precursor solution including an electrolytic solution similar to that in the first embodiment, the polymer compound, and a solvent is prepared, and then the cathode 33 and the anode 34 are coated with the precursor solution. Then, the solvent is volatilized to form the gel electrolyte 36. Next, the cathode lead 31 and the anode lead 32 are attached to the cathode current collector 33A and the anode current collector 34A, respectively.

Then, the cathode 33 on which the electrolyte 36 is formed and the anode 34 on which the electrolyte 36 is formed are laminated with the separator 35 in between and spirally wound in a longitudinal direction to form a spirally wound body, and then the protective tape 37 is bonded to an outermost portion of the spirally wound body to form the spirally wound electrode body 30. Finally, the spirally wound electrode body 30 is sandwiched between, for example, two film-shaped package members 40, and edge portions of the package members 40 are adhered to each other by thermal fusion bonding or the like to seal the spirally wound electrode body 30 in the package members 40. At this time, the adhesive films 41 are inserted between the cathode lead 31 and each package member 40 and between the anode lead 32 and each package member 40. Thus, the nonaqueous electrolyte battery illustrated in FIGS. 5 and 6 is completed.

(Second Manufacturing Method)

In the second manufacturing method, first, the cathode lead 31 and the anode lead 32 are attached to the cathode 33 and the anode 34, respectively. Next, the cathode 33 and the anode 34 are laminated and spirally wound with the separator 35 in between to form a wound body, and then the protective tape 37 is bonded to an outermost portion of the wound body to form a spirally wound body as a precursor body of the spirally wound electrode body 30.

Then, the spirally wound body is sandwiched between two film-shaped package members 40, and the edge portions of the package members 40 except for edge portions on one side are adhered by thermal fusion bonding or the like to contain the spirally wound body in the package members 40 configuring a pouched package. Next, an electrolytic composition which includes the electrolytic solution similar to that in the first embodiment, monomers as raw materials of a polymer compound, and a polymerization initiator, and, if necessary, any other material such as a polymerization inhibitor is prepared, and is injected into the package members 40 configuring the pouched package, and then an opened portion of the pouched package configured of the package members 40 is sealed by thermal fusion bonding or the like. Finally, the monomers are thermally polymerized to form the polymer compound, thereby forming the gel electrolyte 36. Thus, the nonaqueous electrolyte battery illustrated in FIGS. 5 and 6 is completed.

(Third Manufacturing Method)

In the third manufacturing method, as in the case of the above-described second manufacturing method, the spirally wound body is formed, and the spirally wound body is contained in the package members 40 configuring the pouched package, except that the separator 35 having both surfaces coated with a polymer compound is used.

Examples of the polymer compound applied to the separator 35 include polymers including vinylidene fluoride as a component, i.e., a homopolymer, a copolymer, and a multicomponent copolymer. More specifically, examples of the polymer compound include polyvinylidene fluoride, a binary copolymer including vinylidene fluoride and hexafluoropropylene as components, and a ternary copolymer including vinylidene fluoride, hexafluoropropylene, and chlorotrifluoroethylene as components. It is to be noted that one or more kinds of other polymer compounds may be used together with the above-described polymer including vinylidene fluoride as a component.

As the polymer compound on the separator 35, for example, a porous polymer compound may be formed by the following way. First, a solution which is prepared through dissolving the polymer compound in a first solvent made of a polar organic solvent such as N-methyl-2-pyrrolidone, γ-butyrolactone, N,N-dimethylacetamide, or N,N-dimethyl sulfoxide, and then the separator 35 is coated with the solution. Next, the separator 35 coated with the above-described solution is immersed in a second solvent such as water, ethyl alcohol, or propyl alcohol which has compatibility with the above-described polar organic solvent and is a poor solvent with respect to the above-described polymer compound. At this time, solvent exchange occurs, and phase separation by spinodal decomposition occurs to allow the polymer compound to have a porous configuration. After that, the separator 35 is dried, and a porous polymer compound with a porous configuration is obtainable.

Next, the electrolytic solution similar to that in the first embodiment is prepared, and is injected into the package members 40, and then an opened portion of a pouched package configured of the package members 40 is sealed by thermal fusion bonding or the like. Finally, the package members 40 are heated while being weighted to bring the separator 35 into close contact with the cathode 33 and the anode 34 with the polymer compound in between. The polymer compound is thereby impregnated with the electrolytic solution, and the polymer compound is gelatinized to form the electrolyte 36. Thus, the nonaqueous electrolyte battery illustrated in FIGS. 5 and 6 is completed.

3. Third Embodiment

A nonaqueous electrolyte battery according to a third embodiment of the present application will be described below. The nonaqueous electrolyte battery according to the third embodiment of the present application is similar to the nonaqueous electrolyte battery according to the second embodiment, except that the electrolyte solution is used as it is, instead of the polymer compound holding the electrolytic solution (the electrolyte 36). Therefore, to avoid repetition of description, configurations different from those in the second embodiment will be described in detail, and configurations similar to those in the second embodiment will not be further described.

(Configuration of Battery)

In the nonaqueous electrolyte battery according to the third embodiment of the present application, instead of the gel electrolyte 36, an electrolytic solution is used. Therefore, the spirally wound electrode body 30 has a configuration not including the electrolyte 36, and the separator 35 is impregnated with the electrolytic solution similar to that in the first embodiment.

(Method of Manufacturing Battery)

The nonaqueous electrolyte battery may be manufactured by, for example, the following method.

First, the cathode active material, the binder, and the conductor are mixed to form a cathode mixture, and the cathode mixture is dispersed in a solvent such as N-methyl-2-pyrrolidone to form cathode mixture slurry. Next, both surfaces of the cathode current collector 33A are coated with the cathode mixture slurry, and the cathode mixture slurry is dried and compression molded to form the cathode active material layer 33B, thereby forming the cathode 33. Then, the cathode lead 31 is bonded to, for example, the cathode current collector 33A by, for example, ultrasonic welding, spot welding, or the like.

Moreover, the anode material and the binder are mixed to form an anode mixture, and the anode mixture is dispersed in a solvent such as N-methyl-2-pyrrolidone or the like to form anode mixture slurry. Next, both surfaces of the anode current collector 34A are coated with the anode mixture slurry, and the anode mixture slurry is dried and compression molded to form the anode active material layer 34B, thereby forming the anode 34. Then, the anode lead 32 is bonded to, for example, the anode current collector 34A by, for example, ultrasonic welding, spot welding, or the like.

Next, the cathode 33 and the anode 34 are spirally wound with the separator 35 in between, and a wound body is sandwiched between the package members 40, and the electrolytic solution similar to that in the first embodiment is injected into the package members 40, and the package members 40 are sealed. Thus, the nonaqueous electrolyte battery is obtained.

4. Fourth Embodiment

Configuration of Battery

Figure 7A:
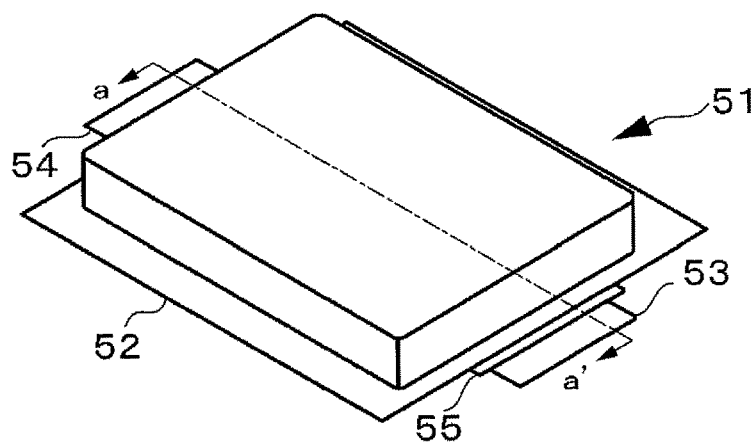
FIGS. 7A, 7B, and 7C are a perspective view, an exploded perspective view, and a perspective view, respectively, where
Figure 7B:
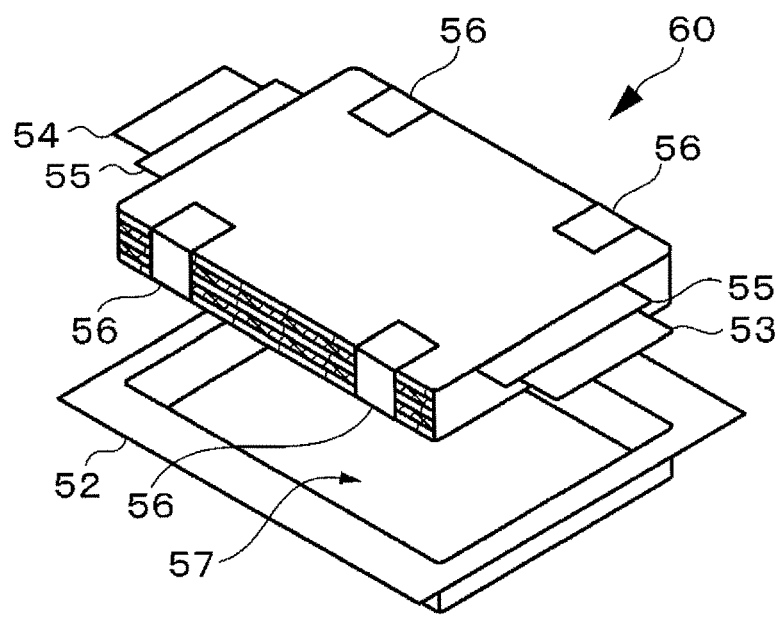
Figure 7C:
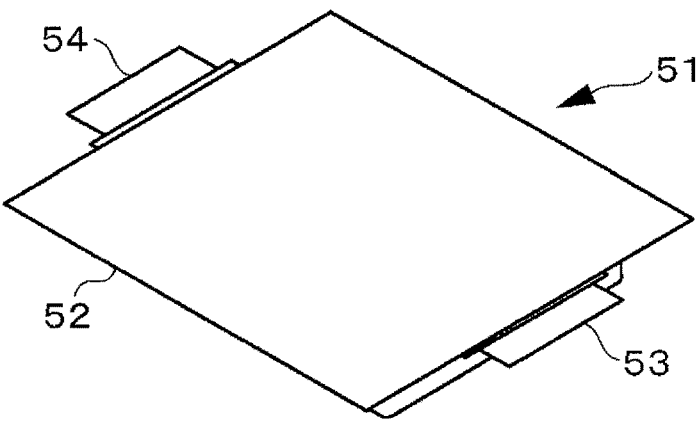

A configuration example of a nonaqueous electrolyte battery according to a fourth embodiment of the present application will be described below. FIG. 7A is a perspective view illustrating an appearance of the nonaqueous electrolyte battery according to the fourth embodiment of the present application. FIG. 7B is an exploded perspective view illustrating a configuration of the nonaqueous electrolyte battery according to the fourth embodiment of the present application. FIG. 7C is a perspective view illustrating a bottom-surface configuration of the nonaqueous electrolyte battery illustrated in FIG. 7A. It is to be noted that, in the following description, in a nonaqueous electrolyte battery 51, a portion where a cathode lead 54 is drawn is referred to as a top section, a portion which faces the top section and from which an anode lead 54 is drawn is referred to as a bottom section, and both side portions sandwiched between the top section and the bottom section are referred to as side sections. Moreover, in electrodes, electrode leads and the like, a length in a direction from one side section to the other side section is referred to as width.

As illustrated in FIGS. 7A to 7C, the nonaqueous electrolyte battery 51 according to the embodiment of the present application is, for example, a chargeable and dischargeable secondary battery, and is configured through encasing a laminate electrode body 60 in laminate films 52, and the cathode lead 53 and the anode lead 54 connected to the laminate electrode body 60 are drawn to outside of the nonaqueous electrolyte battery 51 from portions where the laminate films 52 are sealed together. The cathode lead 53 and the anode lead 54 are drawn from sides facing each other.

(Laminate Electrode Body)

Figure 8A:
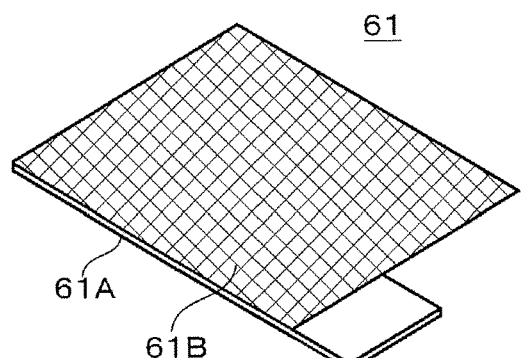
FIGS. 8A to 8D are perspective views, where
Figure 8B:
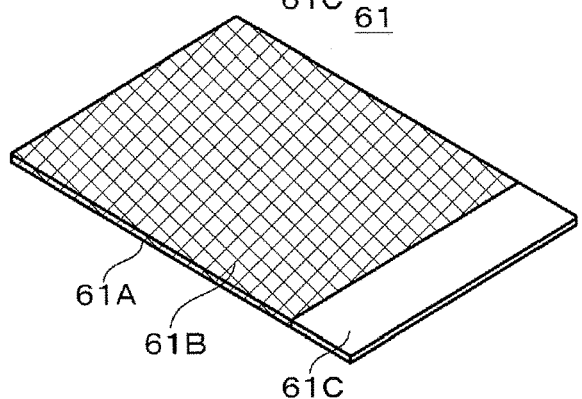
Figure 8C:
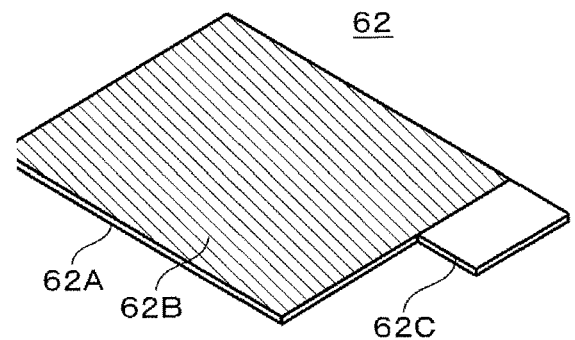
Figure 8D:
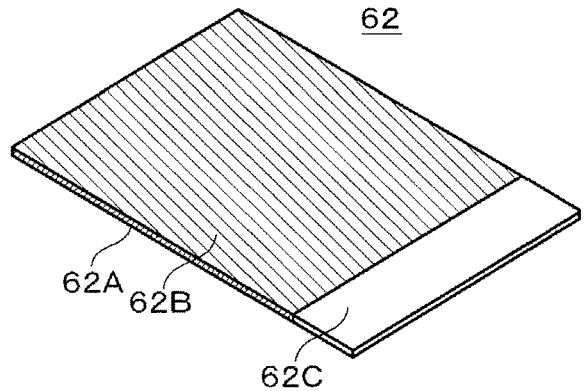
Figure 9A:
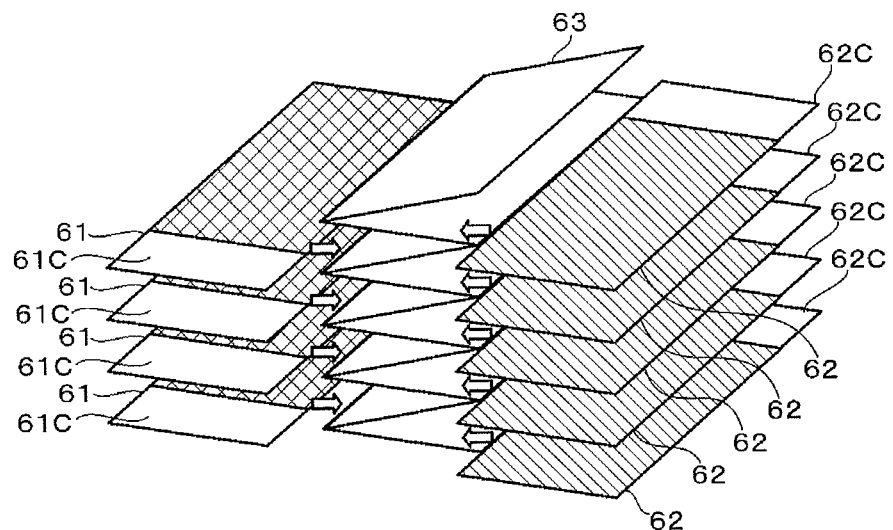
FIGS. 9A, 9B, and 9C are a perspective view, a sectional view, and a perspective view, respectively, where
Figure 9B:
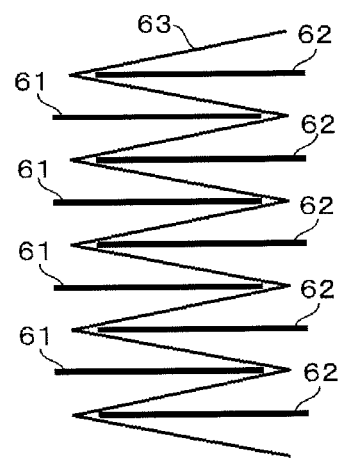
Figure 9C:
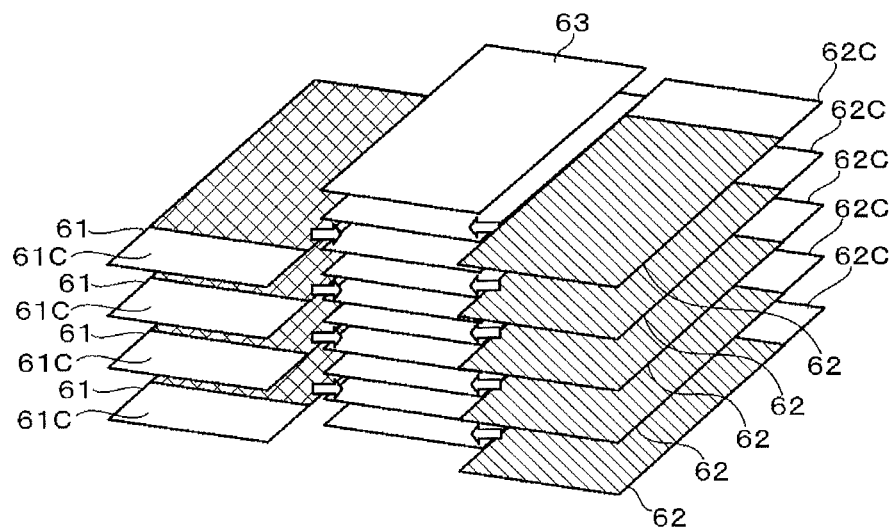

FIGS. 8A and 8B illustrate a configuration example of a cathode forming the laminate electrode body. FIGS. 8C and 8D illustrate a configuration example of an anode forming the laminate electrode body. FIGS. 9A to 9C illustrate a configuration example of the laminate electrode body before being encased in laminate films. The laminate electrode body 60 has a configuration in which rectangular cathodes 61 illustrated in FIG. 8A or 8B and rectangular anodes 62 illustrated in FIG. 8C or 8D are laminated with a separator 63 in between. More specifically, as illustrated in FIGS. 9A and 9B, the cathodes 61 and the anodes 62 are alternately laminated with the zigzag-folded separator 63 in between. It is to be noted that, as illustrated in FIG. 9C, instead of the zigzag-folded separator 63, a plurality of rectangular separators 63 may be used. In the fourth embodiment, the laminate electrode body 60 in which the separator 63, the anode 62, the separator 63, the cathode 61, . . . , the anode 62, and the separator 63 are so laminated as to dispose the separator 63 in each of outermost layers of the laminate electrode body 60 is used. It is to be noted that the laminate electrode body 60 illustrated in FIGS. 9A and 9B is an example using the cathodes 61 illustrated in FIG. 8B and the anodes 62 illustrated in FIG. 8D. Although not illustrated, instead of the cathodes 61 illustrated in FIG. 8B, the cathodes 61 illustrated in FIG. 8A may be used, and instead of the anodes 62 illustrated in FIG. 8D, the anodes 62 illustrated in FIG. 8B may be used.

Figure 10:
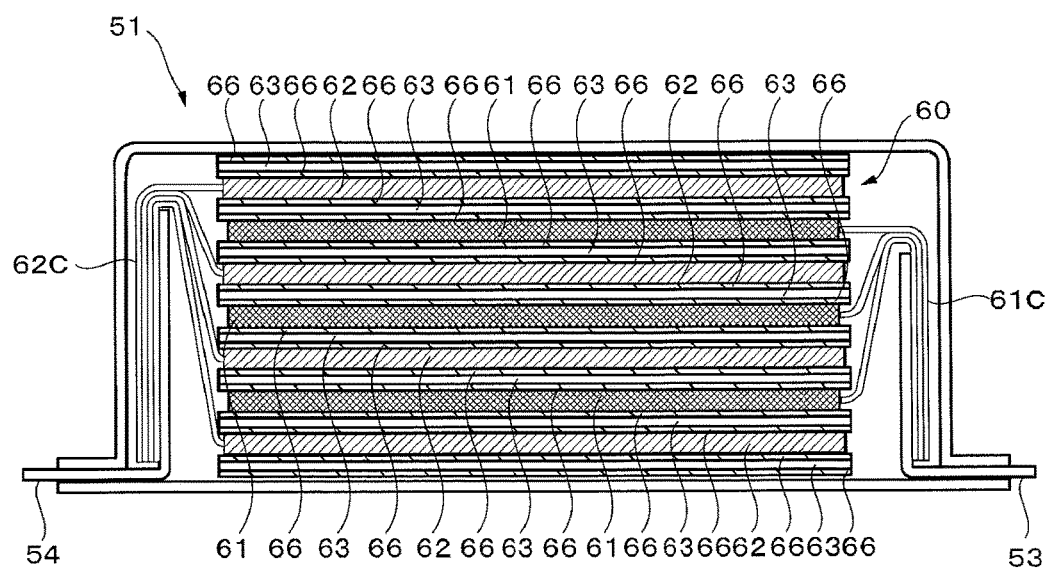
FIG. 10 is a sectional view illustrating a section a-a' of the nonaqueous electrolyte battery in FIG. 7A.

FIG. 10 is a sectional view illustrating a section a-a' of the nonaqueous electrolyte battery in FIG. 7A. As illustrated in FIG. 10, in the nonaqueous electrolyte battery 51, the separator 63 and the cathode 61 are disposed with an electrolyte 66 in between, and the separator 63 and the anode 62 are disposed with the electrolyte 66 in between. The separator 63 and the cathode 61 may be bonded to each other with the electrolyte 66 in between, and the separator 63 and the anode 62 may be bonded to each other with the electrolyte 66 in between.

Cathode tabs 61C extending from two or more of the cathodes 61 and anode tabs 62 extending from two or more of the anodes 62 are drawn from the laminate electrode body 60. A laminate of a plurality of cathode tabs 61 is so bent as to allow a section thereof to be formed in a substantially "U"-letter like shape while a bent portion thereof has an appropriate sag. The cathode lead 53 is connected to an end of the laminate of the cathode tabs 61 by ultrasonic welding, resistance welding, or the like.

Moreover, as with the cathodes 61, a laminate of a plurality of anode tabs 62C is so bent as to allow a section thereof to be formed in a substantially "U"-letter like shape while a bent portion thereof has an appropriate sag. The anode lead 54 is connected to an end of the laminate of the anode tabs 62C by ultrasonic welding, resistance welding, or the like.

(Cathode Lead)

As the cathode lead 53 connected to the cathode tabs 61C, for example, a metal lead body made of aluminum (Al) or the like may be used. In the large-capacity nonaqueous electrolyte battery 51 according to the embodiment of the present application, to obtain a large current, the cathode lead 53 has a larger width and a larger thickness, compared to related art.

The cathode lead 53 preferably has a thickness of about 150 μm to about 250 μm both inclusive. If the thickness of the cathode lead 53 is less than about 150 μm, a current amount to be obtained is reduced. If the thickness of the cathode lead 53 exceeds about 250 μm, the cathode lead 53 is too thick; therefore, sealing performance of the laminate films 52 around a position where the cathode lead 53 is drawn is reduced, thereby easily causing entry of water.

It is to be noted that a sealant 55 which is an adhesive film for improving adhesion between the laminate films 52 and the cathode lead 53 is provided to a part of the cathode lead 53. The sealant 55 is made of a resin material with high adhesion to a metal material, and, for example, in the case where the cathode lead 53 is made of the above-described metal material, the sealant 55 is preferably made of a polyolefin resin such as polyethylene, polypropylene, modified polyethylene, or modified polypropylene.

The sealant 55 preferably has a thickness of about 70 μm to about 130 μm both inclusive. If the thickness of the sealant 55 is less than about 70 μm, adhesion between the cathode lead 53 and the laminate films 52 is degraded, and if the thickness of the sealant 55 exceeds about 130 μm, a flow amount of a molten resin during thermal fusion bonding is large, and this is not preferable in a manufacturing process.

(Anode Lead)

As the anode lead 54 connected to the anode tabs 62C, for example, a metal lead body made of nickel (Ni) or the like may be used. In the large-capacity nonaqueous electrolyte battery according to the embodiment of the present application, to obtain a large current, the anode lead 54 has a larger width and a larger thickness, compared to related art. The width of the anode lead 54 is preferably substantially equal to a width of the anode tab 62C which will be described later.

The width of the anode lead 54 may be arbitrarily determined; however, since a large current is obtained, a width wb of the anode lead 54 is preferably about 50% to about 100% both inclusive of a width Wb of the anode 62.

As with the cathode lead 53, the anode lead 54 preferably has a thickness of about 150 μm to about 250 μm both inclusive. If the thickness of the anode lead 54 is less than about 150 μm, a current amount to be obtained is reduced. If the thickness of the anode lead 54 exceeds about 250 μm, the anode lead 54 is too thick; therefore, sealing performance of the laminate films 52 around a position where the anode lead 54 is drawn is reduced, thereby easily causing entry of water.

As with the cathode lead 53, the sealant 55 which is an adhesive film for improving adhesion between the laminate films 52 and the anode lead 54 is provided to a part of the anode lead 54.

(Cathode)

As illustrated in FIGS. 8A and 8B, the cathode 61 is configured through forming cathode active material layers 61B including a cathode active material on both surfaces of a cathode current collector 61A. As the cathode current collector 61A, for example, metal foil such as aluminum (Al) foil, nickel (Ni) foil, or stainless steel (SUS) foil may be used.

Moreover, the cathode tabs 61C integrally extend from the cathode current collector 61A. The laminate of the plurality of cathode tabs 61C is so bent as to allow a section thereof to be formed in a substantially "U"-letter like shape, and the cathode lead 53 is connected to an end of the laminate of the cathode tabs 61 by ultrasonic welding, resistance welding, or the like.

The cathode active material layer 61B is formed on a rectangular main surface portion of the cathode current collector 61A. An exposed extending portion of the cathode current collector 61A has a function as the cathode tab 61c which is a connection tab allowing the cathode lead 53 to be connected thereto. The width of the cathode tab 61C may be arbitrarily determined. In particular, when the cathode lead 53 and the anode lead 54 are drawn from a same side, it is necessary for the width of the cathode tab 61C to be less than about 50% of the width of the cathode 61. Such a cathode 61 is obtained through forming the cathode active material layers 61B so as to have an exposed portion on one side of the rectangular cathode current collector 61A, and cutting out an unnecessary part of the exposed portion.

The configuration of the cathode active material layer 61B is similar to the cathode active material layer 21B according to the first embodiment. Namely, the cathode active material layer 61B includes one or more kinds of cathode materials capable of inserting and extracting lithium as cathode active materials, and may include any other material such as a binder or a conductor, if necessary. The cathode material, the binder, and the conductor are similar to those in the first embodiment.

(Anode)

As illustrated in FIGS. 8C and 8D, the anode 62 is configured through forming anode active material layers 62B on both surfaces of an anode current collector 62A. The anode current collector 62A is configured of, for example, metal foil such as copper (Cu) foil, nickel (Ni) foil, or stainless steel (SUS) foil.

Moreover, the anode tabs 62C integrally extend from the anode current collector 62A. The laminate of the plurality of the anode tabs 62C is so bent as to allow a section thereof to be formed in a substantially "U"-letter like shape, and the anode lead 54 is connected to an end of the laminate of the anode tabs 62C by ultrasonic welding, resistance welding, or the like.

The anode active material layer 62B is formed on a rectangular main surface portion of the anode current collector 62A. An exposed extending portion of the anode current collector 62A has a function as the anode tab 62C which is a connection tab allowing the anode lead 54 to be connected thereto. The width of the anode tab 62C may be arbitrarily determined. In particular, when the cathode lead 53 and the anode lead 54 are drawn from a same side, it is necessary for the width of the anode tab 62C to be less than about 50% of the width of the anode 62. Such an anode 62 is obtained through forming the anode active material layers 62B so as to have an exposed portion on one side of the rectangular anode current collector 61A, and cutting out an unnecessary part of the exposed portion.

(Anode Active Material Layer)

The configuration of the anode active material layer 62B is similar to the anode active material layer 22B according to the first embodiment. Namely, the anode active material layer 62B includes one or more kinds of anode materials capable of inserting and extracting lithium as anode active materials, and may include any other material such as a binder or a conductor, if necessary. The anode material, the binder, and the conductor are similar to those in the first embodiment.

The electrolyte 66, the separator 63, the laminate film 52 are similar to the electrolyte 36, the separator 35, and the package member 40 in the second embodiment.

The laminate electrode body 60 is encased in the above-described laminate films 52. At this time, the cathode lead 53 connected to the cathode tabs 61C and the anode lead 54 connected to the anode tabs 62C are drawn from portions where the laminate films 52 are sealed together to outside of the nonaqueous electrolyte battery 51. As illustrated in FIG. 7B, a laminate electrode body containing section 57 formed by deep drawing in advance is provided in the laminate film 52. The laminate electrode body 60 is contained in the laminate electrode body containing section 57.

In the embodiment of the present application, a peripheral portion of the laminate electrode body 60 are heated by a heater head to seal, by thermal fusion bonding, the laminate films 52 covering the laminate electrode body 60 from its both sides. In particular, around a portion where a lead is drawn, the laminate films 52 are preferably bonded by thermal fusion bonding with a heater head provided with a cutout shape to round away from the cathode lead 53 and the anode lead 54, because a battery with a small load on the cathode lead 53 and the anode lead 54 is allowed to be formed. By this method, a short circuit during formation of the battery is preventable.

(Method of Manufacturing Battery)

The above-described nonaqueous electrolyte battery 51 may be formed by, for example, the following process.

(Formation of Cathode)

The cathode material, the conductor, and the binder are mixed to form a cathode mixture, and then the cathode mixture is dispersed in a solvent such as N-methyl-2-pyrrolidone to form cathode mixture slurry. Next, both surfaces of the strip-like cathode current collector 61A are coated with the cathode mixture slurry, and the cathode mixture slurry is dried, and compression molded by a roller press or the like to form the cathode active material layers 61B, thereby forming a cathode sheet. The cathode sheet is cut into a predetermined dimension to form the cathode 61. At this time, the cathode active material layers 61B are so formed as to allow a portion of the cathode current collector 61A to be exposed. The exposed portion of the cathode current collector 61A is the cathode tab 61C. Moreover, if necessary, an unnecessary part of the exposed portion of the cathode current collector 61A may be cut out to form the cathode tab 61C. Thus, the cathode 61 integral with the cathode tab 61C is obtained.

(Formation of Anode)

The anode material and the binder are mixed to form an anode mixture, and then the anode mixture is dispersed in a solvent such as N-methyl-2-pyrrolidone to form anode mixture slurry. Next, the anode current collector 62A is coated with the anode mixture slurry, and the anode mixture slurry is dried, and compression molded by a roller press or the like to form the anode active material layer 62B, thereby forming an anode sheet. The anode sheet is cut into a predetermined dimension to form the anode 62. At this time, the anode active material layer 62B is so formed as to allow a portion of the anode current collector 62A to be exposed. The exposed portion of the anode current collector 62A is the anode tab 62C. Moreover, if necessary, an unnecessary part of the exposed portion of the anode current collector 62C may be cut out to form the cathode tab 62C. Thus, the anode 62 integral with the anode tab 62C is obtained.

(Formation of Electrolyte 66)

One main surface or both surfaces of the separator 63 are coated with a polymer compound. Examples of the polymer compound applied to the separator 63 include polymers including vinylidene fluoride as a component, i.e., a homopolymer, a copolymer, and a multicomponent copolymer. More specifically, examples of the polymer compound include polyvinylidene fluoride, a binary copolymer including vinylidene fluoride and hexafluoropropylene as components, and a ternary copolymer including vinylidene fluoride, hexafluoropropylene, and chlorotrifluoroethylene as components. It is to be noted that the polymer compound may include one or more kinds of other polymer compounds together with the above-described polymer including vinylidene fluoride. It is to be noted that the polymer compound applied to the separator 63 holds an electrolytic solution similar to that in the first embodiment to form the electrolyte 66.

As the polymer compound on the separator 63, for example, a porous polymer compound may be formed by the following way. First, a solution prepared through dissolving the polymer compound in a first solvent made of a polar organic solvent such as N-methyl-2-pyrrolidone, γ-butyrolactone, N,N-dimethylacetamide, or N,N-dimethyl sulfoxide, and then the separator 63 is coated with the solution. Next, the separator 63 coated with the above-described solution is immersed in a second solvent, such as water, ethyl alcohol, or propyl alcohol, which has compatibility with the above-described polar organic solvent and is a poor solvent with respect to the above-described polymer compound. At this time, solvent exchange occurs, and phase separation by spinodal decomposition occurs to allow the polymer compound to have a porous configuration. After that, the separator 63 is dried, and a porous polymer compound with a porous configuration is obtained.

(Laminating Process)

Next, as illustrated in FIGS. 9A and 9B, the cathodes 61 and the anodes 62 are alternately laminated with the zigzag-folded separator 63 in between. For example, a predetermined number of cathodes 61 and a predetermined number of anodes 62 are laminated in order of the separator 63, the anode 62, the separator 63, the cathode 61, the separator 63, the anode 62, . . . , separator 63, anode 62, and separator 63. Next, the cathodes 61, the anodes 62, and the separator 63 are fixed while being pressed so as to be brought into close contact with one another to form the laminate electrode body 60. To more firmly fix the laminate electrode body 60, a fixing member 56 such as adhesive tape may be used. To fix the laminate electrode body 60 with use of the fixing member 56, for example, the fixing member 56 is provided to both side sections of the laminate electrode body 60.

Next, a plurality of cathode tabs 61C and a plurality of anode tabs 62C are so bent as to allow sections thereof to be formed in a substantially "U"-letter like shape. Electrode tabs are bent by, for example, the following way.

(First Bending Process into "U"-Letter Like Shape on Tabs)

The plurality of cathode tabs 61C drawn from the laminated cathodes 61 and the plurality of anode tabs 62C drawn from the laminated anodes 62 are so bent as to allow sections thereof to be formed in a substantially "U"-letter like shape. A first bending process into a "U"-letter like shape is to bend the cathode tabs 61C and the anode tabs 62C with an optimal "U"-letter like shape in advance. Since the cathode tabs 61C and the anode tabs 62C have the optimal "U"-letter like shape in advance, less stress such as tensile stress may be applied to the cathode tabs 61C and the anode tabs 62C when the cathode tabs 61C and the anode tabs 62C after being connected to the cathode lead 53 and the anode lead 54, respectively, are bent to form "U"-letter like shaped bent sections.

FIGS. 11A to 11E are side views for describing the first bending process into a "U"-letter like shape on the anode tabs 62C. Referring to FIGS. 11A to 11E, respective processes performed on the anode tabs 62C will be described below. It is to be noted that the first bending process is performed for the cathode current collector 61A in a similar manner.

Figure 11A:
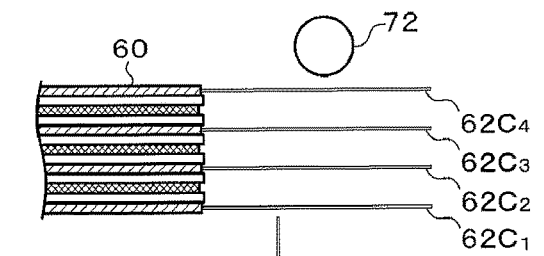
FIGS. 11A to 11E are process diagrams illustrating a bending process into a "U"-letter like shape on electrode tabs of a laminate electrode body in an embodiment of the present application.

First, as illustrated in FIG. 11A, the laminate electrode body 60 is disposed on a work set table 70a having a thin plate 71 for bending into a "U"-letter like shape. The thin plate 71 is disposed to protrude from the work set table 70a by a length slightly smaller than the thickness of the laminate electrode body 60, specifically at least by a length smaller than the total thickness of the plurality of anode tabs $62C_1$ to $62C_4$. With such a configuration, a bending outer portion of the anode tab $62C_4$ is disposed within a range of the thickness of the laminate electrode body 60; therefore, an increase in thickness of the nonaqueous electrolyte battery 51 and appearance defect in the nonaqueous electrolyte battery 51 are preventable.

Figure 11B:
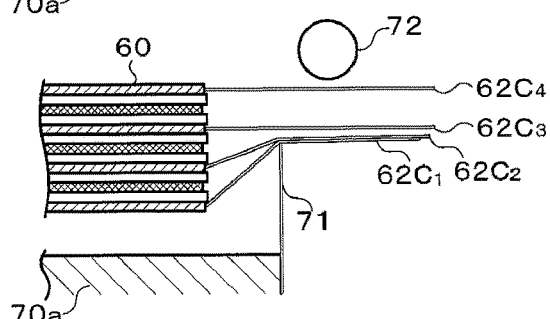

Next, as illustrated in FIG. 11B, the laminate electrode body 60 is moved down, or the work set table 70a is moved up. At this time, the smaller a gap between the laminate electrode body 60 and the thin plate 71 is, the more space efficiency of the nonaqueous electrolyte battery 51 is improved; therefore, for example, the gap between the laminate electrode body 60 and the thin plate 71 is gradually reduced.

Figure 11C:
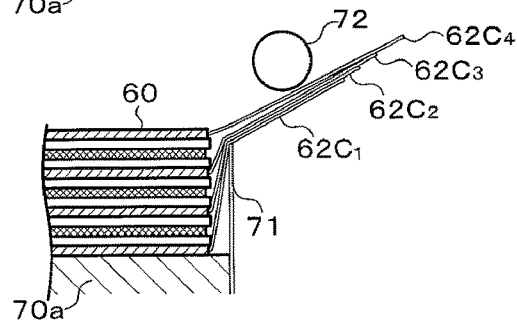
Figure 11D:
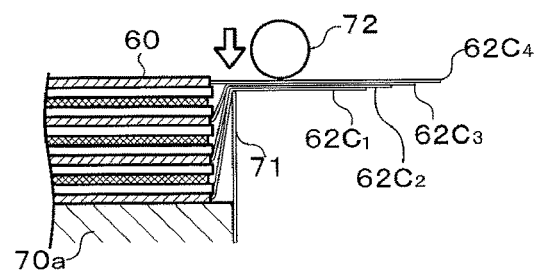
Figure 11E:
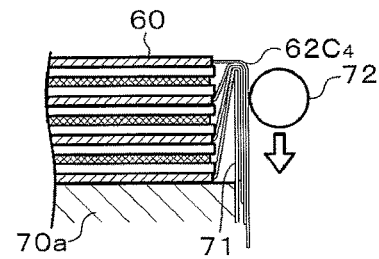

As illustrated in FIG. 11C, the laminate electrode body 60 is placed on the work set table 70a, and bent portions are formed in the anode tabs 62C, and then, as illustrated in FIGS. 11D and 11E, a roller 72 moves down to bend the anode tabs 62C in a "U"-letter like shape.

The thin plate 71 has a thickness of about 1 mm or less, for example, preferably about 0.5 mm. For the thin plate 71, a material having strength necessary to form the plurality of the cathode tabs 61C or the plurality of the anode tabs 62C in a bent shape in spite of such a small thickness may be used. The strength necessary for the thin plate 71 varies depending on the number of laminated cathodes 61 and the number of laminated anode 62, hardness of the materials used for the cathode tabs 61C and the anode tabs 62C, and the like. The thinner the thin plate 71 is, the more a curvature of the anode tab $62C_1$ located on an innermost side of the bent laminate of the anode tabs 62C is allowed to be reduced, and the more a space necessary to bend the anode tabs 62C is allowed to be reduced accordingly; therefore, the thin plate 71 is preferably thinner. For the thin plate 71, for example, stainless steel (SUS), reinforced plastic materials, plated steel materials, and the like may be used.

(Cutting Process on Exposed Portion of Current Collector)

Next, ends of the anode tabs 62C in which "U"-letter like shaped bent portions have been formed are cut almost evenly. In a cutting process on exposed portions of current collectors, "U"-letter like shaped bent portions are formed into an optimal shape in advance, and surplus portions of the cathode tabs 61C and the anode tubs 62C are cut out in conformity with the optimal "U"-letter like shape. FIGS. 12A to 12E are side views for describing a cutting process on the anode tabs 62C. It is to be noted that the cutting process on exposed portions of current collectors is performed for the cathode tabs 61C in a similar manner.

Figure 12A:
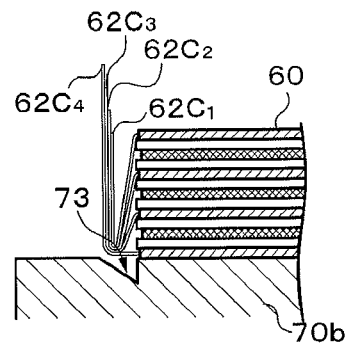
FIGS. 12A to 12E are process diagrams illustrating the bending process into a "U"-letter like shape on the electrode tabs of the laminate electrode body in the embodiment of the present application.

As illustrated in FIG. 12A, the laminate electrode body 60 in which the "U"-letter like shaped bent portions are formed in the first bending process is flipped from top to bottom, and the laminate electrode body 60 is fixed on a work set table 70*b* having a clearance section 73 for current collector sagging.

Figure 12B:
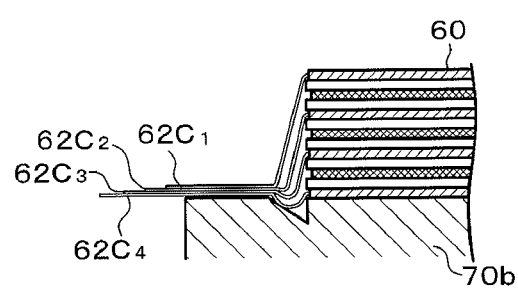

Next, as illustrated in FIG. 12B, end portions ranging from the "U"-letter like shaped bent portions to the ends of the anode tabs 62C$_1$ to 62C$_4$ in which the "U"-letter like shaped bent portions are formed are deformed in a substantially "L"-letter like shape along the work set table 70*b*. At this time, since a shape necessary to reform the "U"-letter like shaped bent portion is maintained, a larger sag is formed in the anode tab 62C$_4$ in an outermost portion of the bent laminate of the bent anode tabs 62C. Since such a sag enters the clearance section 73 for current collector sagging of the work set table 70*b*, the anode tabs 62C$_1$ to 62C$_4$ are allowed to be deformed without stress. It is to be noted that the anode tabs 62C$_1$ to 62C$_4$ may be deformed while the end portions of the anode tabs 62C$_1$ to 62C$_4$ is fixed.

Figure 12C:
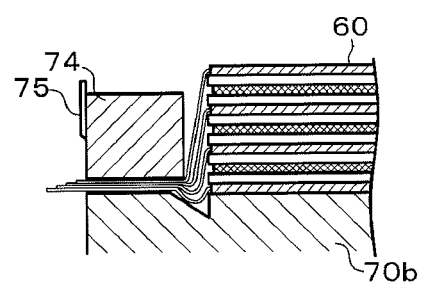
Figure 12D:
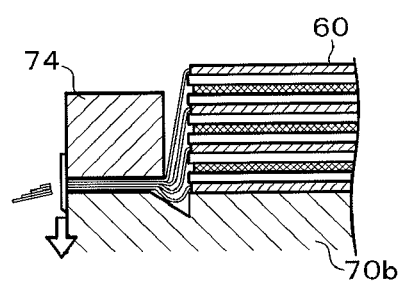
Figure 12E:
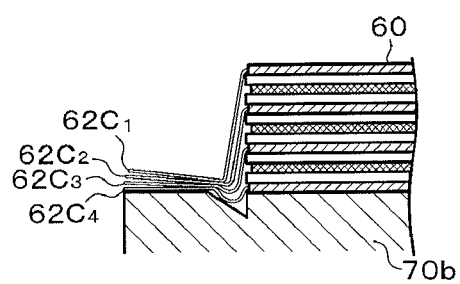

Next, as illustrated in FIG. 12C, the anode tabs 62C$_1$ to 62C$_4$ are pressed against the work set table 70*b* with a current collector retainer 74, and then, as illustrated in FIGS. 12D and 12E, the ends of the anode tabs 62C$_1$ to 62C$_4$ are evenly cut by, for example, a cutting blade 75 disposed along the current collector retainer 74. At least surplus portions at the ends of the anode tabs 62C$_1$ to 62C$_4$ are cut at a position which allows the ends of the anode tabs 62C$_1$ to 62C$_4$ to be located within a range of the thickness of the laminate electrode body 60 when the anode tabs 62C$_1$ to 62C$_4$ are bent into the "U"-letter like shape again.

(Electrode Lead Connecting Process)

Figure 13A:
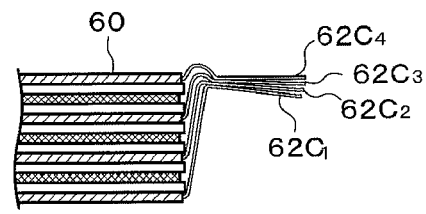
FIGS. 13A to 13C are process diagrams illustrating a process of connecting the electrode tabs of the laminate electrode body to an electrode lead in the embodiment of the present application.
Figure 13B:
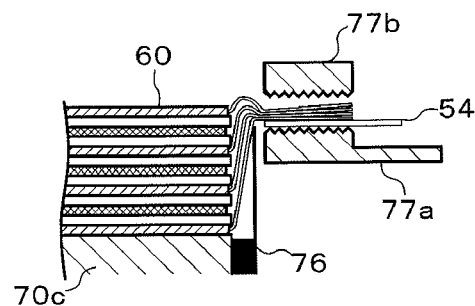
Figure 13C:
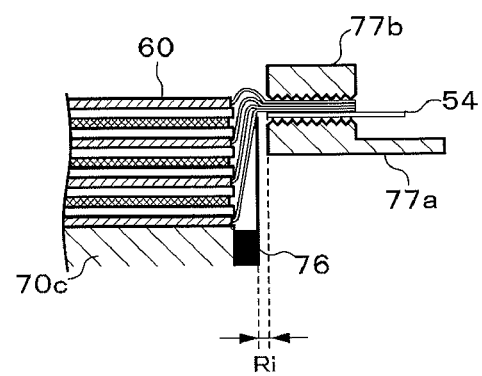

Next, the anode tabs 62C$_1$ to 62C$_4$ are connected to the anode lead 54. In a tab connecting process, the cathode tabs 61C and the anode tabs 62C are fixed to the cathode lead 53 and the anode lead 54, respectively, while the optimal "U"-letter like shape formed by the first bending process is maintained. Thus, the cathode tabs 61C and the cathode lead 53 are electrically connected to each other, and the anode tabs 62C and the anode lead 54 are electrically connected to each other. FIGS. 13A to 13C are side views for describing a process of connecting the anode tabs 62C$_1$ to 62C$_4$ to the anode lead 54. It is to be noted that, although not illustrated, the anode lead 54 is provided with the sealant 55 in advance. The cathode tabs 61C and the cathode lead 53 are connected to each other in a similar manner.

As illustrated in FIG. 13A, the laminate electrode body 60 in which the surplus portions at the ends of the anode tabs 62C$_1$ to 62C$_4$ are cut out in a cutting process on the exposed portions of the current collectors is flipped from top to bottom again. Next, as illustrated in FIG. 13B, the laminate electrode body 60 is fixed on a work set table 70*c* having a plate 76 for maintaining a shape of a current collector. An end of the plate 76 is located at an inner bending side of the anode tab 62C$_1$, and while the bent shapes of the anode tabs 62C$_1$ to 62C$_4$ are maintained, an influence caused by an external factor such as ultrasonic vibration generated by a fixing apparatus is prevented.

Next, as illustrated in FIG. 13C, the anode tabs 62C$_1$ to 62C$_4$ and the anode lead 54 are fixed to each other by, for example, an ultrasonic welding. In the ultrasonic welding, for example, an anvil 77*a* provided below the anode tabs 62C$_1$ to 62C$_4$ and a horn 77*b* provided above the anode tabs 62C$_1$ to 62C$_4$ are used. The anode tabs 62C$_1$ to 62C$_4$ are set on the anvil 77*a* in advance, and the horn 77*b* moves down to sandwich the anode tabs 62C$_1$ to 62C$_4$ and the anode lead 54 between the anvil 77*a* and the horn 77*b*. Then, ultrasonic vibration is applied to the anode tabs 62C$_1$ to 62C$_4$ and the anode lead 54 by the anvil 77*a* and the horn 77*b*. Thus, the anode tabs 62C$_1$ to 62C$_4$ and the anode lead 54 are fixed to each other.

It is to be noted that, in the tab connecting process, it may be preferable that the anode lead 54 be connected to the anode tabs 62C so as to form an inner bending margin R1 in FIG. 13C. It is to be noted that the inner bending margin Ri is equal to or larger than the thickness of each of the cathode lead 53 and the anode lead 54.

Next, the anode lead 54 fixed to the anode tabs 62C$_1$ to 62C$_4$ is bent into a predetermined shape. FIGS. 14A to 14E are side views for describing a tab bending process on the electrode lead 54. The tab bending process and the electrode lead connecting process are performed on the cathode tabs 61C and the cathode lead 53 in a similar manner.

Figure 14A:
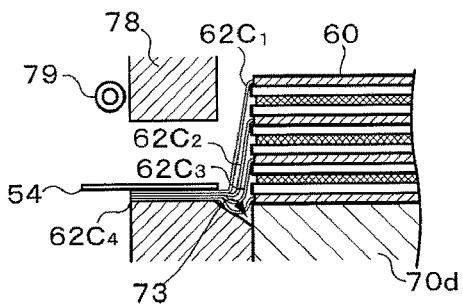
FIGS. 14A to 14E are process diagrams illustrating a bending process on the electrode lead connected to the laminate electrode body in the embodiment of the present application.

As illustrated in FIG. 14A, the laminate electrode body 60 in which the anode tabs 62C$_1$ to 62C$_4$ and the anode lead 54 are fixed to each other by the connecting process is flipped from top to bottom again, and the laminate electrode body 60 is fixed on a work set table 70*d* having a clearance section 73 for current collector sagging. A connection portion between the anode tabs 62C$_1$ to 62C$_4$ and the anode lead 54 is placed on a tab bending table 78*a*.

Figure 14B:
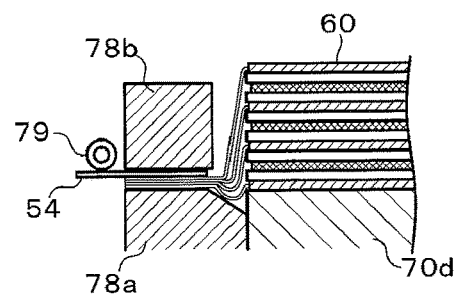
Figure 14C:
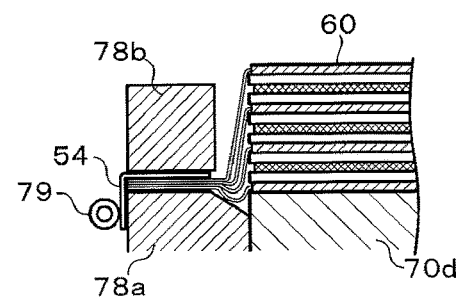

Next, as illustrated in FIG. 14B, the connection portion between the anode tabs 62C$_1$ to 62C$_4$ and the anode lead 54 is pressed by a block 78*b*, and as illustrated in FIG. 14C, a roller 79 moves down to bend the anode lead 54 protruding from the tab bending table 78*a* and the block 78*b*.

(Second Bending Process into "U"-Letter Like Shape on Tabs)

Figure 14D:
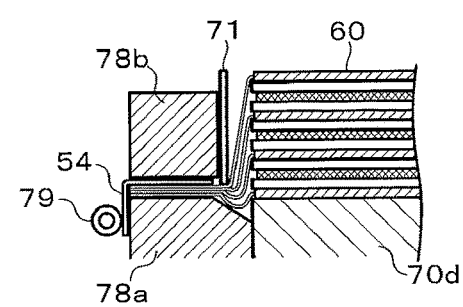
Figure 14E:
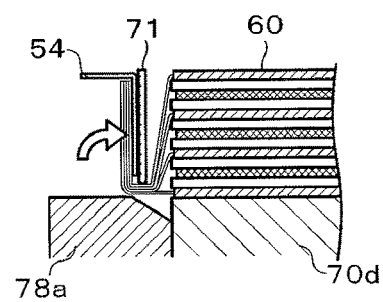

Next, as illustrated in FIG. 14D, the thin plate 71 is disposed to be sandwiched between the laminate electrode body 60 and the block 78*b* pressing the anode tabs 62C$_1$ to 62C$_4$. Then, as illustrated in FIG. 14E, the anode tabs 62C$_1$ to 62C$_4$ are bent at about 90° along the "U"-letter like shape formed in the first bending process illustrated in FIGS. 11A to 11E to form the laminate electrode body 60. At this time, as described above, the anode lead 54 and the anode tabs 62C are connected to each other so as to form the inner bending margin Ri as illustrated in FIG. 13C. Thus, in a second bending process into a "U"-letter like shape on the tabs, the anode tabs 62C are allowed to be bent in a direction substantially perpendicular to an electrode surface while keeping the anode lead 54 from coming in contact with the laminated cathodes 61 and anodes 62.

At this time, the anode lead 54 is preferably bent together with the sealant 55 thermally welded thereto in advance. Since a bent portion of the anode lead 54 is coated with the sealant 55, the anode lead 54 and the laminate films 52 are so configured as not to come into direct contact with each other. With this configuration, risks of rubbing of a resin layer in the laminate film 52 and the anode lead 54 against each other, damage to the laminate film 52, a short circuit between the laminate film 52 and a metal layer due to long-term vibration, an impact, or the like may be significantly reduced. Thus, the laminate electrode body 60 is formed.

(Encasing Process)

Then, the formed laminate electrode body 60 is encased in the laminate films 52. Side sections on one side of the laminated films 52, and top sections and bottom sections of the laminate films 52 are heated by a heater head to allow the laminate films 52 to be bonded together by thermal fusion bonding. Top portions and bottom portions where the cathode lead 53 and the anode lead 54 are drawn of the laminate films 52 are heated by, for example, a heater head provided with a cutout shape to bond the laminate films 52 together by thermal fusion bonding.

Next, an electrolytic solution similar to that in the first embodiment is injected from an opening on side sections on the other side which are not yet bonded by thermal fusion bonding of the laminate films 52. Finally, the side sections on the side where the electrolytic solution is injected of the laminate films 52 are bonded by thermal fusion bonding to seal the laminate electrode body 60 in the laminate films 52. After that, heat pressing is performed on the laminate electrode body 60 through pressing and heating the laminate electrode body 60 from outside of the laminate films 52. Accordingly, the polymer compound is impregnated with the electrolytic solution, and the polymer compound is gelatinized to form the electrolyte 66 in which the polymer compound holds the electrolytic solution. It is to be noted that, in the case where the polymer compound is a porous polymer compound, in the electrolyte 66, the porous polymer compound may be swelled with the electrolytic solution at the time of heat pressing; however, holes may be maintained without deforming a hole structure of the porous polymer compound. Thus, the nonaqueous electrolyte battery is completed.

5. Fifth Embodiment

Example of Battery Module

A fifth embodiment of the present application will be described below. In the fifth embodiment, a battery unit using the above-described nonaqueous electrolyte battery, and a battery module configured of the battery units will be described below. It is to be noted that, in the fifth embodiment, a case where the nonaqueous electrolyte battery according to the fourth embodiment in which the cathode lead 53 and the anode lead 53 are drawn from different sides is used will be described.

(Battery Unit)

Figure 15A:
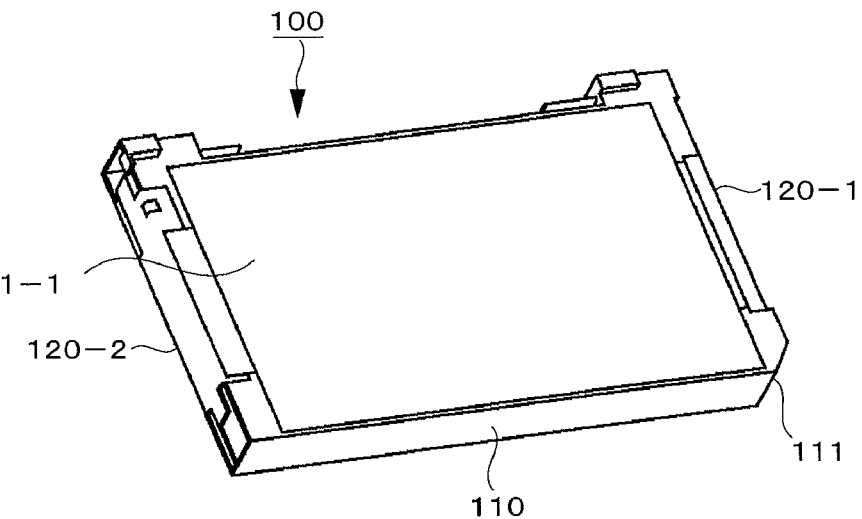
FIGS. 15A and 15B are perspective views illustrating a configuration of a battery unit using nonaqueous electrolyte batteries according to an embodiment of the present application.
Figure 15B:
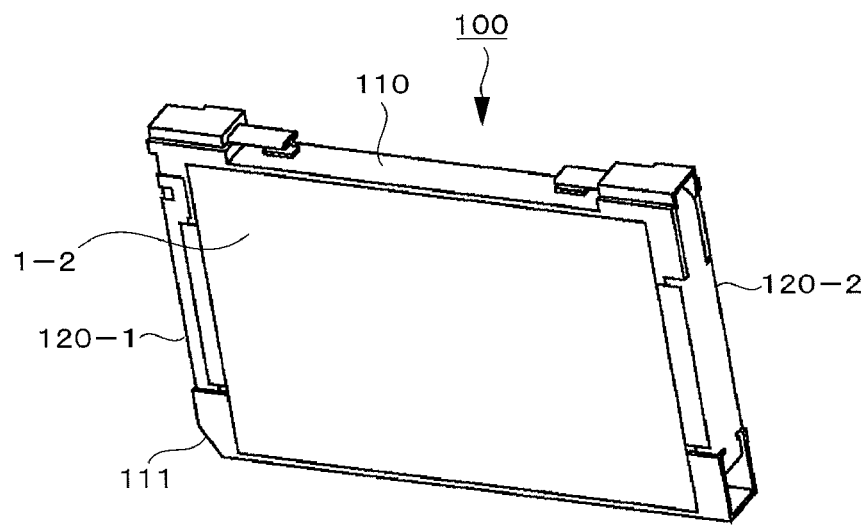

FIGS. 15A and 15B are perspective views illustrating a configuration example of a battery unit using the nonaqueous electrolyte battery according to an embodiment of the present application. FIGS. 15A and 15B illustrate a battery unit 100 viewed from different sides, and a side mainly illustrated in FIG. 15A is referred to as a front side of the battery unit 100, and a side mainly illustrated in FIG. 15B is referred to as a back side of the battery unit 100. As illustrated in FIGS. 15A and 15B, the battery unit 100 includes nonaqueous electrolyte batteries 1-1 and 1-2, a bracket 110, and bus bars 120-1 and 120-2. The nonaqueous electrolyte batteries 1-1 and 1-2 may be, for example, nonaqueous electrolyte batteries according to the fourth embodiment.

The bracket 110 is a supporting tool for securing strength of the nonaqueous electrolyte batteries 1-1 and 1-2. The nonaqueous electrolyte battery 1-1 is mounted on a front side of the bracket 110 and the nonaqueous electrolyte battery 1-2 is mounted on a back side of the bracket 110. It is to be noted that the bracket 110 has substantially the same shape when viewed from the front side and the rear side, and a chamfer 111 is formed at one corner on a lower side. A side where the chamfer 111 is seen on a lower right side is referred to as the front side, and a side where the chamfer 111 is seen on a lower left side is referred to as the back side.

The bus bars 120-1 and 120-2 are metal members with a substantially "L"-letter like shape, and are mounted on both side surfaces of the bracket 110 in such a manner that connection portions connected to tabs of the nonaqueous electrolyte batteries 1-1 and 1-2 are disposed on side surfaces of the bracket 110, and terminals connected to the outside of the battery unit 100 are disposed on a top surface of the bracket 110.

Figure 16:
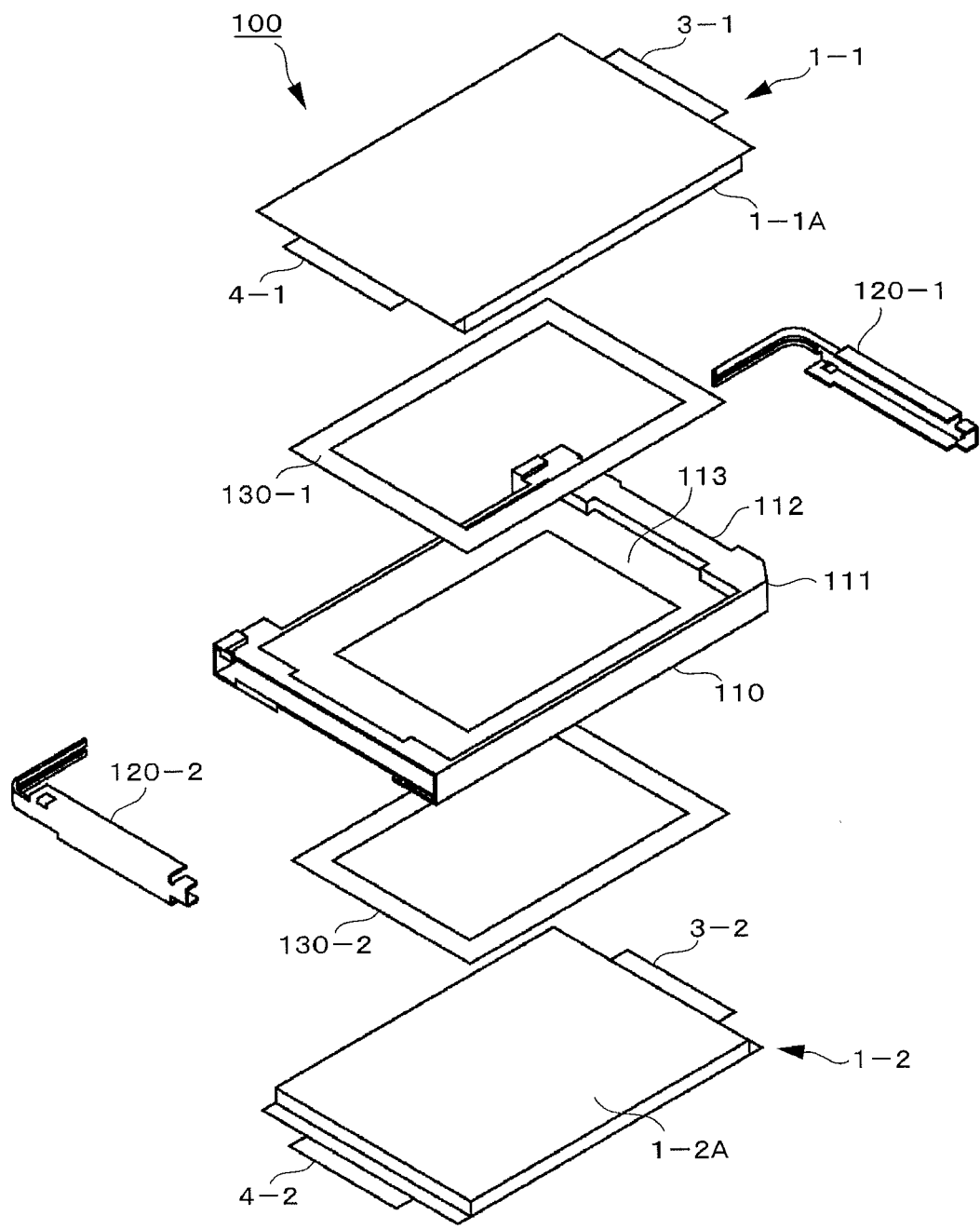
FIG. 16 is an exploded perspective view illustrating a configuration of the battery unit using the nonaqueous electrolyte batteries according to the embodiment of the present application.

FIG. 16 is an exploded perspective view illustrating the battery unit 100. A top side in FIG. 16 is referred to as a front side of the battery unit 100, and a bottom side in FIG. 16 is referred to as a back side of the battery unit 100. Hereinafter, a protruding portion where a laminate electrode body is contained of the nonaqueous electrolyte battery 1-1 is referred to as a battery main body 1-1A. Similarly, a protruding portion where a laminate electrode body is contained of the nonaqueous electrolyte battery 1-2 is referred to as a battery main body 1-2A.

The nonaqueous electrolyte batteries 1-1 and 1-2 are so mounted in the bracket 110 to allow protruding sides of the battery main bodies 1-1A and 1-2A to face each other. In other words, the nonaqueous electrolyte battery 1-1 is mounted in the bracket 110 to allow a surface provided with a cathode lead 3-1 and an anode lead 4-1 to face the front side, and the nonaqueous electrolyte battery 1-2 is mounted in the bracket 110 to allow a surface provided with cathode lead 3-2 and an anode lead 4-2 to face the back side.

The bracket 110 includes an outer wall 112 and a rib section 113. The outer wall 112 is formed to be slightly broader than a periphery of each of the battery main bodies 1-1A and 1-2A of the nonaqueous electrolyte batteries 1-1 and 1-2, that is, to surround the battery main bodies 1-1A and 1-2A in a state where the nonaqueous electrolyte batteries 1-1 and 1-2 are mounted. The rib section 113 is formed on an inner side surface of the outer wall 112 so as to extend inward from a center portion in a thickness direction of the outer wall 112.

In a configuration example in FIG. 16, the nonaqueous electrolyte batteries 1-1 and 1-2 are inserted into the outer wall 112 from the front side and the back side of the bracket 110, respectively, and are bonded to both surfaces of the rib section 113 of the bracket 110 with double-faced tapes 130-1 and 130-2 having adhesion at both surfaces thereof. The double-faced tapes 130-1 and 130-2 have a substantially square frame-like shape with a predetermined width along peripheral edges of the nonaqueous electrolyte batteries 1-1 and 1-2, and the rib section 113 of the bracket 110 may have an area large enough to allow the double-faced tapes 130-1 and 130-2 to be bonded.

As described above, the rib section 113 is formed to extend inward from the inner side surface of the outer wall 112 by a predetermined width along the peripheral edges of the non-aqueous electrolyte batteries 1-1 and 1-2, and an opening is formed on an inner side than the rib section 113. Therefore, a gap is formed by the opening between the nonaqueous electrolyte battery 1-1 bonded to the rib section 113 with the double-faced tape 130-1 from the front side of the bracket 110, and the nonaqueous electrolyte battery 1-2 bonded to the rib section 113 with the double-faced tape 130-2 from the back side of the bracket 110.

In other words, since the opening is formed in a central portion of the bracket 110, the nonaqueous electrolyte batteries 1-1 and 1-2 are mounted in the bracket 110 with a gap having a thickness equal to a total of a thickness of the rib section 113 and thicknesses of the double-faced tapes 130-1 and 130-2. For example, the nonaqueous electrolyte batteries 1-1 and 1-2 may be swelled to some extent due to charge and discharge, gas generation, or the like; however, the gap formed by the opening serves as clearance for swelling of the non-aqueous electrolyte batteries 1-1 and 1-2. Therefore, an influence such as an increase in thickness of the entire battery unit 100 caused by swelling of the nonaqueous electrolyte batteries 1-1 and 1-2 is allowed to be excluded.

Moreover, in a case where a bonding area is broad when the nonaqueous electrolyte batteries 1-1 and 1-2 are bonded to the rib section 113, considerable pressure is necessary; however, when bonding surfaces of the rib section 113 are limited to the peripheral edges of the nonaqueous electrolyte batteries 1-1 and 1-2, the nonaqueous electrolyte batteries 1-1 and 1-2 may be bonded to the rib section 113 easily by efficient application of pressure. Therefore, stress applied to the nonaqueous electrolyte batteries 1-1 and 1-2 during manufacturing is allowed to be reduced.

As illustrated in FIG. 16, when two nonaqueous electrolyte batteries 1-1 and 1-2 are mounted in one bracket 110, the thickness and space of the bracket 110 is allowed to be reduced, compared to a case where one nonaqueous electrolyte battery is mounted in one bracket. Therefore, energy density is improvable.

Moreover, since the rigidity in a thickness direction of the battery unit 100 is obtained by a synergistic effect obtained through bonding two nonaqueous electrolyte batteries 1-1 and 1-2, the thickness of the rib section 113 of the bracket 110 is allowed to be reduced. In other words, for example, even though the thickness of the rib section 113 is about 1 mm or less (a thickness around the limit of resin molding), the entire battery unit 100 obtains sufficient rigidity through bonding the nonaqueous electrolyte batteries 1-1 and 1-2 to both sides of the rib section 113. In addition, when the thickness of the rib section 113 is reduced, the thickness of the battery unit 100 is reduced to decrease a volume of the battery unit 100. As a result, energy density of the battery unit 100 is improvable.

Further, to increase tolerance for external stress, the battery unit 100 has a configuration in which peripheral surfaces (both side surfaces and top and bottom surfaces) of the nonaqueous electrolyte batteries 1-1 and 1-2 do not come into contact with the inner surface of the outer wall 112 of the bracket 110, and wide surfaces of the non-aqueous electrolyte batteries 1-1 and 1-2 are bonded to the rib section 113.

With such a configuration, the battery unit 100 with high energy density and high tolerance for external stress is achievable.

(Battery Module)

Figure 17:
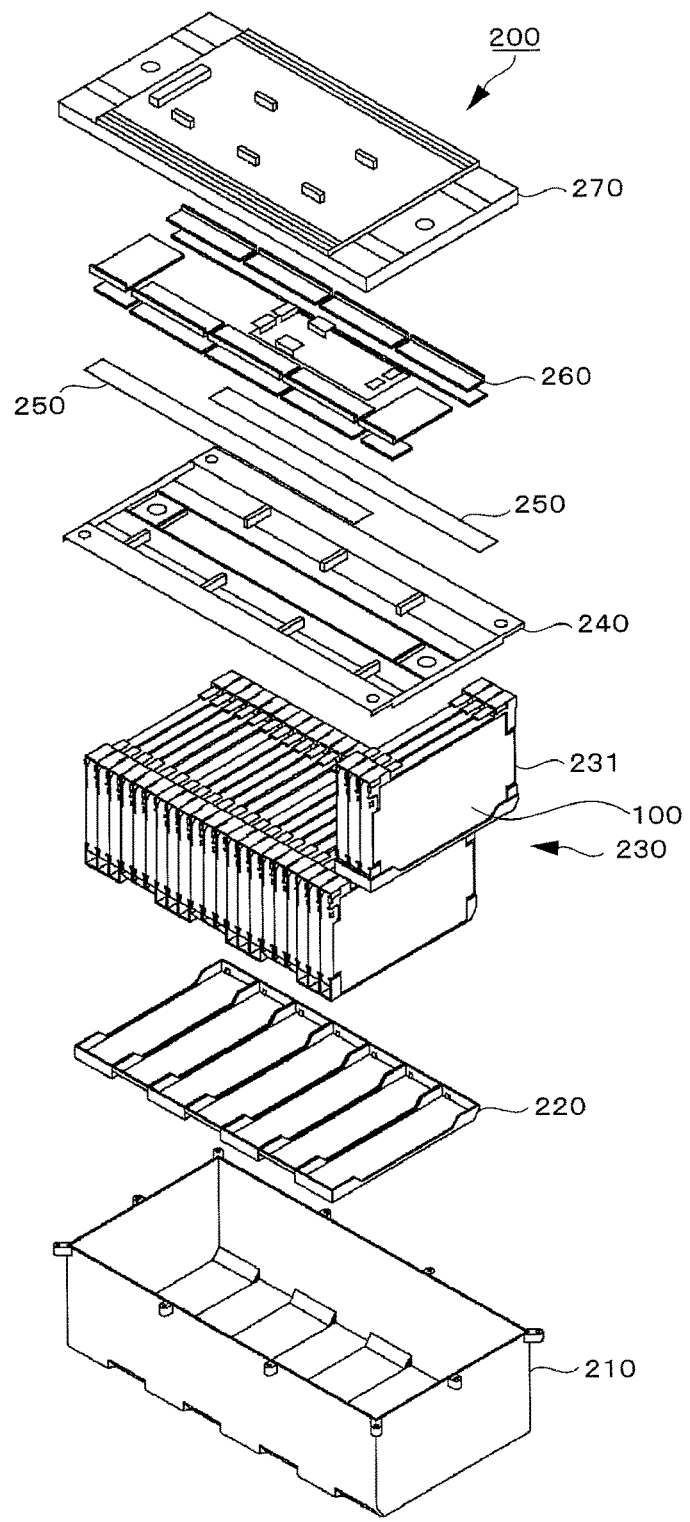
FIG. 17 is a perspective view illustrating a configuration of a battery module using the nonaqueous electrolyte batteries according to the embodiment of the present application.

Next, a configuration example of a battery module 200 configured of a combination of the battery units 100 will be described referring to FIGS. 17, 18, 19A, 19B, 20A, and 20B. FIG. 17 is an exploded perspective view illustrating a configuration example of the battery module 200. As illustrated in FIG. 17, the battery module 200 includes a module case 210, a rubber sheet section 220, a battery section 230, a battery cover 240, a fixing sheet section 250, an electric part section 260, and a box cover 270.

The module case 210 is a case for containing the battery units 100 therein and mounting the battery units 100 in an apparatus to be used, and in the configuration example in FIG. 17, the module case 210 has a size capable of containing 24 battery units 100.

The rubber sheet section 220 is a sheet laid below the battery units 100 to absorb shock or the like. In the rubber sheet section 220, one rubber sheet is provided to three battery units 100, and eight rubber sheets are prepared for 24 battery units 100.

In the configuration example in FIG. 17, the battery section 230 is configured of a combination of 24 battery units 100. Moreover, in the battery section 230, three battery units 100 are connected to one another in parallel to configure a parallel block 231, and eight parallel blocks 231 are connected to one another in series.

The battery cover 240 is a cover for fixing the battery section 230, and an opening corresponding to a bus bar 120 of a nonaqueous electrolyte battery 1 is provided to the battery cover 240.

The fixing sheet section 250 is disposed above the battery cover 240, and when the box cover 270 is fixed to the module case 210, the fixing sheet section 250 comes into close contact with the battery cover 240 and the box cover 270 to fix the battery cover 240 and the box cover 270.

The electric part section 260 includes an electric part such as a charge-discharge control circuit controlling charge and discharge of the battery units 100. The charge-discharge control circuit is disposed in, for example, a space between the bus bars 120 which are arranged in two lines in the battery portion 230.

The box cover 270 is a cover for closing the module case 210 after respective components are contained in the module case 210.

In the battery module 200, the parallel blocks 231 each including three battery units 100 connected to one another in parallel are connected to one another in series to configure the battery section 230, and such series connection is performed with use of a metal plate included in the electric part section 260. Therefore, in the battery section 230, the parallel blocks 231 are so arranged as to allow directions of terminals of the parallel blocks 231 to be alternately oriented, that is, as to allow a positive terminal of one parallel block 231 and a negative terminal of a parallel block 231 adjacent to the one parallel block 231 to be arranged side by side. In the battery module 200, it is necessary to avoid arranging terminals with same polarity of adjacent parallel blocks 231 side by side.

Figure 18:
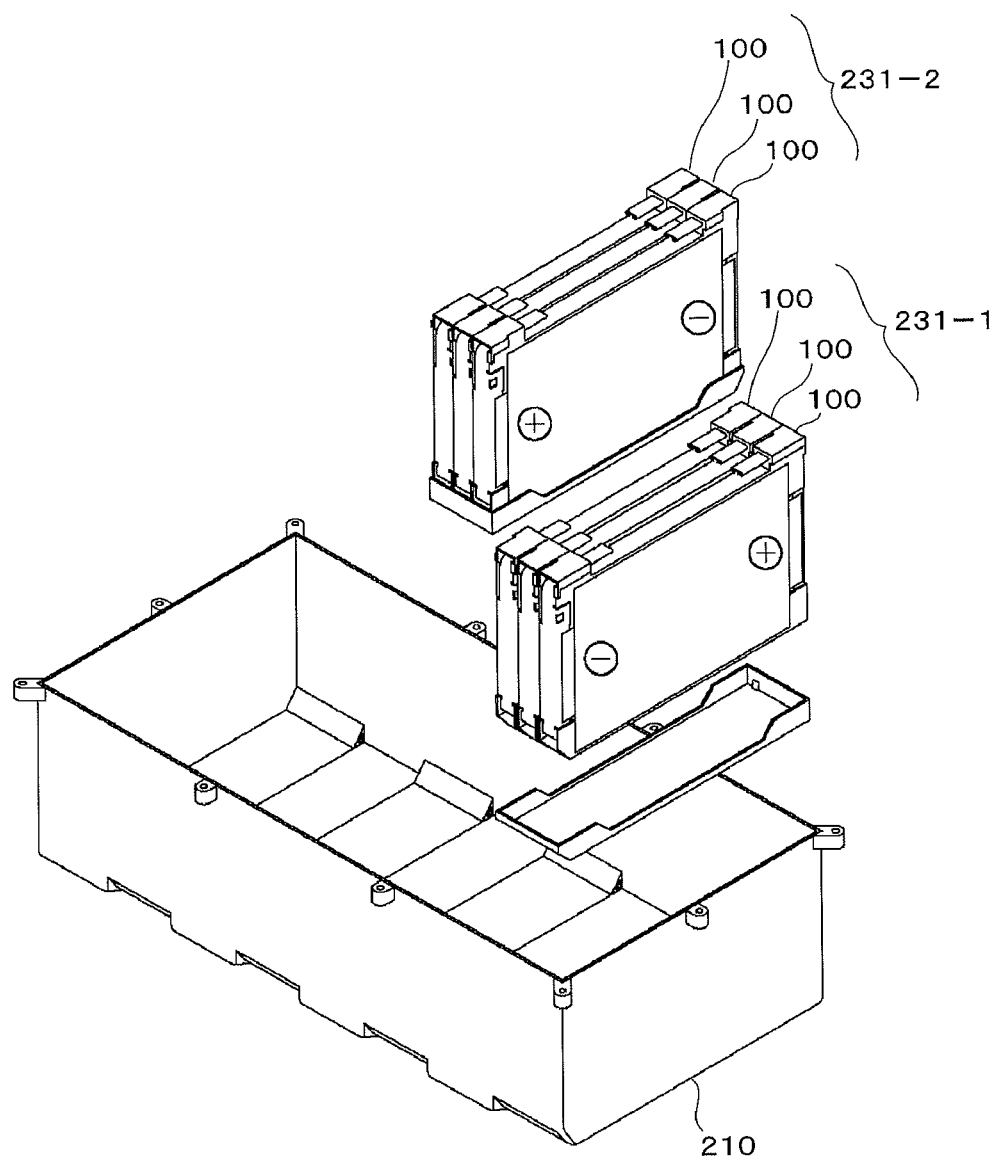
FIG. 18 is a perspective view illustrating a configuration of the battery module using the nonaqueous electrolyte batteries according to the embodiment of the present application.

For example, as illustrated in FIG. 18, a parallel block 231-1 configured of three battery units 100 and a parallel block 231-2 configured of three battery units 100 are contained in the module case 210 so as to allow a positive terminal and a negative terminal to be arranged adjacent to each other. To arrange the parallel blocks 231-1 and 231-2 in such a manner, the chamfer 111 formed at one corner on a lower side of the bracket 110 of the battery unit 100 is used.

Figure 19A:
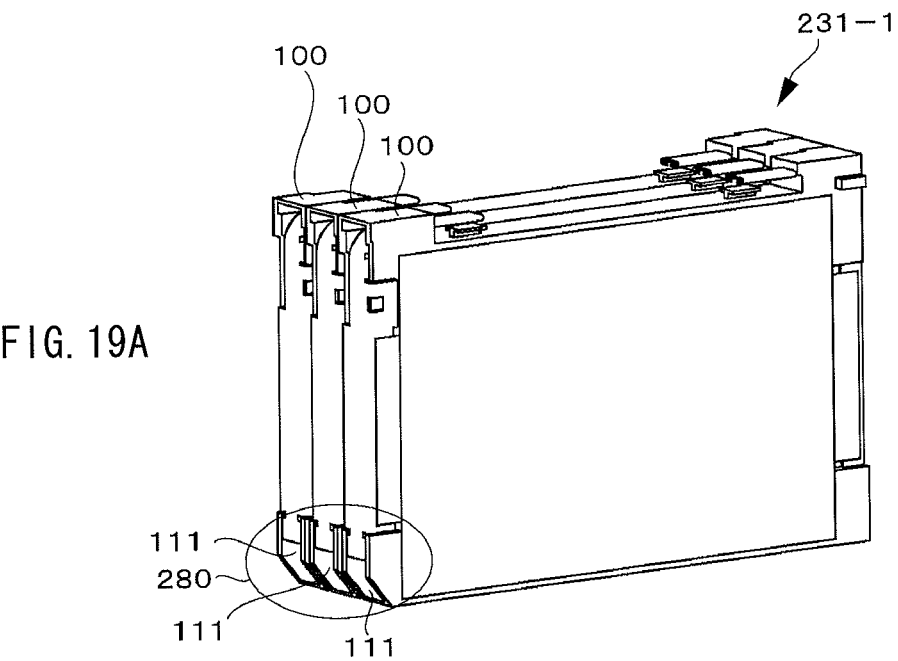
FIGS. 19A and 19B are a perspective view and a sectional view illustrating a configuration example of a parallel block, respectively.
Figure 19B:
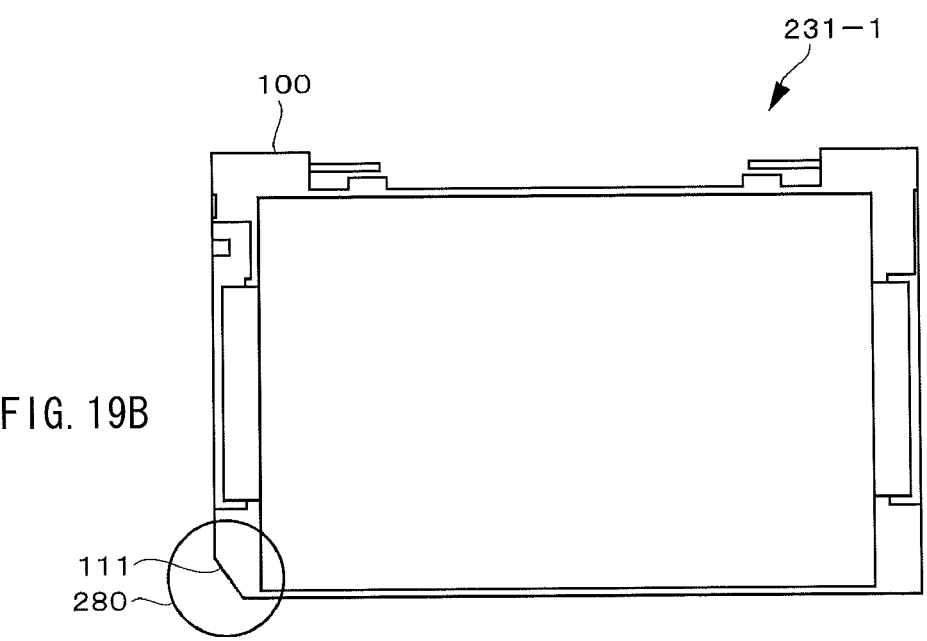

FIG. 19A is a perspective view illustrating a configuration example of the parallel block, and FIG. 19B is a sectional view illustrating a configuration example of the parallel block. As illustrated in FIGS. 19A and 19B, the battery units 100 in the parallel block 231-1 are so combined as to allow respective chamfers 111 to be oriented in a same direction, thereby forming a chamfer region 280. It is to be noted that, although not illustrated, the parallel block 231-2 is similar to the parallel block 231-1.

Figure 20A:
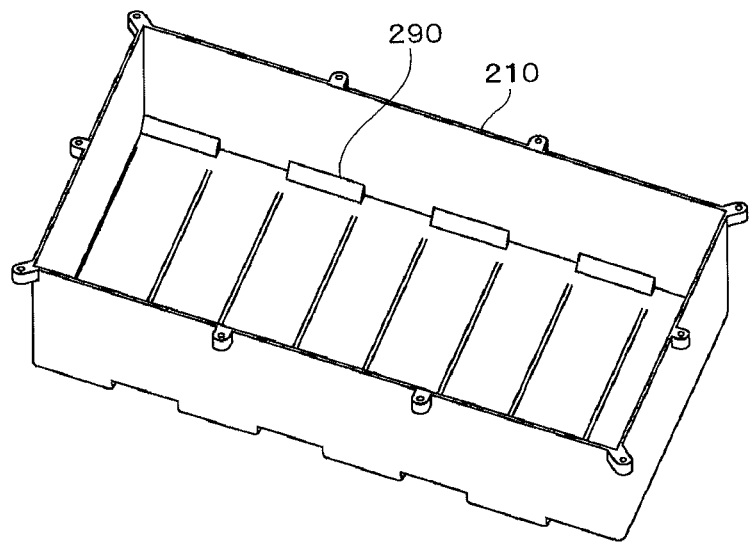
FIGS. 20A and 20B are schematic views illustrating a configuration example of a module case.
Figure 20B:
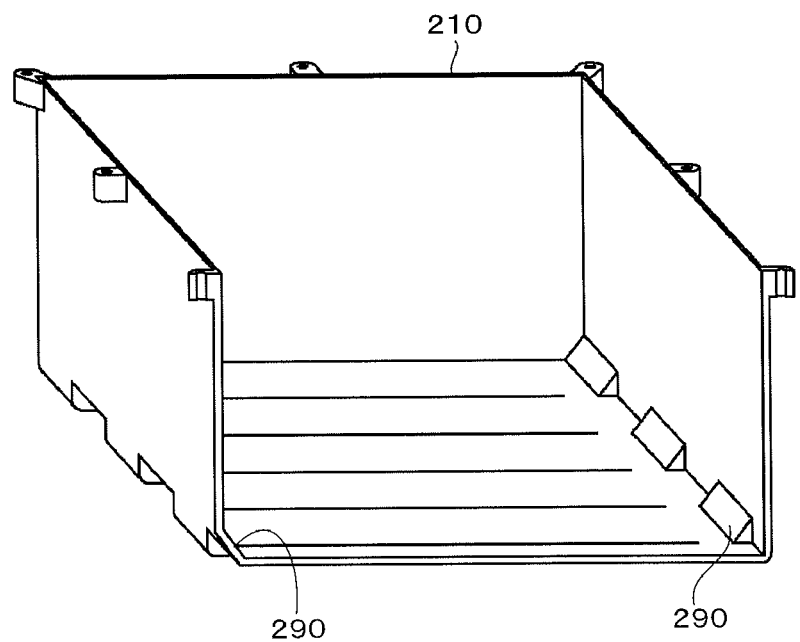

FIGS. 20A and 20B illustrate a configuration example of the module case 210. As illustrated in FIGS. 20A and 20B, in the module case 210, tilt sections 290 each corresponding to the tilt of the chamfer region 280 are formed, and the tilt sections 290 with a length corresponding to a total thickness of three nonaqueous electrolyte batteries are alternately disposed. If the parallel block 231-1 is to be contained in the module case 210 in a wrong direction, a lower corner of the parallel block 231-1 comes into contact with the tilt section 290 of the module case 210 by the chamfer region 280 of the parallel block 231-1 and the tilt section 290 of the module case 210. In this case, the parallel block 231-1 floats from a bottom surface of the module case 210; therefore, the parallel block 231-1 is not completely contained in the module case 210. Moreover, if the parallel block 231-2 is to be contained in the module case 210 in a wrong direction, a lower corner of the parallel block 231-2 comes into contact with the tilt section 290 of the module case 210 by the chamfer region 280 of the parallel block 231-2 and the tilt section 290 of the module case 210. In this case, the parallel block 231-2 floats from the bottom surface of the module 210; therefore, the parallel block 231-2 is not completely contained in the module case 210. Therefore, in the battery module 200, terminals with same polarity of adjacent parallel blocks are not arranged side by side.

As described above, the battery unit using the nonaqueous electrolyte battery according to the embodiment of the present application and the battery module are configured.

6. Sixth Embodiment

Example of Battery Pack

Figure 21:
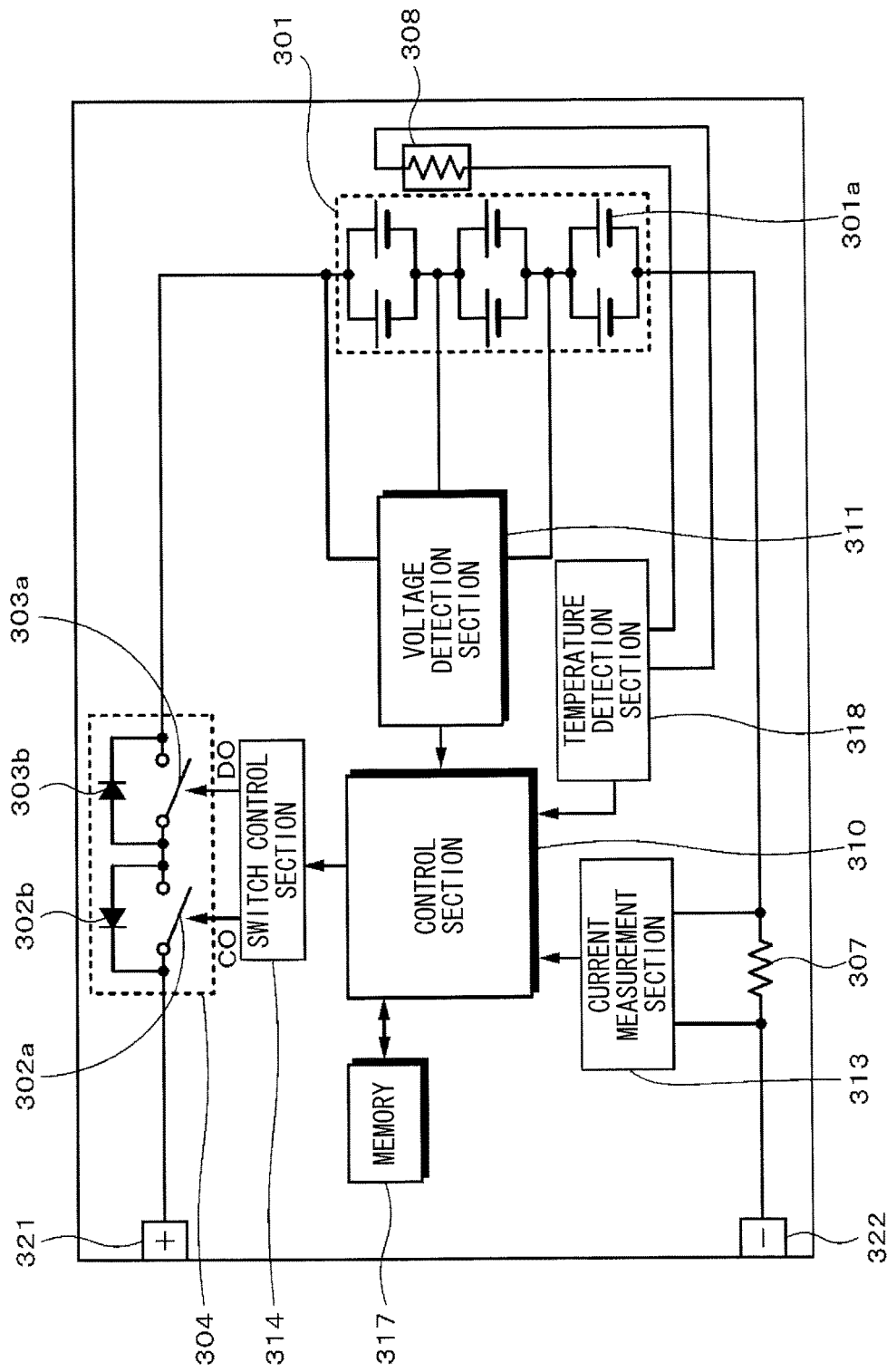
FIG. 21 is a block diagram illustrating a configuration example of a battery pack according to an embodiment of the present application.

FIG. 21 is a block diagram illustrating a circuit configuration example in which a nonaqueous electrolyte battery according to an embodiment of the present application (hereinafter referred to as secondary battery, as appropriate) is applied to a battery pack. The battery pack includes an assembled battery 301, a package, a switch section 304 including a charge control switch 302a and a discharge control switch 303a, a current sensing resistor 307, a temperature detection device 308, and a control section 310.

The battery pack further includes a cathode terminal 321 and an anode terminal 322, and during charge, the cathode terminal 321 and the anode terminal 322 are connected to a cathode terminal and an anode terminal of a charger, respectively, to perform charge. Moreover, when the battery pack is used for an electronic apparatus, the cathode terminal 321 and the anode terminal 322 are connected to a cathode terminal and an anode terminal of the electronic apparatus, respectively, to perform discharge.

The assembled battery 301 is configured of a plurality of secondary batteries 301a connected to one another in series or/and in parallel. Each of the secondary batteries 301a is the secondary battery according to an embodiment of the present application. It is to be noted that, in FIG. 21, a case where six secondary batteries are connected to one another in a two-in-parallel three-in-series (2P3S) configuration is illustrated as an example; however, any connection configuration such as an n-in-parallel m-in-series configuration, where n and m are integers, may be adopted.

The switch section 304 includes the charge control switch 302a, a diode 302b, the discharge control switch 303a, and a diode 303b, and is controlled by the control section 310. The diode 302b has polarity in an opposite direction with respect to a charge current flowing from the cathode terminal 321 to the assembled battery 301 and in a forward direction with respect to a discharge current flowing from the anode terminal 322 to the assembled battery 301. The diode 303b has polarity in a forward direction with respect to the charge current and in an opposite direction with respect to the discharge current. It is to be noted that, in the example, the switch section is provided on a positive side, but the switch section may be provided on a negative side.

When a battery voltage reaches an overcharge detection voltage, the charge control switch 302a is controlled by the control section 310 to be turned off, thereby not allowing the charge current to flow through a current path of the assembled battery 301. After the charge control switch 302a is turned off, only discharge is allowed to be performed through the diode 302b. Moreover, when a large current flows during charge, the charge control switch 302a is controlled by the control section 310 to be turned off, thereby interrupting the charge current flowing through the current path of the assembled battery 301.

When the battery voltage reaches an overdischarge detection voltage, the discharge control switch 303a is controlled by the control section 310 to be turned off, thereby not allowing the discharge current to flow through the current path of the assembled battery 301. After the discharge control switch 303a is turned off, only charge is allowed to be performed through the diode 303b. Moreover, when a large current flows during discharge, the discharge control switch 303a is controlled by the control section 310 to be turned off, thereby interrupting the discharge current flowing through the current path of the assembled battery 301.

The temperature detection device 308 may be, for example, a thermistor, and is provided in proximity to the assembled battery 301 to measure a temperature of the assembled battery 301 and then to supply the measured temperature to the control section 310. A voltage detection section 311 measures a voltage of the assembled battery 301 and a voltage of each of the secondary batteries 301a configuring the assembled battery 301, and then converts the measured voltages from AC voltages to DC voltages, and supplies the DC voltages to the control section 310. A current measurement section 313 measures a current with use of the current sensing resistor 307, and supplies the measured current to the control section 301.

The switch control section 314 controls the charge control switch 302a and the discharge control switch 303a of the switch section 304, based on the voltages and the current input from the voltage detection section 311 and the current measurement section 313. When a voltage of any of the secondary batteries 301a reaches the overcharge detection voltage or less, or the overdischarge detection voltage or less, or when a large current flows rapidly, the switch control section 314 transmits a control signal to the switch section 304 to prevent overcharge, overdischarge, and overcurrent charge and discharge.

For example, in the case where the secondary batteries are lithium-ion secondary batteries, the overcharge detection voltage is determined to be, for example, 4.20 V±0.05 V, and the overdischarge detection voltage is determined to be, for example, 2.4 V±0.1 V.

As a charge-discharge switch, for example, a semiconductor switch such as MOSFET may be used. In this case, a parasitic diode of the MOSFET functions as the diodes 302b and 303b. In the case where a P-channel FET is used as the charge-discharge switch, the switch control section 314 supplies control signals DO and CO to a gate of the charge control switch 302a and a gate of the discharge control switch 303a, respectively. In the case where the charge control switch 302a and the discharge control switch 303a are of a p-channel type, the charge control switch 302a and the discharge control switch 303a are turned on by a gate potential lower by a predetermined value or over than a source potential. In other words, in normal charge and discharge operations, the control signals CO and DO are turned to a low level, and the charge control switch 302a and the discharge control switch 303a are turned on.

Then, for example, during overcharge or overdischarge, the control signals CO and DO are turned to a high level, and the charge control switch 302a and the discharge control switch 303a are turned off.

A memory 317 is configured of a RAM or a ROM, for example, an EEPROM (Erasable Programmable Read Only Memory) which is a non-volatile memory. In the memory 317, values computed by the control section 310, and initial internal resistance and the like of each of the secondary batteries 301a measured in a manufacturing process are stored in advance, and may be rewritten, if necessary. Moreover, when the value of full-charge capacity of each of the secondary batteries 301a is stored in the memory 317, for example, remaining capacity may be calculated together with the control section 310.

A temperature detection section 318 measures a temperature with use of the temperature detection device 308, and controls charge and discharge when abnormal heat is generated, and performs correction in calculation of the remaining capacity.

7. Seventh Embodiment

The above-described nonaqueous electrolyte battery, and the battery pack, the battery unit, and the battery module each using the nonaqueous electrolyte battery may be installed in apparatuses such as electronic apparatuses, electric vehicles, and electric storage apparatuses, or may be used to supply electric power to the apparatuses.

Examples of the electronic apparatuses include notebook personal computers, PDAs (Personal Digital Assistants), cellular phones, cordless telephone handsets, videotape camera-recorders, digital still cameras, electronic books, electronic dictionaries, music players, radios, headphones, game machines, navigation systems, memory cards, pacemakers, hearing aids, electric tools, electric shavers, refrigerators, air conditioners, televisions, stereos, water heaters, microwave ovens, dishwashers, washing machines, dryers, lighting equipment, toys, medical equipment, robots, load conditioners, and traffic lights.

Electric vehicles include rail vehicles, golf carts, electric carts, electric cars (including hybrid cars), and the nonaqueous electrolyte battery, the battery pack, the battery unit, or the battery module may be used as a driving power supply or an auxiliary power supply for the electric vehicles.

Electric storage apparatuses include power supplies for electric power storage used for buildings such as houses or electric power generation facilities.

Among the above-described application examples, an electric storage system using the electric storage apparatus to which the above-described nonaqueous electrolyte battery according to any of the embodiments of the present application is applied will be described below as a specific example.

The electric storage system may have, for example, any of the following configurations. A first electric storage system is an electric storage system in which the electric storage apparatus is charged by a generator generating electric power from renewable energy. A second electric storage system is an electric storage system in which the electric storage apparatus is included and electric power is supplied to an electronic apparatus connected to the electric storage apparatus. A third electric storage system is an electronic apparatus receiving electric power from the electric storage apparatus. These electric storage systems are implemented as a system efficiently supplying electric power in corporation with an external electric power supply network.

Moreover, a fourth electric storage system is an electric vehicle including a converter and a controller. The converter receives electric power from the electric storage apparatus, and then converts the electric power into driving force for the electric vehicle, and the controller performs information processing relating to vehicle control based on information on the electric storage apparatus. A fifth electric storage system is an electric power system including an electric power information transmitting-receiving section transmitting and receiving signals through a network to and from other apparatuses, and performing charge-discharge control of the above-described electric storage apparatus based on information received by the electric power information transmitting-receiving section. A sixth electric storage system is an electric power system receiving electric power from the above-described electric storage apparatus or supplying electric power from an generator or an electric power network to the electric storage apparatus. The electric storage system will be described below.

(7-1. Electric Storage System for House as an Application Example)

Figure 22:
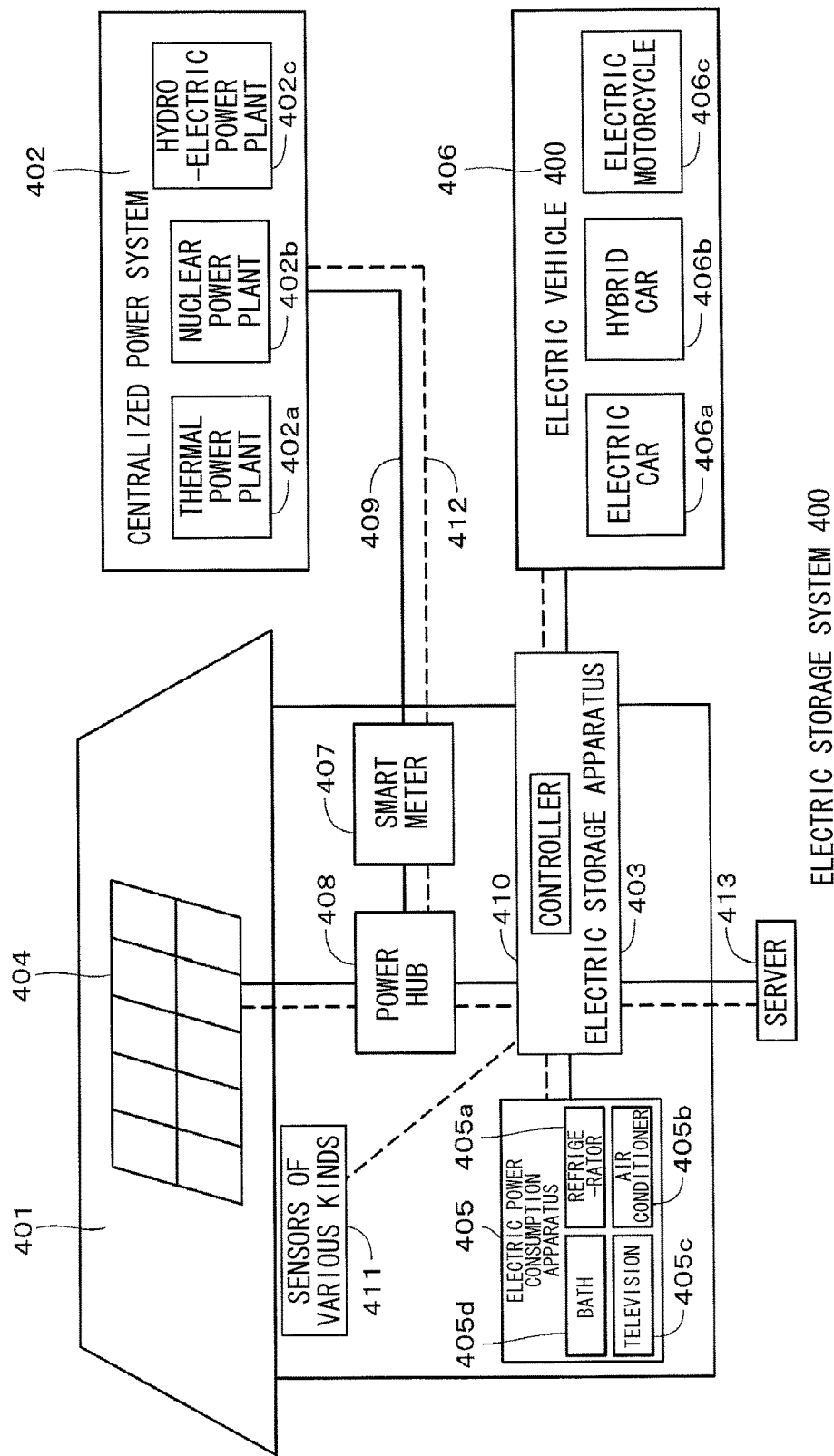
FIG. 22 is a schematic view illustrating an example in which an electric storage apparatus using a nonaqueous electrolyte battery according to an embodiment of the present application is applied to an electric storage system for house.

An example in which the electric storage apparatus using the nonaqueous electrolyte battery according to any of the embodiments of the present application is applied to an electric storage system for house will be described referring to FIG. 22. For example, in an electric storage system 400 for a house 401, electric power is supplied to an electric storage apparatus 403 from a centralized power system 402 including a thermal power plant 402a, a nuclear power plant 402b, a hydroelectric power plant 402c, and the like through an electric power network 409, an information network 412, a smart meter 407, a power hub 408, and the like. Along with this, electric power is supplied to the electric storage apparatus 403 from an independent power supply such as an in-home generator 404. Electric power supplied to the electric storage apparatus 403 is stored in the electric storage apparatus 403. Electric power to be used in the house 401 is supplied with use of the electric storage apparatus 403. A similar electric storage system may be used not only in the house 401 but also in a building.

The house 401 includes the generator 404, electric power consumption apparatuses 405, the electric storage apparatus 403, a controller 410 controlling respective apparatuses, a smart meter 407, and sensors 411 obtaining various kinds of information. The apparatuses are connected through an electric power network 409 and an information network 412. As the generator 404, a solar battery, a fuel cell, or the like is used, and electric power generated by the generator 404 is supplied to the electric power consumption apparatuses 405 and/or the electric storage apparatus 403. The electric power consumption apparatuses 405 include a refrigerator 405a, an air conditioner 405b, a television receiver 405c, a bath 405d, and the like. The electric power consumption apparatuses 405 further include electric vehicles 406. The electric vehicles 406 include an electric car 406a, a hybrid car 406b, and an electric motorcycle 406c.

The nonaqueous electrolyte battery according to any of the embodiments of the present application is applied to the electric storage apparatus 403. The nonaqueous electrolyte battery according to any of the embodiments of the present application may be configured of, for example, the above-described lithium-ion secondary battery. The smart meter 407 has a function of measuring a used amount of commercial electric power, and then transmitting the measured used amount to an electric power company. The electric power network 409 may be of a DC electric power feeding type, an AC electric power feeding type, or a contactless electric power feeding type, or a combination of two or more types selected from them.

Examples of the sensors 411 of various kinds include a human presence sensor, an illumination sensor, an object detection sensor, an electric power consumption sensor, a vibration sensor, a contact sensor, a temperature sensor, and an infrared sensor. Information obtained by the sensors 411 of various kinds is transmitted to the controller 410. Weather conditions, a state of a person, and the like are obtained from the information from the sensors 411, and the electric power consumption apparatuses 405 are automatically controlled to minimize energy consumption. In addition, the controller 410 is allowed to transmit information about the house 401 to an external electric power company and the like through the Internet.

Processing such as electric power line branching and DC-to-AC conversion is performed by the power hub 408. As a communication system for the information network 412 connected to the controller 410, a method of using a communication interface such as UART (Universal Asynchronous Receiver-Transceiver), or a method of using a sensor network based on a wireless communication standard such as Bluetooth, ZigBee, or Wi-Fi may be adopted. A Bluetooth system may be applied to multimedia communication to perform point-to-multipoint communication. A ZigBee system uses a physical layer of IEEE (Institute of Electrical and Electronics Engineers) 802.15.4. IEEE 802.15.4 is a standard for short-range wireless communication standard called personal area network (PAN) or wireless (W) PAN.

The controller 410 is connected to an external server 413. The server 413 may be managed by the house 401, the electric power company, or a service provider. Examples of information transmitted or received by the server 413 include electric power consumption information, life pattern information, electric power rates, weather information, natural disaster information, and electric power trading information. Such information may be transmitted and received by an electric power consumption apparatus in a house (for example, a television receiver), and may be transmitted and received by an apparatus (for example, a cellular phone) outside the house. Such information may be displayed on an apparatus having a display function, for example, a television receiver, a cellular phone, or a PDA (Personal Digital Assistant).

The controller 410 controlling respective components is configured of a CPU (Central Processing Unit), a RAM (Random Access Memory), a ROM (Read Only Memory), and the like, and in this example, the controller 410 is contained in the electric storage apparatus 403. The controller 410 is connected to the electric storage apparatus 403, the in-home generator 404, the electric power consumption apparatuses 405, the sensors 411 of various kinds, and the server 413 through the information network 412, and has a function of managing a used amount of commercial electric power and electric power generation amount. It is to be noted that the controller 410 may have a function of performing electric power trading in an electric power market, or the like.

As described above, not only electric power generated by the centralized power system 402 including the thermal power plant 402*a*, the nuclear power plant 402*b*, the hydroelectric power plant 402*c*, and the like but also electric power generated by the in-home generator 404 (a solar power generation unit or a wind power generation unit) may be stored in the electric storage apparatus 403. Therefore, even if electric power generated by the in-home generator 404 varies, control may be performed to fix the amount of electric power which is to be externally transmitted, or to discharge a necessary amount of electric power. For example, while electric power obtained by solar power generation unit is stored in the electric storage apparatus 403, nighttime electric power of which the rate is lower is stored in the electric storage apparatus 403 during nighttime, and electric power stored in the electric storage device 403 is discharged and used in a daytime zone in which the rate of electric power is higher.

It is to be noted that, in this example, the controller 410 contained in the electric storage apparatus 403 is described; however, the controller 410 may be contained in the smart meter 407 or, may be configured in isolation. Moreover, the electric storage system 400 may be used for a plurality of households in collective housing, or a plurality of detached houses.

(7-2. Electric Storage System for Vehicle as Application Example)

Figure 23:
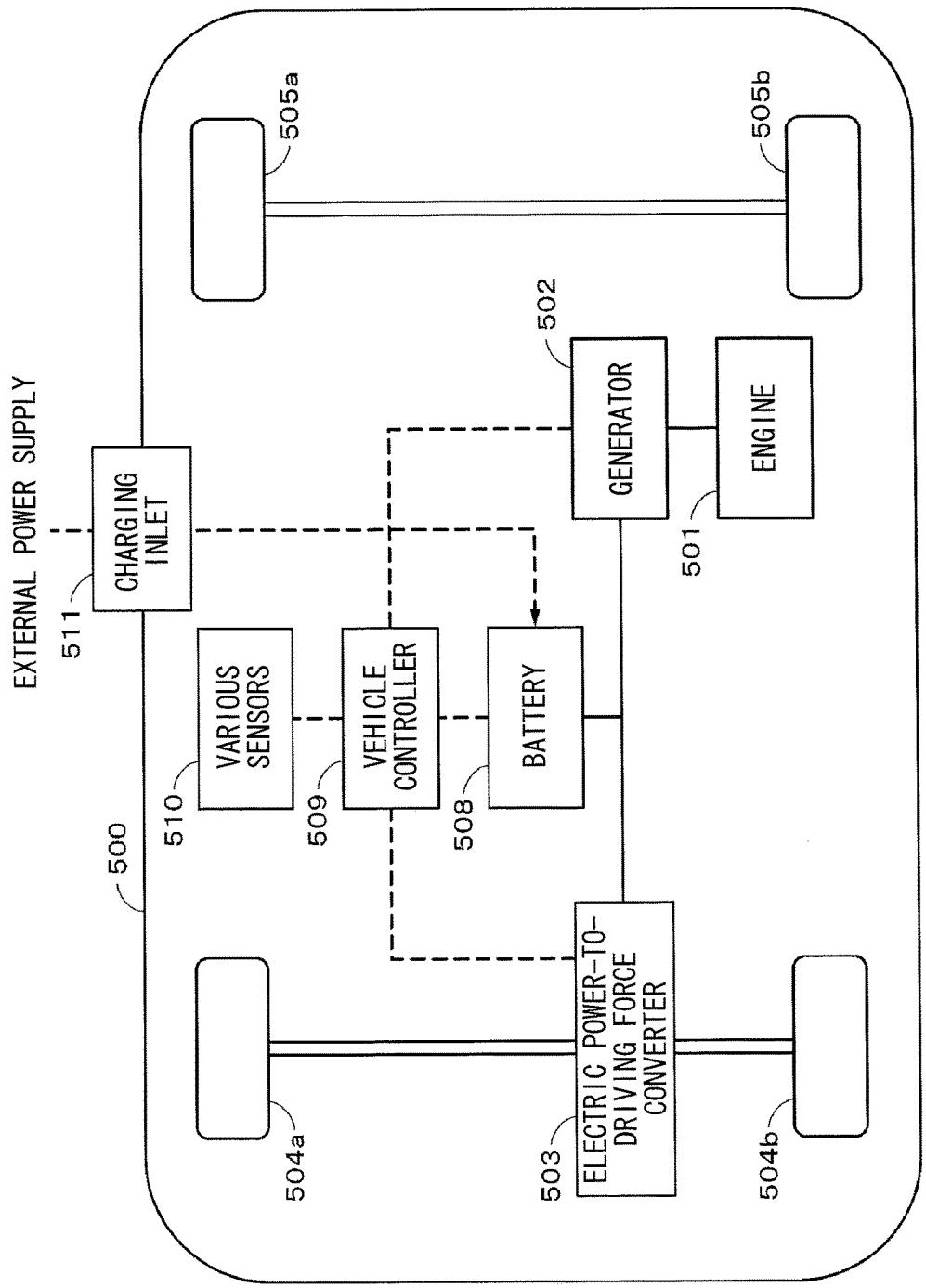
FIG. 23 is a schematic view illustrating an example of a configuration of a hybrid vehicle adopting a series hybrid system to which an embodiment of the present application is applied.

An application example of an embodiment of the present application to an electric storage system for vehicle will be described below referring to FIG. 23. FIG. 23 schematically illustrates an example of a configuration of a hybrid vehicle adopting a series hybrid system to which the embodiment of the present application is applied. The vehicle adopting the series hybrid system is a car running by an electric power-to-driving force converter with use of electric power generated by a generator driven by an engine or electric power generated by the generator and then temporarily stored in a battery.

A hybrid vehicle 500 includes an engine 501, a generator 502, an electric power-to-driving force converter 503, a drive wheel 504*a*, a drive wheel 504*b*, a wheel 505*a*, a wheel 505*b*, a battery 508, a vehicle controller 509, various sensors 510, and a charging inlet 511. The above-described non-aqueous electrolyte battery according to any of the embodiments of the present application is applied to the battery 508.

The hybrid vehicle 500 runs with use of the electric power-to-driving force converter 503 as a power supply. An example of the electric power-to-driving force converter 503 is a motor. The electric power-to-driving force converter 503 is activated with use of electric power of the battery 508, and torque of the electric power-to-driving force converter 503 is transmitted to the drive wheels 504*a* and 504*b*. It is to be noted that either an AC motor or a DC motor is applicable as the electric power-to-driving force converter 503 through using direct current-to-alternating current (DC-to-AC) conversion or reverse conversion (AC-to-DC conversion) at a necessary point. Various sensors 510 control the number of engine revolutions through the vehicle controller 509, or control the degree of opening (throttle opening) of a throttle valve (not illustrated). Various sensors 510 include a speed sensor, an accelerating sensor, an engine revolution sensor, and the like.

The torque of the engine 501 is transmitted to the generator 502, and electric power generated by the generator 502 with use of the torque is allowed to be stored in the battery 508.

When the hybrid vehicle 500 is decelerated by a braking mechanism (not illustrated), resistance generated during deceleration is applied to the electric power-to-driving force converter 503 as torque, and the regenerative electric power generated by the torque in the electric power-to-driving force converter 503 is stored in the battery 508.

When the battery 508 is connected to, for example, an external power supply of the hybrid vehicle 500, the battery 508 is allowed to receive electric power from the external power supply through the charging inlet 511 as an inlet, and to hold the received electric power accordingly.

Although not illustrated, an information processing unit which performs information processing relating to vehicle control based on information on a secondary battery may be included. Examples of such an information processing unit include an information processing unit which displays a remaining amount of a battery based on information on the remaining amount of the battery.

It is to be noted that a series hybrid car which runs on a motor with use of electric power generated by a generator actuated by an engine or electric power temporarily stored in the battery is described as an example. However, the embodiment of the present application is effectively applicable to a parallel hybrid vehicle which takes both engine output and motor output as driving sources, and appropriately switches between three modes, i.e., a mode in which the vehicle runs on an engine only, a mode in which the vehicle runs on a motor only, and a mode in which the vehicle runs on both the engine and the motor. Further, the embodiment of the present application is effectively applicable to a so-called electric vehicle which runs on a driving motor only without using an engine.

EXAMPLES

Specific Examples of the embodiments of the present application will be described in detail below, but the present application is not limited thereto.

Example 1-1

Formation of Cathode

As the cathode active material, only a material ($Li_{1.05}Ni_{0.5}Co_{0.2}Mn_{0.3}O_2$) formed by the following coprecipitation method was used. It is to be noted that, in the material, a mole ratio of Li and metal (Me) (a Li/Me ratio) was 1.05.

(Formation of Cathode Active Material (Coprecipitation Method))

Nickel sulfate and cobalt sulfate were mixed at a mole ratio of Ni and Co (Ni:CO) of 0.5:0.2 to form a mixture, and then deionized water was added to the mixture to prepare a solution containing nickel and cobalt (hereinafter referred to as nickel-cobalt-containing solution). Ammonia water was dropped in the solution in small portions in an Ar gas atmosphere to allow the solution to react with ammonia water under an alkaline condition of pH 11 to pH 13 at 40° C. to 60° C., thereby precipitating and forming $Ni_{0.5}Co_{0.2}(OH)_2$ including nickel and cobalt as constituent elements in a reaction liquid.

A nickel-cobalt-containing hydroxide obtained in such a manner was collected, and then was added to deionized water. Next, manganese sulfate was added to the deionized water so as to allow a mole ratio of Mn and (Ni+Co+Mn) to be 0.3, and pH of a resultant liquid was adjusted within a range from 9.0 to 9.5 with use of sulfuric acid. Thus, $Ni_{0.5}Co_{0.2}Mn_{0.3}(OH)_2$ in which the above-described nickel-cobalt-containing hydroxide and manganese hydroxide were mixed was precipitated and formed in a reaction liquid in a state where $Ni_{0.5}Co_{0.2}Mn_{0.3}(OH)_2$ was precipitated or dispersed in the liquid.

Next, lithium hydroxide was added to the liquid so as to allow a mole ratio of Li and metal Me(Ni+Co+Mn) to be 1.05. A resultant precipitate was put into a typical mixer, and was sufficiently mixed and granulated in an inert gas atmosphere by the mixer to obtain a precursor.

(Firing of Precursor)

The precursor completed by the above-described way was fired in oxygen at 700° C. Thus, a target material ($Li_{1.05}Ni_{0.5}Co_{0.2}Mn_{0.3}O_2$) was obtained.

The cathode active material (90.8 parts by mass), graphite as a conductor (4.2 parts by mass), and polyvinylidene fluoride (PVDF) as a binder (5 parts by mass) were mixed to form a cathode mixture. Next, the cathode mixture was dispersed in N-methyl-2-pyrrolidone as a solvent to form paste-form cathode mixture slurry. Then, the cathode mixture slurry was uniformly applied to one surface of a cathode current collector configured of strip-like aluminum foil with a thickness of 15 µm, and the cathode mixture slurry was dried, and then was compression molded by a roller press to form a cathode active material layer. Finally, the cathode current collector on which the cathode active material layer was formed was stamped into a disk shape with a predetermined dimension to form a pellet-shaped cathode.

(Formation of Anode)

Pulverized graphite powder as an anode active material (95 parts by mass) and polyvinylidene fluoride as a binder (5 parts by mass) were mixed to form an anode mixture. The anode mixture was dispersed in N-methyl-2-pyrrolidone as a solvent to form paste-form anode mixture slurry. Then, the anode mixture slurry was uniformly applied to an anode current collector configured of copper foil with a thickness of 15 µm, and the cathode mixture slurry was dried, and then was compression molded by a roller press to form an anode active material layer. Finally, the anode current collector on which the anode active material layer was formed was stamped into a disk shape with a predetermined dimension to form a pellet-shaped anode.

(Formation of Electrolytic Solution)

As an electrolytic solution, an electrolytic solution including a mixture solvent in which ethylene carbonate (EC), ethyl methyl carbonate (EMC), and dimethyl carbonate (DMC) were mixed at a ratio of EC:EMC:DMC=2:2:6 (in volume ratio), and lithium hexafluorophosphate ($LiPF_6$) as electrolyte salt was used. The concentration of lithium hexafluorophosphate ($LiPF_6$) in the electrolytic solution was 1 mol/dm$^3$. Moreover, 4-fluoro-1,3-dioxolane-2-one (FEC) as an additive was added to the electrolytic solution in an amount of 5% by mass of the mass of the electrolytic solution.

(Separator)

As a separator, a porous film made of polyethylene with a thickness of 23 µm was used.

(Assembling of Battery)

The formed pellet-shaped cathode and the formed pellet-shaped anode were laminated with the separator in between so as to allow the cathode active material layer and the anode active material layer to face each other, and they are contained in an package cup and package can, and were caulked by a gasket. Thus, a coin type nonaqueous electrolyte battery with a diameter of 20 mm and a height of 1.6 mm was assembled.

(Warming Process on Battery)

After that, the above-described coin type nonaqueous electrolyte battery was put into a constant temperature bath at 50° C. for 24 hours to perform a warming process. Thus, a target test battery was obtained.

Example 1-2

Cathode Active Material

As a cathode active material, a material formed through mixing a material ($Li_{1.1}Mn_2O_4$) formed by the following way and the material ($Li_{1.05}Ni_{0.5}Co_{0.2}Mn_{0.3}O_2$) formed in Example 1-1 was used. A mixture ratio of $Li_{1.1}Mn_2O_4$ and $Li_{1.05}Ni_{0.5}CO_{0.2}Mn_{0.3}O_2$ ($Li_{1.1}Mn_2O_4$:

$Li_{1.05}Ni_{0.5}CO_{0.2}Mn_{0.3}O_2$ (in mass ratio)) was 20:80. A test battery was formed by a similar way to that in Example 1-1 except for the above-described points.

(Formation of Cathode Active Material (Solid-Phase Method))

Lithium carbonate as a lithium source and manganese carbonate as a manganese source each were prepared at a predetermined composition ratio. These raw materials were pulverized and mixed in a mortar to form a mixture, and the mixture was fired in air at 800° C. Thus, $Li_{1.1}Mn_2O_4$ was obtained.

Example 1-3

As a cathode active material, a material formed through mixing a material ($Li_{1.1}Mn_2O_4$) formed by a similar way to that in Example 1-2 and the material ($Li_{1.05}Ni_{0.5}Co_{0.2}Mn_{0.3}O_2$) formed in Example 1-1 was used. A mixture ratio of $Li_{1.1}Mn_2O_4$ and $Li_{1.05}Ni_{0.5}Co_{0.2}Mn_{0.3}O_2$ ($Li_{1.1}Mn_2O_4$: $Li_{1.05}Ni_{0.5}Co_{0.2}Mn_{0.3}O_2$ (in mass ratio)) was 40:60. A test battery was formed by a similar way to that in Example 1-1 except for the above-described points.

Example 1-4

As a cathode active material, only a material ($Li_{1.15}Ni_{0.5}Co_{0.2}Mn_{0.3}O_2$) formed by the following way was used. A test battery was formed by a similar way to that in Example 1-1 except for the above-described point.

(Formation of Cathode Active Material (Coprecipitation Method))

To form a precursor, lithium hydroxide was added to allow a mole ratio of Li and metal Me (Ni+Co+Mn) to be 1.15. The cathode active material was formed by a similar way to that in Example 1-1, except that the firing temperature in firing of the precursor was changed to 800° C.

Example 1-5

To form a precursor, lithium hydroxide was added to allow a mole ratio of Li and metal Me (Ni+Co+Mn) to be 0.99. The cathode active material was formed by a similar way to that in Example 1-1, except for the above-described point.

Example 1-6

In the warming process on the battery, the warming temperature was changed to 50° C. The cathode active material was formed by a similar way to that in Example 1-1, except for the above-described point.

Example 1-7

In the warming process on the battery, the warming temperature was changed to 30° C. The cathode active material was formed by a similar way to that in Example 1-1, except for the above-described point.

Example 1-8

As a cathode active material, only a material ($Li_{1.05}Ni_{1/3}Co_{1/3}Mn_{1/3}O_2$) formed by the following way was used. A test battery was formed by a similar way to that in Example 1-1, except for the above-described point.

(Formation of Cathode Active Material)

Nickel sulfate and cobalt sulfate were mixed at a mole ratio of Ni and Co (Ni:CO) of 1/3:1/3 to form a mixture, and then deionized water was added to the mixture to prepare a nickel-cobalt-containing solution. Ammonia water was dropped in the solution in small portions in an Ar gas atmosphere to allow the solution to react with ammonia water under an alkaline condition of pH 11 to pH 13 at 40° C. to 60° C., thereby precipitating and forming $Ni_{1/3}CO_{1/3}(OH)_2$ including nickel and cobalt as constituent elements in a reaction liquid.

A nickel-cobalt-containing hydroxide obtained in such a manner was collected, and then was added to deionized water. Next, manganese sulfate was added to the deionized water so as to allow a mole ratio of Mn and metal Me (Ni+Co+Mn) to be 1/3, and pH of a resultant liquid was adjusted within a range from 9.0 to 9.5 with use of sulfuric acid. Thus, $Ni_{1/3}CO_{1/3}Mn_{1/3}(OH)_2$ in which the above-described nickel-cobalt-containing hydroxide and manganese hydroxide were mixed was precipitated and formed in a reaction liquid in a state where $Ni_{1/3}CO_{1/3}Mn_{1/3}(OH)_2$ was precipitated or dispersed in the liquid.

Next, lithium hydroxide was added to the liquid so as to allow a mole ratio of Li and metal Me (Ni+Co+Mn) to be 1.05. A resultant precipitate was put into a typical mixer, and was sufficiently mixed and granulated in an inert gas atmosphere by the mixer to obtain a precursor.

(Firing of Precursor)

The precursor completed by the above-described way was fired in oxygen at 700° C. Thus, a target material ($Li_{1.05}Ni_{1/3}Co_{1/3}Mn_{1/3}O_2$) was obtained.

Example 1-9

As a cathode active material, a material formed through mixing a material ($Li_{1.1}Mn_2O_4$) formed by a similar way to that in Example 1-2 and the material ($Li_{1.05}Ni_{1/3}Co_{1/3}Mn_{1/3}O_2$) formed in Example 1-8 was used. A mixture ratio of $Li_{1.1}Mn_2O_4$ and $Li_{1.05}Ni_{1/3}Co_{1/3}Mn_{1/3}O_2$ ($Li_{1.1}Mn_2O_4$:$Li_{1.05}Ni_{1/3}Co_{1/3}Mn_{1/3}O_2$ (in mass ratio)) was 20:80. A test battery was formed by a similar way to that in Example 1-1, except for the above-described points.

Example 1-10

As a cathode active material, a material formed through mixing a material ($Li_{1.1}Mn_2O_4$) formed by a similar way to that in Example 1-2 and the material ($Li_{1.05}Ni_{1/3}Co_{1/3}Mn_{1/3}O_2$) formed in Example 1-8 was used. A mixture ratio of $Li_{1.1}Mn_2O_4$ and $Li_{1.05}Ni_{1/3}Co_{1/3}Mn_{1/3}O_2$ ($Li_{1.1}Mn_2O_4$: $Li_{1.05}Ni_{1/3}Co_{1/3}Mn_{1/3}O_2$ (in mass ratio)) was 40:60. A test battery was formed by a similar way to that in Example 1-1, except for the above-described points.

Example 1-11

As a cathode active material, a material formed through mixing a material ($Li_{1.1}Mn_2O_4$) formed by a similar way to that in Example 1-2 and the material ($Li_{1.05}Ni_{1/3}Co_{1/3}Mn_{1/3}O_2$) formed in Example 1-8 was used. A mixture ratio of $Li_{1.1}Mn_2O_4$ and $Li_{1.05}Ni_{1/3}CO_{1/3}Mn_{1/3}O_2$ ($Li_{1.1}Mn_2O_4$: $Li_{1.05}Ni_{1/3}Co_{1/3}Mn_{1/3}O_2$ (in mass ratio)) was 80:20. The warming process on the battery was not performed. A test battery was formed by a similar way to that in Example 1-1, except for the above-described points.

Comparative Example 1-1

As a cathode active material, only a material ($Li_{1.15}Ni_{0.5}CO_{0.2}Mn_{0.3}O_2$) formed by the following coprecipitation method was used. The warming temperature in the warming process on the battery was changed to 80° C. A test battery was formed by a similar way to that in Example 1-1, except for the above-described points.

(Formation of Cathode Active Material (Coprecipitation Method))

The cathode active material was formed by a similar way to that in Example 1-1, except that the firing temperature in firing of the precursor was changed to 850° C.

Comparative Example 1-2

As a cathode active material, a material formed through mixing the material ($Li_{1.1}Mn_2O_4$) formed by a similar way to that in Example 1-2 and the material ($Li_{1.05}Ni_{0.5}Co_{0.2}Mn_{0.3}O_2$) formed in Example 1-1 was used. A mixture ratio of $Li_{1.1}Mn_2O_4$ and $Li_{1.05}Ni_{0.5}Co_{0.2}Mn_{0.3}O_2$ ($Li_{1.1}Mn_2O_4$:$Li_{1.05}Ni_{0.5}Co_{0.2}Mn_{0.3}O_2$ (in mass ratio)) was 80:20. The warming process on the battery was not performed. A test battery was formed by a similar way to that in Example 1-1, except for the above-described points.

Comparative Example 1-3

As a cathode active material, only a material ($Li_{1.1}Mn_2O_4$) formed by a similar way to that in Example 1-2 was used. The warming process on the battery was not performed. A test battery was formed by a similar way to that in Example 1-1, except for the above-described points.

Comparative Example 1-4

As a cathode active material, only a material ($Li_{0.99}Ni_{0.5}Co_{0.2}Mn_{0.3}O_2$) formed by the following solid-phase method was used. A test battery was formed by a similar way to that in Example 1-1, except for the above-described point.

(Formation of Cathode Active Material (Solid-Phase Method))

Lithium carbonate as a lithium source, cobalt carbonate as a cobalt source, manganese carbonate as a manganese source, and nickel carbonate as a nickel source each were prepared with a predetermined composition ratio. These raw materials were pulverized and mixed in a mortar to form a mixture, and the mixture was fired in air at 800° C. Thus, $Li_{0.99}Ni0.5Co0.2Mn0.3O_2$ was obtained.

Comparative Example 1-5

As a cathode active material, only a material ($Li_{0.99}Ni_{0.5}Co_{0.2}Mn_{0.3}O_2$) formed by the following solid-phase forming method was used. A test battery was formed by a similar way to that in Example 1-1, except for the above-described point.

(Formation of Cathode Active Material (Solid-Phase Forming Method))

Lithium carbonate as a lithium source, cobalt carbonate as a cobalt source, manganese carbonate as a manganese source, and nickel carbonate as a nickel source each were prepared with a predetermined composition ratio. These raw materials were pulverized and mixed in a mortar, and a molding process in which powder of a precursor was compacted was performed to form a pellet, and then the pellet was fired in air at 800° C. It is to be noted that, in the molding process into the pellet, a cylindrical pellet with a diameter of 15 mm and a thickness of 5 mm was formed with a pressure of 30 MPa.

Comparative Example 1-6

In the warming process on the battery, the warming temperature was changed to 80° C. A test battery was formed by a similar way to that in Example 1-1, except for the above-described point.

Comparative Example 1-7

To form a precursor, lithium hydroxide was added to allow a mole ratio of Li and metal Me (Ni+Co+Mn) to be 0.97. The cathode active material was formed by a similar way to that in Example 1-1, except for the above-described point.

Comparative Example 1-8

The warming process on the battery was not performed. The cathode active material was formed by a similar way to that in Example 1-1, except for the above-described point.

Comparative Example 1-9

In the warming process on the battery, the warming temperature was changed to 90° C. A test battery was formed by a similar way to that in Example 1-1, except for the above-described point.

Comparative Example 1-10

As a cathode active material, only a material ($Li_{1.1}Mn_2O_4$) formed by a similar way to that in Example 1-2 was used. The warming process on the battery was not performed. A test battery was formed by a similar way to that in Example 1-1, except for the above-described points.

Comparative Example 1-11

As a cathode active material, only a material ($Li_{1.05}Ni_{1/3}Co_{1/3}Mn_{1/3}O_2$) formed by the following way was used. A test battery was formed by a similar way to that in Example 1-1, except for the above-described point.

(Formation of Cathode Active Material)

Nickel sulfate and cobalt sulfate were mixed at a mole ratio of Ni and Co (Ni:CO) of 1/3:1/3 to form a mixture, and then deionized water was added to the mixture to prepare a nickel-cobalt-containing solution. Ammonia water was dropped in the solution in small portions in an Ar gas atmosphere to allow the solution to react with ammonia water under an alkaline condition of pH 11 to pH 13 at 40° C. to 60° C., thereby precipitating and forming $Ni_{1/3}CO_{1/3}(OH)_2$ including nickel and cobalt as constituent elements in a reaction liquid.

A nickel-cobalt-containing hydroxide obtained in such a manner was collected, and then was added to deionized water. Next, manganese sulfate was added to the deionized water so as to allow a mole ratio of Mn and metal Me (Ni+Co+Mn) to be 1/3, and pH of a resultant liquid was adjusted within a range from 9.0 to 9.5 with use of sulfuric acid. Thus, $Ni_{1/3}CO_{1/3}Mn_{1/3}(OH)_2$ in which the above-described nickel-cobalt-containing hydroxide and manganese hydroxide were mixed was precipitated and formed in a reaction liquid in a state where $Ni_{1/3}CO_{1/3}Mn_{1/3}(OH)_2$ was precipitated or dispersed in the liquid.

Next, lithium hydroxide was added to the liquid so as to allow a mole ratio of Li and metal Me (Ni+Co+Mn) to be 1.05. A resultant precipitate was put into a typical mixer, and was sufficiently mixed and granulated in an inert gas atmosphere by the mixer to obtain a precursor.

(Firing of Precursor)

The precursor completed by the above-described way was fired in oxygen at 700° C. Thus, a target material ($Li_{1.05}Ni_{1/3}Co_{1/3}Mn_{1/3}O_2$) was obtained.

Comparative Example 1-8

As a cathode active material, a material formed through mixing a material ($Li_{1.1}Mn_2O_4$) formed by a similar way to that in Example 1-2 and the material ($Li_{1.05}Ni_{1/3}Co_{1/3}Mn_{1/3}O_2$) formed in Comparative Example 1-7 was used. A mixture ratio of $Li_{1.1}Mn_2O_4$ and $Li_{1.05}Ni_{1/3}CO_{1/3}Mn_{1/3}O_2$ ($Li_{1.1}Mn_2O_4$:$Li_{1.05}Ni_{1/3}CO_{1/3}Mn_{1/3}O_2$ (in mass ratio)) was 20:80. A test battery was formed by a similar way to that in Example 1-1, except for the above-described points.

Comparative Example 1-9

In the warming process on the battery, the warming temperature was changed to 90° C. A test battery was formed by a similar way to that in Example 1-1, except for the above-described point.

Comparative Example 1-10

As a cathode active material, only a material ($Li_{1.1}Mn_2O_4$) formed by a similar way to that in Example 1-2 was used. The warming process on the battery was not performed. A test battery was formed by a similar way to that in Example 1-1, except for the above-described points.

Comparative Example 1-11

As a cathode active material, only a material ($Li_{0.99}Ni_{1/3}CO_{1/3}Mn_{1/3}O_2$) formed by the following solid-phase method was used. A test battery was formed by a similar way to that in Example 1-1, except for the above-described point.

(Formation of Cathode Active Material (Solid-Phase Method))

Lithium carbonate as a lithium source, cobalt carbonate as a cobalt source, manganese carbonate as a manganese source, and nickel carbonate as a nickel source each were prepared with a predetermined composition ratio. These raw materials were pulverized and mixed in a mortar to form a mixture, and the mixture was fired in air at 800° C. Thus, a target material ($Li_{0.99}Ni_{1/3}Co_{1/3}Mn_{1/3}O_2$) was obtained.

Comparative Example 1-12

As a cathode active material, only a material ($Li_{0.99}Ni_{1/3}CO_{1/3}Mn_{1/3}O_2$) formed by the following solid-phase forming method was used. A test battery was formed by a similar way to that in Example 1-1, except for the above-described point.

(Formation of Cathode Active Material (Solid-Phase Forming Method))

Lithium carbonate as a lithium source, cobalt carbonate as a cobalt source, manganese carbonate as a manganese source, and nickel carbonate as a nickel source each were prepared with a predetermined composition ratio. These raw materials were pulverized and mixed in a mortar, and a molding process in which powder of a precursor was compacted was performed to form a pellet, and then the pellet was fired in air at 800° C. It is to be noted that, in the molding process into the pellet, a cylindrical pellet with a diameter of 15 mm and a thickness of 5 mm was formed with a pressure of 30 MPa.

Example 2-1

As a cathode active material, only a material ($Li_{1.05}Ni_{0.8}Co_{0.15}Al_{0.05}O_2$) formed by the following coprecipitation method was used. A test battery was formed by a similar way to that in Example 1-1, except for the above-described point.

(Formation of Cathode Active Material (Coprecipitation Method))

Nickel sulfate and cobalt sulfate were mixed at a mole ratio of Ni and Co (Ni:Co) of 0.8:0.15 to form a mixture, and then deionized water was added to the mixture to prepare a nickel-cobalt-containing solution. Ammonia water was dropped in the solution in small portions in an Ar gas atmosphere to allow the solution to react with ammonia water under an alkaline condition of pH 11 to pH 13 at 40° C. to 60° C., thereby precipitating and forming $Ni_{0.8}Co_{0.15}(OH)_2$ including nickel and cobalt as constituent elements in a reaction liquid.

A nickel-cobalt-containing hydroxide obtained in such a manner was collected, and then was added to deionized water. Next, sodium aluminate was added to the deionized water so as to allow a mole ratio of Al and metal Me (Co+Ni+Al) to be 0.05, and pH of a resultant liquid was adjusted within a range from 9.0 to 9.5 with use of sulfuric acid. Thus, $Ni_{0.8}CO_{0.15}Al_{0.05}(OH)_2$ in which the above-described nickel-cobalt-containing hydroxide and aluminum hydroxide were mixed was precipitated and formed in a reaction liquid in a state where $Ni_{0.8}Co_{0.15}Al_{0.05}(OH)_2$ was precipitated or dispersed in the liquid.

Next, lithium hydroxide was added to the liquid so as to allow a mole ratio of Li and metal Me (Al+Ni+Co) to be 1.05. A resultant precipitate was put into a typical mixer, and was sufficiently mixed and granulated in an inert gas atmosphere by the mixer to obtain a precursor.

(Firing of Precursor)

The precursor completed by the above-described way was fired in oxygen at 700° C. Thus, a target material ($Li_{1.05}Ni_{0.8}Co_{0.15}Al_{0.05}O_2$) was obtained.

Example 2-2

Cathode Active Material

As a cathode active material, a material formed through mixing a material ($Li_{1.1}Mn_2O_4$) formed by a similar way to that in Example 1-2 and the material ($Li_{1.05}Ni_{0.8}Co_{0.15}Al_{0.05}O_2$) formed in Example 2-1 was used. A mixture ratio of $Li_{1.1}Mn_2O_4$ and $Li_{1.05}Ni_{0.8}CO_{0.15}Al_{0.05}O_2$ ($Li_{1.1}Mn_2O_4$:$Li_{1.05}Ni_{0.8}Co_{0.15}Al_{0.05}O_2$ (in mass ratio)) was 20:80. A test battery was formed by a similar way to that in Example 2-1, except for the above-described points.

Example 2-3

As a cathode active material, a material formed through mixing a material ($Li_{1.1}Mn_2O_4$) formed by a similar way to that in Example 1-2 and the material ($Li_{1.05}Ni_{0.8}Co_{0.15}Al_{0.05}O_2$) formed in Example 2-1 was used. A mixture ratio of $Li_{1.1}Mn_2O_4$ and $Li_{1.05}Ni_{0.8}CO_{0.15}Al_{0.05}O_2$ ($Li_{1.1}Mn_2O_4$:$Li_{1.05}Ni_{0.8}Co_{0.15}Al_{0.05}O_2$ (in mass ratio)) was 40:60. A test battery was formed by a similar way to that in Example 2-1, except for the above-described points.

Example 2-4

As a cathode active material, only a material ($Li_{1.15}Ni_{0.8}Co_{0.15}Al_{0.05}O_2$) formed by the following way was used. A test battery was formed by a similar way to that in Example 2-1, except for the above-described point.

(Formation of Cathode Active Material)

To form a precursor, lithium hydroxide was added to allow a mole ratio of Li and metal Me (Ni+Co+Al) to be 1.15. The cathode active material was formed by a similar way to that in Example 2-1, except that the firing temperature in firing of the precursor was changed to 800° C.

Example 2-5

To form a precursor, lithium hydroxide was added to allow a mole ratio of Li and metal Me (Ni+Co+Al) to be 0.99. In the warming process on the battery, the warming temperature was changed to 40° C. A test battery was formed by a similar way to that in Example 2-1, except for the above-described points.

Example 2-6

In the warming process on the battery, the warming temperature was changed to 70° C. A test battery was formed by a similar way to that in Example 2-1, except for the above-described point.

Example 2-7

In the warming process on the battery, the warming temperature was changed to 30° C. A test battery was formed by a similar way to that in Example 2-1, except for the above-described point.

Comparative Example 2-1

As a cathode active material, only a material ($Li_{1.15}Ni_{0.8}Co_{0.15}Al_{0.05}O_2$) formed by the following coprecipitation method was used. The warming temperature in the warming process on the battery was changed to 80° C. A test battery was formed by a similar way to that in Example 2-1, except for the above-described points.

(Formation of Cathode Active Material (Coprecipitation Method))

The cathode active material was formed by a similar way to that in Example 2-1, except that the firing temperature in firing of the precursor was changed to 850° C.

Comparative Example 2-2

As a cathode active material, a material formed through mixing a material ($Li_{1.1}Mn_2O_4$) formed by a similar manner to that in Example 1-2 and the material ($Li_{1.05}Ni_{0.8}Co_{0.15}Al_{0.05}O_2$) formed in Example 2-1 was used. A mixture ratio of $Li_{1.1}Mn_2O_4$ and $Li_{1.05}Ni_{0.8}Co_{0.15}Al_{0.05}O_2$ ($Li_{1.1}Mn_2O_4$: $Li_{1.05}Ni_{0.8}Co_{0.15}Al_{0.05}O_2$ (in mass ratio)) was 20:80. The warming process on the battery was not performed. A test battery was formed by a similar way to that in Example 2-1, except for the above-described points.

Comparative Example 2-3

As a cathode active material, only a material ($Li_{1.1}Mn_2O_4$) formed by a similar way to that in Example 1-2 was used. The warming process on the battery was not performed. A test battery was formed by a similar way to that in Example 2-1, except for the above-described points.

(Formation of Cathode Active Material (Solid-Phase Method))

Lithium carbonate as a lithium source and manganese carbonate as a manganese source each were prepared with a predetermined composition ratio. These raw materials were pulverized and mixed in a mortar to form a mixture, and the mixture was fired in air at 800° C. Thus, a target material ($Li_{1.1}Mn_2O_4$) was obtained.

Comparative Example 2-4

As a cathode active material, only a material ($Li_{0.99}Ni_{0.8}Co_{0.15}Al_{0.05}O_2$) formed by the following solid-phase method was used. A test battery was formed by a similar way to that in Example 2-1, except for the above-described point.

(Formation of Cathode Active Material (Solid-Phase Method))

Lithium carbonate as a lithium source, cobalt carbonate as a cobalt source, aluminum hydroxide as an aluminum source, and nickel carbonate as a nickel source each were prepared with a predetermined composition ratio. These raw materials were pulverized and mixed in a mortar to form a mixture, and the mixture was fired in air at 800° C. Thus, a target material ($Li_{0.99}Ni_{0.8}Co_{0.15}Al_{o05}O_2$) was obtained.

Comparative Example 2-5

As a cathode active material, only a material ($Li_{0.99}Ni_{0.8}Co_{0.15}Al_{0.05}O_2$) formed by the following solid-phase forming method was used. A test battery was formed by a similar way to that in Example 2-1, except for the above-described point.

(Formation of Cathode Active Material (Solid-Phase Forming Method))

Lithium carbonate as a lithium source, cobalt carbonate as a cobalt source, aluminum hydroxide as an aluminum source, and nickel carbonate as a nickel source each were prepared with a predetermined composition ratio. These raw materials were pulverized and mixed in a mortar, and a molding process in which powder of a precursor was compacted was performed to form a pellet, and then the pellet was fired in air at 800° C. It is to be noted that, in the molding process into the pellet, a cylindrical pellet with a diameter of 15 mm and a thickness of 5 mm was formed with a pressure of 30 MPa.

Comparative Example 2-6

In the warming process on the battery, the warming temperature was changed to 80° C. A test battery was formed by a similar way to that in Example 2-1, except for the above-described point.

Comparative Example 2-7

In the warming process on the battery, the warming temperature was changed to 80° C. A test battery was formed by a similar way to that in Example 2-1, except for the above-described point.

Comparative Example 2-8

To form a precursor, lithium hydroxide was added to allow a mole ratio of Li and metal Me (Ni+Co+Al) to be 0.97. In the warming process on the battery, the warming temperature was changed to 40° C. A test battery was formed by a similar way to that in Example 2-1, except for the above-described points.

Comparative Example 2-9

The warming process on the battery was not performed. The cathode active material was formed by a similar way to that in Example 2-1, except for the above-described point.

Comparative Example 2-10

In the warming process on the battery, the warming temperature was changed to 90° C. A test battery was formed by a similar way to that in Example 2-1, except for the above-described point.

Example 3-1

As a cathode active material, only a material ($Li_{1.05}Ni_{0.7}Co_{0.1}Mn_{0.2}$) formed by the following coprecipitation method was used. A test battery was formed by a similar way to that in Example 1-1, except for the above-described point.

(Formation of Cathode Active Material (Coprecipitation Method))

Nickel sulfate and cobalt sulfate were mixed at a mole ratio of Ni and Co (Ni:Co) of 0.7:0.1 to form a mixture, and then deionized water was added to the mixture to prepare a nickel-cobalt-containing solution. Ammonia water was dropped in the solution in small portions in an Ar gas atmosphere to allow the solution to react with ammonia water under an alkaline condition of pH 11 to pH 13 at 40° C. to 60° C., thereby precipitating and forming $Ni_{0.7}Co_{0.1}(OH)_2$ (coprecipitated hydroxide precursor) including nickel and cobalt as constituent elements in a reaction liquid.

A nickel-cobalt-containing hydroxide obtained in such a manner was collected, and was added to deionized water. Next, manganese sulfate was added to the deionized water so as to allow a mole ratio of Mn and metal Me (Ni+Co+Mn) to be 0.2, and pH of a resultant liquid was adjusted within a range from 9.0 to 9.5 with use of sulfuric acid. Thus, $Ni_{0.7}Co_{0.1}Mn_{0.2}(OH)_2$ in which the above-described nickel-cobalt-containing hydroxide and manganese hydroxide were mixed was precipitated and formed in a reaction liquid in a state where $Ni_{0.7}Co_{0.1}Mn_{0.2}(OH)_2$ was precipitated or dispersed in the liquid.

Next, lithium hydroxide was added to the liquid so as to allow a mole ratio of Li and metal Me (Ni+Co+Mn) to be 1.05. A resultant precipitate was put into a typical mixer, and was sufficiently mixed and granulated in an inert gas atmosphere by the mixer to obtain a precursor.

(Firing of Precursor)

The precursor completed by the above-described way was fired in oxygen at 700° C. Thus, a target material ($Li_{1.05}Ni_{0.7}Co_{0.1}Mn_{0.2}$) was obtained.

Example 3-2

As a cathode active material, a material formed through mixing a material ($Li_{1.1}Mn_2O_4$) formed by a similar way to that in Example 1-2 and the material ($Li_{1.05}Ni_{0.7}CO_{0.1}Mn_{0.2}$) formed in Example 3-1 was used. A mixture ratio of $Li_{1.1}Mn_2O_4$ and $Li_{1.05}Ni_{0.7}Co_{0.1}Mn_{0.2}$ $Li_{1.05}Ni_{0.7}Co_{0.01}Mn_{0.2}$ (in mass ratio)) was 20:80. A test battery was formed by a similar way to that in Example 3-1, except for the above-described points.

Example 3-3

Cathode Active Material

As a cathode active material, a material formed through mixing a material ($Li_{1.1}Mn_2O_4$) formed by a similar way to that in Example 1-2 and the material ($Li_{1.05}Ni_{0.7}CO_{0.1}Mn_{0.2}$) formed in Example 3-1 was used. A mixture ratio of $Li_{1.1}Mn_2O_4$ and $Li_{1.05}Ni_{0.7}Co_{0.1}Mn_{0.2}$ ($Li_{1.1}Mn_2O_4:Li_{1.05}Ni_{0.7}Co_{0.1}Mn_{0.2}$ (in mass ratio)) was 40:60. A test battery was formed by a similar way to that in Example 3-1, except for the above-described points.

Example 3-4

Cathode Active Material

As a cathode active material, only a material ($Li_{1.15}Ni_{0.7}Co_{0.1}Mn_{0.2}$) formed by the following way was used. A test battery was formed by a similar way to that in Example 3-1, except for the above-described point.

(Formation of Cathode Active Material)

To form a precursor, lithium hydroxide was added to allow a mole ratio of Li and metal Me (Ni+Co+Mn) to be 1.15. The cathode active material was formed by a similar way to that in Example 3-1, except that the firing temperature in firing of the precursor was changed to 800° C.

Comparative Example 3-1

As a cathode active material, only a material ($Li_{1.15}Ni_{0.7}Co_{0.1}Mn_{0.2}$) formed by the following coprecipitation method was used. The warming temperature in the warming process on the battery was changed to 80° C. A test battery was formed by a similar way to that in Example 3-1, except for the above-described points.

(Formation of Cathode Active Material (Coprecipitation Method))

The cathode active material was formed by a similar way to that in Example 3-1, except that the firing temperature in firing of the precursor was changed to 850° C.

Comparative Example 3-2

As a cathode active material, a material formed through mixing a material ($Li_{1.1}Mn_2O_4$) formed by a similar way to that in Example 1-2 and the material ($Li_{1.05}Ni_{0.7}Co_{0.1}Mn_{0.2}O_2$) formed in Example 3-1 was used. A mixture ratio of $Li_{1.1}Mn_2O_4$ and $Li_{1.05}Ni_{0.7}Co_{0.1}Mn_{0.2}O_2$ ($Li_{1.1}Mn_2O_4:Li_{1.05}Ni_{0.7}Co_{0.1}Mn_{0.2}O_2$ (in mass ratio)) was 20:80. The warming process on the battery was not performed. A test battery was formed by a similar way to that in Example 3-1, except for the above-described points.

Comparative Example 3-3

As a cathode active material, only a material ($Li_{1.1}Mn_2O_4$) formed by a similar way to that in Example 1-2 was used. The warming process on the battery was not performed. A test battery was formed by a similar way to that in Example 3-1, except for the above-described points.

Comparative Example 3-4

As a cathode active material, only a material ($Li_{0.99}Ni_{0.7}Co_{0.1}Mn_{0.2}$) formed by the following solid-phase method was used. A test battery was formed by a similar way to that in Example 3-1, except for the above-described point.

(Formation of Cathode Active Material (Solid-Phase Method))

Lithium carbonate as a lithium source, cobalt carbonate as a cobalt source, manganese carbonate as a manganese source, and nickel carbonate as a nickel source each were prepared with a predetermined composition ratio. These raw materials were pulverized and mixed in a mortar to form a mixture, and the mixture was fired in air at 800° C. Thus, a target material ($Li_{0.99}Ni_{0.7}Co_{0.1}Mn_{0.2}$) was obtained.

Comparative Example 3-5

As a cathode active material, only a material ($Li_{0.99}Ni_{0.7}Co_{0.1}Mn_{0.2}$) formed by the following solid-phase forming method was used. A test battery was formed by a similar way to that in Example 3-1, except for the above-described point.

(Formation of Cathode Active Material (Solid-Phase Forming Method))

Lithium carbonate as a lithium source, cobalt carbonate as a cobalt source, manganese carbonate as a manganese source, and nickel carbonate as a nickel source each were prepared with a predetermined composition ratio. These raw materials were pulverized and mixed in a mortar, and a molding process in which powder of a precursor was compacted was performed to form a pellet, and then the pellet was fired in air at 800° C. It is to be noted that, in the molding process into the pellet, a cylindrical pellet with a diameter of 15 mm and a thickness of 5 mm was formed with a pressure of 30 MPa.

Comparative Example 3-6

In the warming process on the battery, the warming temperature was changed to 80° C. A test battery was formed by a similar way to that in Example 3-1, except for the above-described point.

Examples 4-1 to 4-4 and Comparative Examples 4-1 to 4-6

To prepare an electrolytic solution, as an additive, instead of FEC, vinylene carbonate (VC) was added to the electrolytic solution in an amount of 1% by mass of the mass of the electrolytic solution. Test batteries formed by a similar way to that in Examples 1-1 to 1-4 and Comparative Examples 1-1 to 1-6, except for the above-described point.

Comparative Example 4-7

As a cathode active material, only a material ($Li_{1.05}Ni_{0.5}CO_{0.2}Mn_{0.3}O_2$) formed by the following coprecipitation method was used. In the warming process on the battery, the warming temperature was changed to 90° C. A test battery was formed by a similar way to that in Example 4-1, except for the above-described points.

(Formation of Cathode Active Material (Coprecipitation Method))

The cathode active material was formed by a similar way to that in Example 4-1, except that the firing temperature in firing of the precursor was changed to 850° C.

The following evaluations were performed on the above-described examples and the above-described comparative examples.

(Evaluation of Test Batteries)

(a) Charge-Discharge Cycle Characteristics

Each of the test batteries of the examples and the comparative examples was charged at a constant current of 1 C rate and then when the battery voltage reached 4.2 V, each of the batteries was charged at a constant voltage in a constant temperature bath at 23° C. After that, each of the batteries was discharged at a constant current of 5 C rate until the battery voltage reached 2.5 V. It is to be noted that "1 C" and "5 C" represent a current value at which the theoretical capacity of a battery is fully discharged for 1 hour and 0.2 hours, respectively.

A hundred cycles of charge and discharge were repeatedly performed on each of the batteries under the above-described conditions, and a capacity retention ratio in the 100th cycle was determined by the following expression.

Cycle retention ratio (%)=(discharge capacity in 100th cycle/initial discharge capacity)×100

(b) Evaluation of Increase in Resistance

After each of the test batteries of the examples and the comparative examples was formed, each of the batteries was charged at a constant current of 1 C rate in a constant temperature bath at 23° C. until the battery voltage reached 4.2 V. After that, AC impedance measurement was performed on each of the batteries, and impedance at 1 KHz was defined as "resistance before cycle". After that, 99 cycles of charge and discharge was repeatedly performed on each of the batteries in a constant temperature bath at 23° C. under charge-discharge conditions similar to the above-described charge-discharge conditions, and then each of the batteries was charged at a constant current of 1 C rate until the battery voltage reached 4.2 V. After that, AC impedance measurement was performed on each of the batteries, and impedance at 1 KHz was defined as "resistance after cycle". Then, a resistance increase rate was measured by the following expression.

Resistance increase rate (%)={("resistance after cycle"−"resistance before cycle")/"resistance before cycle"}×100(%)

(c) Capacity of active material per mass

The capacity of an active material per mass (mAh/g) was determined from discharge capacity at a current value of 0.2 C.

The following analysis was performed on the cathode active materials used for the test batteries. After each of the batteries was charged under charge conditions similar to those in the evaluation of the charge-discharge cycle characteristics, each of the batteries was discharged at a constant current of 0.1 C rate until the battery voltage reached 2.5 V. Then, the cathode was taken out of each of the batteries in a discharged state, and an X-ray diffraction pattern was measured by an X-ray diffractometer, and Rietveld analysis was performed. It is to be noted that a CuKα ray was used as an X-ray source.

(d) Calculation of occupancies at 3a and 3b sites by Rietveld analysis (1) Measurement was performed by an X-ray diffractometer in a 2θ range from 10° to 90° at a step of 0.02° and a counting time of 1.2.

(2) Analysis was performed with use of RIETAN2000 as analysis software.

(3) For example, in the case of $Li_yNi_wCo_xMn_yO_z$ or the like, a crystal structure thereof was refined to satisfy Rwp<8.0 and GOF<2.0, assuming that 100% of the crystal structure belonged to the R3-m space group, and its 3a site was occupied by Li and $Ni^{2+}$ with an ionic radium close to that of Li$^+$, and its 3b site was occupied by Mn, Co, Ni, and the same amount of Li as the amount of the above-described Ni$^{2+}$, and its 6c site was occupied by O, and the occupancy of oxygen and an isotropic temperature factor were variables.

Moreover, in the case of Li$_v$Ni$_w$Co$_x$Al$_y$O$_z$, it was assumed that 100% of the crystal structure belonged to the R3-m space group, and its 3a site was occupied by Li$^+$ and Ni$^{2+}$, its 3b site was occupied by Al, Co, Ni, and the same amount of Li as the amount of the above-described Ni$^{2+}$, and its 6c site was occupied by O.

(4) Site occupancy of each of the element at each of the 3a and 3b sites after refinement was determined as a calculation parameter result.

(e) Calculation of volume of regular octahedron structure configured of 3b site and oxygen by Rietveld analysis (1) A crystal structure diagram was drawn with use of the above-described Rietveld analysis result with use of software VESTA for analysis and structure drawing.

(2) A regular octahedron structure configured of the 3b site and oxygen was drawn, and its volume (in cubic angstroms) was calculated.

(3) The above-described calculation result was determined as a volume result of the regular octahedron configured of the 3b site and oxygen.

(f) Calculation of Half-Value Width (1) Measurement was performed by an X-ray diffractometer in a 2θ range from 10° to 90° at a step of 0.02° and a counting time of 1.2.

(2) In an X-ray diffraction pattern using a CuKα ray, a crystal structure was configured of a unitary structure belonging to R-3m, and half-value widths of peaks corresponding to crystal planes including a (003) plane, a (101) plane, and a (104) plane were calculated.

(3) An average of the half-value widths of the three peaks was determined as a half-value width.

(g) Calculation of exposed amount: ratio of metal element at 3b site by XPS/ratio of oxygen by XPS After each of the test batteries was assembled, each of the batteries was charged under charge conditions similar to those in the evaluation of the charge-discharge cycle characteristics, and then each of the batteries was discharged at a constant current of 0.1 rate until the battery voltage reached 2.5 V. Then, the cathode was taken out of each of the test batteries in a discharged state, and XPS measurement was performed on the cathode to calculate an exposed amount of the cathode active material.

Tables 1 and 2 illustrate kinds of cathode active materials, synthesizing methods, warming conditions, and the like in Examples 1-1 to 4-4 and Comparative Examples 1-1 to 4-6. Table 3 illustrates results obtained by XRD measurement, Rietveld analysis, and XPS measurement on Examples 1-1 to 4-4 and Comparative Example 1-1 to 4-6. Table 4 illustrates measurement results of the capacity of the active material per mass, the capacity retention ratio, the resistance increase rate in Examples 1-1 to 4-4 and Comparative Examples 1-1 to 4-6.

TABLE 1

| | Cathode Active Material | | |
|---|---|---|---|
| | Kind of Material | Kind of Material | Mass Ratio |
| Example 1-1 | — | Li$_{1.05}$Ni$_{0.5}$Co$_{0.2}$Mn$_{0.3}$O$_2$ | 0:100 |
| Example 1-2 | Li$_{1.1}$Mn$_2$O$_4$ | Li$_{1.05}$Ni$_{0.5}$Co$_{0.2}$Mn$_{0.3}$O$_2$ | 20:80 |

TABLE 1-continued

| | Cathode Active Material | | |
|---|---|---|---|
| | Kind of Material | Kind of Material | Mass Ratio |
| Example 1-3 | Li$_{1.1}$Mn$_2$O$_4$ | Li$_{1.05}$Ni$_{0.5}$Co$_{0.2}$Mn$_{0.3}$O$_2$ | 40:60 |
| Example 1-4 | — | Li$_{1.15}$Ni$_{0.5}$Co$_{0.2}$Mn$_{0.3}$O$_2$ | 0:100 |
| Example 1-5 | — | Li$_{0.99}$Ni$_{0.5}$Co$_{0.2}$Mn$_{0.3}$O$_2$ | 0:100 |
| Example 1-6 | — | Li$_{1.05}$Ni$_{0.5}$Co$_{0.2}$Mn$_{0.3}$O$_2$ | 0:100 |
| Example 1-7 | — | Li$_{1.05}$Ni$_{0.5}$Co$_{0.2}$Mn$_{0.3}$O$_2$ | 0:100 |
| Comparative Example 1-1 | — | Li$_{1.15}$Ni$_{0.5}$Co$_{0.2}$Mn$_{0.3}$O$_2$ | 0:100 |
| Comparative Example 1-2 | Li$_{1.1}$Mn$_2$O$_4$ | Li$_{1.05}$Ni$_{0.5}$Co$_{0.2}$Mn$_{0.3}$O$_2$ | 80:20 |
| Comparative Example 1-3 | Li$_{1.1}$Mn$_2$O$_4$ | — | 100:0 |
| Comparative Example 1-4 | — | Li$_{0.99}$Ni$_{0.5}$Co$_{0.2}$Mn$_{0.3}$O$_2$ | 0:100 |
| Comparative Example 1-5 | — | Li$_{0.99}$Ni$_{0.5}$Co$_{0.2}$Mn$_{0.3}$O$_2$ | 0:100 |
| Comparative Example 1-6 | — | Li$_{1.05}$Ni$_{0.5}$Co$_{0.2}$Mn$_{0.3}$O$_2$ | 0:100 |
| Comparative Example 1-7 | — | Li$_{0.97}$Ni$_{0.5}$Co$_{0.2}$Mn$_{0.3}$O$_2$ | 0:100 |
| Comparative Example 1-8 | — | Li$_{1.05}$Ni$_{0.5}$Co$_{0.2}$Mn$_{0.3}$O$_2$ | 0:100 |
| Comparative Example 1-9 | — | Li$_{1.05}$Ni$_{0.5}$Co$_{0.2}$Mn$_{0.3}$O$_2$ | 0:100 |
| Example 1-8 | — | Li$_{1.05}$Ni$_{1/3}$Co$_{1/3}$Mn$_{1/3}$O$_2$ | 0:100 |
| Example 1-9 | Li$_{1.1}$Mn$_2$O$_4$ | Li$_{1.05}$Ni$_{1/3}$Co$_{1/3}$Mn$_{1/3}$O$_2$ | 20:80 |
| Example 1-10 | Li$_{1.1}$Mn$_2$O$_4$ | Li$_{1.05}$Ni$_{1/3}$Co$_{1/3}$Mn$_{1/3}$O$_2$ | 40:60 |
| Example 1-11 | Li$_{1.1}$Mn$_2$O$_4$ | Li$_{1.05}$Ni$_{1/3}$Co$_{1/3}$Mn$_{1/3}$O$_2$ | 80:20 |
| Comparative Example 1-10 | Li$_{1.1}$Mn$_2$O$_4$ | — | 100:0 |
| Comparative Example 1-11 | — | Li$_{0.99}$Ni$_{1/3}$Co$_{1/3}$Mn$_{1/3}$O$_2$ | 0:100 |
| Comparative Example 1-12 | — | Li$_{0.99}$Ni$_{1/3}$Co$_{1/3}$Mn$_{1/3}$O$_2$ | 0:100 |
| Example 2-1 | — | Li$_{1.05}$Ni$_{0.8}$Co$_{0.15}$Al$_{0.05}$O$_2$ | 0:100 |
| Example 2-2 | Li$_{1.1}$Mn$_2$O$_4$ | Li$_{1.05}$Ni$_{0.8}$Co$_{0.15}$Al$_{0.05}$O$_2$ | 20:80 |
| Example 2-3 | Li$_{1.1}$Mn$_2$O$_4$ | Li$_{1.05}$Ni$_{0.8}$Co$_{0.15}$Al$_{0.05}$O$_2$ | 40:60 |
| Example 2-4 | — | Li$_{1.15}$Ni$_{0.8}$Co$_{0.15}$Al$_{0.05}$O$_2$ | 0:100 |
| Example 2-5 | — | Li$_{0.99}$Ni$_{0.8}$Co$_{0.15}$Al$_{0.05}$O$_2$ | 0:100 |
| Example 2-6 | — | Li$_{1.05}$Ni$_{0.8}$Co$_{0.15}$Al$_{0.05}$O$_2$ | 0:100 |
| Example 2-7 | — | Li$_{1.05}$Ni$_{0.8}$Co$_{0.15}$Al$_{0.05}$O$_2$ | 0:100 |
| Comparative Example 2-1 | — | Li$_{1.15}$Ni$_{0.8}$Co$_{0.15}$Al$_{0.05}$O$_2$ | 0:100 |
| Comparative Example 2-2 | Li$_{1.1}$Mn$_2$O$_4$ | Li$_{1.05}$Ni$_{0.8}$Co$_{0.15}$Al$_{0.05}$O$_2$ | 80:20 |
| Comparative Example 2-3 | Li$_{1.1}$Mn$_2$O$_4$ | — | 100:0 |
| Comparative Example 2-4 | — | Li$_{0.99}$Ni$_{0.8}$Co$_{0.15}$Al$_{0.05}$O$_2$ | 0:100 |
| Comparative Example 2-5 | — | Li$_{0.99}$Ni$_{0.8}$Co$_{0.15}$Al$_{0.05}$O$_2$ | 0:100 |
| Comparative Example 2-6 | — | Li$_{1.05}$Ni$_{0.8}$Co$_{0.15}$Al$_{0.05}$O$_2$ | 0:100 |
| Comparative Example 2-7 | — | Li$_{1.05}$Ni$_{0.8}$Co$_{0.15}$Al$_{0.05}$O$_2$ | 0:100 |
| Comparative Example 2-8 | — | Li$_{0.97}$Ni$_{0.8}$Co$_{0.15}$Al$_{0.05}$O$_2$ | 0:100 |
| Comparative Example 2-9 | — | Li$_{1.05}$Ni$_{0.8}$Co$_{0.15}$Al$_{0.05}$O$_2$ | 0:100 |
| Comparative Example 2-10 | — | Li$_{1.05}$Ni$_{0.8}$Co$_{0.15}$Al$_{0.05}$O$_2$ | 0:100 |
| Example 3-1 | — | Li$_{1.05}$Ni$_{0.7}$Co$_{0.1}$Mn$_{0.2}$O$_2$ | 0:100 |
| Example 3-2 | Li$_{1.1}$Mn$_2$O$_4$ | Li$_{1.05}$Ni$_{0.7}$Co$_{0.1}$Mn$_{0.2}$O$_2$ | 20:80 |
| Example 3-3 | Li$_{1.1}$Mn$_2$O$_4$ | Li$_{1.05}$Ni$_{0.7}$Co$_{0.1}$Mn$_{0.2}$O$_2$ | 40:60 |
| Example 3-4 | — | Li$_{1.15}$Ni$_{0.7}$Co$_{0.1}$Mn$_{0.2}$O$_2$ | 0:100 |
| Comparative Example 3-1 | — | Li$_{1.15}$Ni$_{0.7}$Co$_{0.1}$Mn$_{0.2}$O$_2$ | 0:100 |
| Comparative Example 3-2 | Li$_{1.1}$Mn$_2$O$_4$ | Li$_{1.05}$Ni$_{0.7}$Co$_{0.1}$Mn$_{0.2}$O$_2$ | 80:20 |
| Comparative Example 3-3 | Li$_{1.1}$Mn$_2$O$_4$ | — | 100:0 |
| Comparative Example 3-4 | — | Li$_{0.99}$Ni$_{0.7}$Co$_{0.1}$Mn$_{0.2}$O$_2$ | 0:100 |
| Example 3-5 | — | Li$_{0.99}$Ni$_{0.7}$Co$_{0.1}$Mn$_{0.2}$O$_2$ | 0:100 |
| Comparative | — | Li$_{1.05}$Ni$_{0.7}$Co$_{0.1}$Mn$_{0.2}$O$_2$ | 0:100 |

TABLE 1-continued

| | Cathode Active Material | | |
|---|---|---|---|
| | Kind of Material | Kind of Material | Mass Ratio |
| Example 3-6 | — | $Li_{1.05}Ni_{0.5}Co_{0.2}Mn_{0.3}O_2$ | 0:100 |
| Example 4-1 | — | $Li_{1.05}Ni_{0.5}Co_{0.2}Mn_{0.3}O_2$ | 0:100 |
| Example 4-2 | $Li_{1.1}Mn_2O_4$ | $Li_{1.05}Ni_{0.5}Co_{0.2}Mn_{0.3}O_2$ | 20:80 |
| Example 4-3 | $Li_{1.1}Mn_2O_4$ | $Li_{1.05}Ni_{0.5}Co_{0.2}Mn_{0.3}O_2$ | 40:60 |
| Example 4-4 | — | $Li_{1.15}Ni_{0.5}Co_{0.2}Mn_{0.3}O_2$ | 0:100 |
| Comparative Example 4-1 | — | $Li_{1.15}Ni_{0.5}Co_{0.2}Mn_{0.3}O_2$ | 0:100 |
| Comparative Example 4-2 | $Li_{1.1}Mn_2O_4$ | $Li_{1.05}Ni_{0.5}Co_{0.2}Mn_{0.3}O_2$ | 80:20 |
| Comparative Example 4-3 | $Li1.1Mn2O4$ | — | 100:0 |
| Comparative Example 4-4 | — | $Li_{0.99}Ni_{0.5}Co_{0.2}Mn_{0.3}O_2$ | 0:100 |
| Comparative Example 4-5 | — | $Li_{0.99}Ni_{0.5}Co_{0.2}Mn_{0.3}O_2$ | 0:100 |
| Comparative Example 4-6 | — | $Li_{1.05}Ni_{0.5}Co_{0.2}Mn_{0.3}O_2$ | 0:100 |
| Comparative Example 4-7 | — | $Li_{1.05}Ni_{0.5}Co_{0.2}Mn_{0.3}O_2$ | 0:100 |

TABLE 2

| | Synthesizing Method | Li/Me Ratio (Layered Oxide) | Firing Temperature (° C.) | Warming Condition Temperatur | Time | Electrolytic Solution (Additive) |
|---|---|---|---|---|---|---|
| Example 1-1 | Coprecipitation Method | 1.05 | 700 | 50° C. | 24 hours | FEC |
| Example 1-2 | Coprecipitation Method | 1.05 | 700 | 50° C. | 24 hours | FEC |
| Example 1-3 | Coprecipitation Method | 1.05 | 700 | 550° C. | 24 hours | FEC |
| Example 1-4 | Coprecipitation Method | 1.15 | 800 | 50° C. | 24 hours | FEC |
| Example 1-5 | Coprecipitation Method | 0.99 | 700 | 50° C. | 24 hours | FEC |
| Example 1-6 | Coprecipitation Method | 1.05 | 700 | 70° C. | 24 hours | FEC |
| Example 1-7 | Coprecipitation Method | 1.05 | 700 | 30° C. | 24 hours | FEC |
| Comparative Example 1-1 | Coprecipitation Method | 1.15 | 850 | 80° C. | 24 hours | FEC |
| Comparative Example 1-2 | Coprecipitation Method | 1.05 | 700 | — | — | FEC |
| Comparative Example 1-3 | Solid-phase Method | — | 800 | — | — | FEC |
| Comparative Example 1-4 | Solid-phase Method | 0.99 | 800 | 50° C. | 24 hours | FEC |
| Comparative Example 1-5 | Solid-phase Forming | 0.99 | 800 | 50° C. | 24 hours | FEC |
| Comparative Example 1-6 | Coprecipitation Method | 1.05 | 700 | 80° C. | 24 hours | FEC |
| Comparative Example 1-7 | Coprecipitation Method | 0.97 | 700 | 50° C. | 24 hours | FEC |
| Comparative Example 1-8 | Coprecipitation Method | 1.05 | 700 | — | — | FEC |
| Comparative Example 1-9 | Coprecipitation Method | 1.05 | 700 | 90° C. | 24 hours | FEC |
| Example 1-8 | Coprecipitation Method | 1.05 | 700 | 50° C. | 24 hours | FEC |
| Example 1-9 | Coprecipitation Method | 1.05 | 700 | 50° C. | 24 hours | FEC |
| Example 1-10 | Coprecipitation Method | 1.05 | 700 | 50° C. | 24 hours | FEC |
| Example 1-11 | Coprecipitation Method | 1.05 | 700 | — | — | FEC |
| Comparative Example 1-10 | Solid-phase Method | — | 800 | — | — | FEC |
| Comparative Example 1-11 | Solid-phase Method | 0.99 | 800 | 50° C. | 24 hours | FEC |
| Comparative Example 1-12 | Solid-phase Forming | 0.99 | 800 | 50° C. | 24 hours | FEC |
| Example 2-1 | Coprecipitation Method | 1.05 | 700 | 50° C. | 24 hours | FEC |
| Example 2-2 | Coprecipitation Method | 1.05 | 700 | 50° C. | 24 hours | FEC |
| Example 2-3 | Coprecipitation Method | 1.05 | 700 | 50° C. | 24 hours | FEC |
| Example 2-4 | Coprecipitation Method | 1.15 | 800 | 50° C. | 24 hours | FEC |
| Example 2-5 | Coprecipitation Method | 0.99 | 700 | 40° C. | 24 hours | FEC |
| Example 2-6 | Coprecipitation Method | 1.05 | 700 | 70° C. | 24 hours | FEC |
| Example 2-7 | Coprecipitation Method | 1.05 | 700 | 30° C. | 24 hours | FEC |
| Comparative Example 2-1 | Coprecipitation Method | 1.15 | 850 | 80° C. | 24 hours | FEC |
| Comparative Example 2-2 | Coprecipitation Method | 1.05 | 700 | — | — | FEC |
| Comparative Example 2-3 | Solid-phase Method | — | 800 | — | — | FEC |
| Comparative Example 2-4 | Solid-phase Method | 0.99 | 800 | 50° C. | 24 hours | FEC |
| Comparative Example 2-5 | Solid-phase Forming | 0.99 | 800 | 50° C. | 24 hours | FEC |
| Comparative Example 2-6 | Coprecipitation Method | 1.05 | 700 | 80° C. | 24 hours | FEC |
| Comparative Example 2-7 | Coprecipitation Method | 1.05 | 700 | 80° C. | 24 hours | FEC |
| Comparative Example 2-8 | Coprecipitation Method | 0.97 | 700 | 40° C. | 24 hours | FEC |
| Comparative Example 2-9 | Coprecipitation Method | 1.05 | 700 | — | — | FEC |
| Comparative Example 2-10 | Coprecipitation Method | 1.05 | 700 | 90° C. | 24 hours | FEC |
| Example 3-1 | Coprecipitation Method | 1.05 | 700 | 50° C. | 24 hours | FEC |
| Example 3-2 | Coprecipitation Method | 1.05 | 700 | 50° C. | 24 hours | FEC |
| Example 3-3 | Coprecipitation Method | 1.05 | 700 | 50° C. | 24 hours | FEC |
| Example 3-4 | Coprecipitation Method | 1.15 | 800 | 50° C. | 24 hours | FEC |
| Comparative Example 3-1 | Coprecipitation Method | 1.15 | 850 | 80° C. | 24 hours | FEC |
| Comparative Example 3-2 | Coprecipitation Method | 1.05 | 700 | — | — | FEC |
| Comparative Example 3-3 | Solid-phase Method | — | 800 | — | — | FEC |
| Comparative Example 3-4 | Solid-phase Method | 0.99 | 800 | 50° C. | 24 hours | FEC |
| Comparative Example 3-5 | Solid-phase Forming | 0.99 | 800 | 50° C. | 24 hours | FEC |
| Comparative Example 3-6 | Coprecipitation Method | 1.05 | 700 | 80° C. | 24 hours | FEC |
| Example 4-1 | Coprecipitation Method | 1.05 | 700 | 50° C. | 24 hours | VC |
| Example 4-2 | Coprecipitation Method | 1.05 | 700 | 50° C. | 24 hours | VC |
| Example 4-3 | Coprecipitation Method | 1.05 | 700 | 50° C. | 24 hours | VC |
| Example 4-4 | Coprecipitation Method | 1.15 | 800 | 50° C. | 24 hours | VC |

TABLE 2-continued

|  | Synthesizing Method | Li/Me Ratio (Layered Oxide) | Firing Temperature (° C.) | Warming Condition Temperatur | Time | Electrolytic Solution (Additive) |
|---|---|---|---|---|---|---|
| Comparative Example 4-1 | Coprecipitation Method | 1.15 | 850 | 80° C. | 24 hours | VC |
| Comparative Example 4-2 | Coprecipitation Method | 1.05 | 700 | — | — | VC |
| Comparative Example 4-3 | Solid-phase Method | — | 800 | — | — | VC |
| Comparative Example 4-4 | Solid-phase Method | 0.99 | 800 | 50° C. | 24 hours | VC |
| Comparative Example 4-5 | Solid-phase Forming | 0.99 | 800 | 50° C. | 24 hours | VC |
| Comparative Example 4-6 | Coprecipitation Method | 1.05 | 700 | 80° C. | 24 hours | VC |
| Comparative Example 4-7 | Coprecipitation Method | 1.05 | 850 | 90° C. | 24 hours | VC |

TABLE 3

|  | Cathode at 2.5 V (First Cathode Material; Layered Oxide) | | | | | | | |
|---|---|---|---|---|---|---|---|---|
|  | Peak at 2θ = 31 ± 1 | IA/IB | Site Occupancy of Metal Ions Other Than Lithium at 3a Site (%) | Site Occupancy of Metal Ions Other Than Metal X Occupying Part of 3b Site at 3b Site (%) | Metal X | Volume of Regular Octahedron Structure Configured of 3b Site and Oxygen (Cubic Angstrom) | Exposed Amount (Ratio of 3b Site Metal Element by XPS/Ratio of Oxygen by XPS (%)) | Average of Half-value Widths |
| Example 1-1 | Not Observed | 1.53 | 4.49 | 4.49 | Ni, Co, Mn | 10.01 | 3.50 | 0.145 |
| Example 1-2 | Not Observed | 1.75 | 4.31 | 4.31 | Ni, Co, Mn | 10.05 | 6.60 | 0.147 |
| Example 1-3 | Not Observed | 1.85 | 4.23 | 4.23 | Ni, Co, Mn | 10.05 | 7.90 | 0.147 |
| Example 1-4 | Not Observed | 1.54 | 1.06 | 1.06 | Ni, Co, Mn | 10.02 | 3.52 | 0.136 |
| Example 1-5 | Not Observed | 1.53 | 4.98 | 4.98 | Ni, Co, Mn | 10.03 | 3.65 | 0.145 |
| Example 1-6 | Not Observed | 1.53 | 4.49 | 4.49 | Ni, Co, Mn | 10.02 | 0.06 | 0.146 |
| Example 1-7 | Not Observed | 1.53 | 4.49 | 4.49 | Ni, Co, Mn | 10.02 | 7.90 | 0.143 |
| Comparative Example 1-1 | Not Observed | 1.51 | 0.99 | 0.99 | Ni, Co, Mn | 9.99 | 0.04 | 0.135 |
| Comparative Example 1-2 | Not Observed | 1.89 | 4.11 | 4.11 | Ni, Co, Mn | 10.01 | 8.50 | 0.146 |
| Comparative Example 1-3 | Not Observed | 1.53 | — | — | — | — | 9.00 | — |
| Comparative Example 1-4 | Observed | 1.53 | 5.50 | 5.50 | Ni, Co, Mn | 10.07 | 3.00 | 0.134 |
| Comparative Example 1-5 | Not Observed | 1.43 | 5.90 | 5.90 | Ni, Co, Mn | 10.54 | 4.00 | 0.132 |
| Comparative Example 1-6 | Not Observed | 1.53 | 4.49 | 4.49 | Ni, Co, Mn | 10.01 | 0.04 | 0.159 |
| Comparative Example 1-7 | Not Observed | 1.53 | 5.02 | 5.02 | Ni, Co, Mn | 10.02 | 3.70 | 0.136 |
| Comparative Example 1-8 | Not Observed | 1.53 | 4.49 | 4.49 | Ni, Co, Mn | 10.04 | 8.10 | 0.145 |
| Comparative Example 1-9 | Not Observed | 1.53 | 0.99 | 0.99 | Ni, Co, Mn | 9.99 | 7.99 | 0.152 |
| Example 1-8 | Not Observed | 1.50 | 3.24 | 3.24 | Ni, Co, Mn | 10.11 | 3.20 | 0.142 |
| Example 1-9 | Not Observed | 1.63 | 3.15 | 3.15 | Ni, Co, Mn | 10.12 | 5.50 | 0.144 |
| Example 1-10 | Not Observed | 1.72 | 3.09 | 3.09 | Ni, Co, Mn | 10.09 | 6.90 | 0.145 |
| Example 1-11 | Not Observed | 1.91 | 3.30 | 3.30 | Ni, Co, Mn | 10.15 | 8.00 | 0.144 |
| Comparative Example 1-10 | Not Observed | 1.50 | — | — | — | — | 8.50 | — |
| Comparative Example 1-11 | Observed | 1.50 | 5.25 | 5.25 | Ni, Co, Mn | 10.16 | 2.50 | 0.133 |
| Comparative Example 1-12 | Not Observed | 1.44 | 5.55 | 5.55 | Ni, Co, Mn | 10.51 | 3.50 | 0.133 |
| Example 2-1 | Not Observed | 1.59 | 2.21 | 2.21 | Ni, Co, Al | 9.85 | 4.00 | 0.142 |

TABLE 3-continued

| | | | Cathode at 2.5 V (First Cathode Material; Layered Oxide) | | | | | |
|---|---|---|---|---|---|---|---|---|
| | Peak at $2\theta = 31 \pm 1$ | IA/IB | Site Occupancy of Metal Ions Other Than Lithium at 3a Site (%) | Site Occupancy of Metal Ions Other Than Metal X Occupying Part of 3b Site at 3b Site (%) | Metal X | Volume of Regular Octahedron Structure Configured of 3b Site and Oxygen (Cubic Angstrom) | Exposed Amount (Ratio of 3b Site Metal Element by XPS/Ratio of Oxygen by XPS (%)) | Average of Half-value Widths |
| Example 2-2 | Not Observed | 1.69 | 2.20 | 2.20 | Ni, Co, Al | 9.89 | 7.00 | 0.145 |
| Example 2-3 | Not Observed | 1.76 | 2.15 | 2.15 | Ni, Co, Al | 9.9 | 7.90 | 0.144 |
| Example 2-4 | Not Observed | 1.62 | 1.05 | 1.05 | Ni, Co, Al | 9.91 | 4.06 | 0.145 |
| Example 2-5 | Not Observed | 1.59 | 4.98 | 4.98 | Ni, Co, Al | 9.87 | 2.90 | 0.144 |
| Example 2-6 | Not Observed | 1.59 | 2.21 | 2.21 | Ni, Co, Al | 9.85 | 0.06 | 0.145 |
| Example 2-7 | Not Observed | 1.59 | 2.21 | 2.21 | Ni, Co, Al | 9.87 | 7.96 | 0.143 |
| Comparative Example 2-1 | Not Observed | 1.68 | 0.98 | 0.98 | Ni, Co, Al | 9.8 | 0.03 | 0.146 |
| Comparative Example 2-2 | Not Observed | 1.90 | 2.50 | 2.50 | Ni, Co, Al | 9.85 | 8.62 | 0.143 |
| Comparative Example 2-3 | Not Observed | 1.59 | — | — | — | — | 8.90 | — |
| Comparative Example 2-4 | Observed | 1.59 | 5.62 | 5.62 | Ni, Co, Al | 9.86 | 3.40 | 0.145 |
| Comparative Example 2-5 | Not Observed | 1.48 | 5.89 | 5.89 | Ni, Co, Al | 10.52 | 3.30 | 0.134 |
| Comparative Example 2-6 | Not Observed | 1.51 | 4.58 | 4.58 | Ni, Co, Al | 10.01 | 0.04 | 0.155 |
| Comparative Example 2-7 | Not Observed | 1.59 | 2.21 | 2.21 | Ni, Co, Al | 9.85 | 0.04 | 0.155 |
| Comparative Example 2-8 | Not Observed | 1.59 | 5.02 | 5.02 | Ni, Co, Al | 9.89 | 3.20 | 0.137 |
| Comparative Example 2-9 | Not Observed | 1.59 | 2.21 | 2.21 | Ni, Co, Al | 9.86 | 8.02 | 0.145 |
| Comparative Example 2-10 | Not Observed | 1.59 | 0.99 | 0.99 | Ni, Co, Al | 9.82 | 7.93 | 0.153 |
| Example 3-1 | Not Observed | 1.50 | 4.32 | 4.32 | Ni, Co, Mn | 9.95 | 3.85 | 0.146 |
| Example 3-2 | Not Observed | 1.65 | 4.30 | 4.30 | Ni, Co, Mn | 9.99 | 6.62 | 0.148 |
| Example 3-3 | Not Observed | 1.79 | 4.21 | 4.21 | Ni, Co, Mn | 9.93 | 7.95 | 0.145 |
| Example 3-4 | Not Observed | 1.48 | 1.04 | 1.04 | Ni, Co, Mn | 9.94 | 3.58 | 0.135 |
| Comparative Example 3-1 | Not Observed | 1.49 | 0.98 | 0.98 | Ni, Co, Mn | 9.85 | 0.04 | 0.36 |
| Comparative Example 3-2 | Not Observed | 1.86 | 4.12 | 4.12 | Ni, Co, Mn | 9.86 | 8.45 | 0.144 |
| Comparative Example 3-3 | Not Observed | 1.50 | — | — | — | — | 9.06 | — |
| Comparative Example 3-4 | Observed | 1.51 | 5.48 | 5.48 | Ni, Co, Mn | 9.93 | 3.01 | 0.133 |
| Comparative Example 3-5 | Not Observed | 1.42 | 5.85 | 5.85 | Ni, Co, Mn | 10.52 | 4.06 | 0.131 |
| Comparative Example 3-6 | Not Observed | 1.52 | 4.48 | 4.48 | Ni, Co, Mn | 10 | 0.04 | 0.158 |
| Example 4-1 | Not Observed | 1.52 | 4.48 | 4.48 | Ni, Co, Al | 10.02 | 3.53 | 0.145 |
| Example 4-2 | Not Observed | 1.74 | 4.30 | 4.30 | Ni, Co, Al | 10.06 | 6.65 | 0.146 |
| Example 4-3 | Not Observed | 1.86 | 4.21 | 4.21 | Ni, Co, Al | 10.06 | 7.93 | 0.146 |
| Example 4-4 | Not Observed | 1.55 | 1.05 | 1.05 | Ni, Co, Al | 10.05 | 3.55 | 0.138 |
| Comparative Example 4-1 | Not Observed | 1.51 | 0.99 | 0.99 | Ni, Co, Al | 9.98 | 0.04 | 0.35 |
| Comparative Example 4-2 | Not Observed | 1.85 | 4.11 | 4.11 | Ni, Co, Al | 10.02 | 8.51 | 0.146 |
| Comparative Example 4-3 | Not Observed | 1.52 | — | — | — | — | 9.01 | — |
| Comparative Example 4-4 | Observed | 1.52 | 5.49 | 5.49 | Ni, Co, Al | 10.06 | 3.01 | 0.135 |
| Comparative Example 4-5 | Not Observed | 1.42 | 5.85 | 5.85 | Ni, Co, Al | 10.53 | 4.01 | 0.133 |

TABLE 3-continued

| | | | Cathode at 2.5 V (First Cathode Material; Layered Oxide) | | | | | |
|---|---|---|---|---|---|---|---|---|
| | Peak at $2\theta = 31 \pm 1$ | IA/IB | Site Occupancy of Metal Ions Other Than Lithium at 3a Site (%) | Site Occupancy of Metal Ions Other Than Metal X Occupying Part of 3b Site at 3b Site (%) | Metal X | Volume of Regular Octahedron Structure Configured of 3b Site and Oxygen (Cubic Angstrom) | Exposed Amount (Ratio of 3b Site Metal Element by XPS/Ratio of Oxygen by XPS (%)) | Average of Half-value Widths |
| Comparative Example 4-6 | Observed Not Observed | 1.54 | 4.50 | 4.50 | Ni, Co, Al | 10.04 | 0.04 | 0.159 |
| Comparative Example 4-7 | Not Observed | 1.52 | 0.99 | 0.99 | Ni, Co, Al | 10.01 | 7.92 | 0.152 |

TABLE 4

| | Capacity of Active Material Per Mass (mAh/g) | Capacity Retention Ratio Under 1 C-Charge/ 5 C-Discharge Cycle (in 100th Cycle) (%) | Resistance Increase Rate Under 1 C-Charge/ 5 C-Discharge Cycle (in 100th Cycle) (%) |
|---|---|---|---|
| Example 1-1 | 162 | 98 | 9.9 |
| Example 1-2 | 153 | 95 | 5.1 |
| Example 1-3 | 144 | 92 | 4.8 |
| Example 1-4 | 162 | 100 | 9.9 |
| Example 1-5 | 162 | 94 | 9.7 |
| Example 1-6 | 162 | 93 | 8.9 |
| Example 1-7 | 162 | 94 | 9.9 |
| Comparative Example 1-1 | 162 | 97 | 10.1 |
| Comparative Example 1-2 | 127 | 75 | 4.1 |
| Comparative Example 1-3 | 110 | 70 | 2.0 |
| Comparative Example 1-4 | 162 | 82 | 21.9 |
| Comparative Example 1-5 | 162 | 80 | 22.3 |
| Comparative Example 1-6 | 162 | 95 | 20.1 |
| Comparative Example 1-7 | 162 | 87 | 11.4 |
| Comparative Example 1-8 | 162 | 88 | 12.0 |
| Comparative Example 1-9 | 162 | 85 | 13.1 |
| Example 1-8 | 145 | 95 | 18.9 |
| Example 1-9 | 140 | 93 | 12.3 |
| Example 1-10 | 134 | 90 | 11.0 |
| Example 1-11 | 123 | 74 | 5.1 |
| Comparative Example 1-10 | 110 | 70 | 2.0 |
| Comparative Example 1-11 | 145 | 79 | 23.5 |
| Comparative Example 1-12 | 145 | 81 | 24.0 |
| Example 2-1 | 185 | 94 | 8.5 |
| Example 2-2 | 172 | 92 | 4.1 |
| Example 2-3 | 158 | 91 | 3.9 |
| Example 2-4 | 185 | 95 | 8.9 |
| Example 2-5 | 185 | 93 | 9.8 |
| Example 2-6 | 185 | 93 | 8.8 |
| Example 2-7 | 185 | 94 | 8.8 |
| Comparative Example 2-1 | 185 | 96 | 10.2 |
| Comparative Example 2-2 | 129 | 72 | 3.5 |
| Comparative Example 2-3 | 110 | 70 | 2.0 |
| Comparative Example 2-4 | 185 | 80 | 12.3 |
| Comparative Example 2-5 | 185 | 78 | 13.9 |
| Comparative Example 2-6 | 185 | 95 | 15.2 |
| Comparative Example 2-7 | 185 | 95 | 15.2 |
| Comparative Example 2-8 | 185 | 86 | 11.3 |
| Comparative Example 2-9 | 185 | 89 | 11.9 |
| Comparative Example 2-10 | 185 | 85 | 11.0 |
| Example 3-1 | 176 | 97 | 9.5 |
| Example 3-2 | 163 | 94 | 5.0 |
| Example 3-3 | 150 | 93 | 4.7 |
| Example 3-4 | 176 | 99 | 9.8 |
| Comparative Example 3-1 | 176 | 98 | 10.1 |
| Comparative Example 3-2 | 123 | 74 | 4.0 |
| Comparative Example 3-3 | 110 | 4 | 2.1 |
| Comparative Example 3-4 | 176 | 81 | 22.0 |
| Comparative Example 3-5 | 176 | 79 | 22.2 |
| Comparative Example 3-6 | 176 | 94 | 21.0 |
| Example 4-1 | 162 | 95 | 9.9 |
| Example 4-2 | 153 | 92 | 6.2 |
| Example 4-3 | 144 | 90 | 4.9 |
| Example 4-4 | 162 | 95 | 9.9 |
| Comparative Example 4-1 | 162 | 91 | 10.5 |
| Comparative Example 4-2 | 127 | 70 | 4.5 |
| Comparative Example 4-3 | 110 | 68 | 2.1 |
| Comparative Example 4-4 | 162 | 80 | 21.3 |

TABLE 4-continued

| | Capacity of Active Material Per Mass (mAh/g) | Capacity Retention Ratio Under 1 C-Charge/ 5 C-Discharge Cycle (in 100th Cycle) (%) | Resistance Increase Rate Under 1 C-Charge/ 5 C-Discharge Cycle (in 100th Cycle) (%) |
|---|---|---|---|
| Comparative Example 4-5 | 162 | 78 | 22.3 |
| Comparative Example 4-6 | 162 | 90 | 21.1 |
| Comparative Example 4-7 | 162 | 92 | 9.9 |

The following were found from Tables 1 to 4. Since the surface of the active material was covered with a coating film in an optimum state in the examples, degradation in cycle characteristics and an increase in resistance were allowed to be suppressed. On the other hand, in the comparative examples, an initial output was fine, but the surface of the active material was not covered with the coating film in an optimum state; therefore, the surface of the active material reacted to be amorphous due to variation with time over cycles, and degradation in cycle characteristics and an increase in resistance became pronounced.

Moreover, when initial cation mixing was high, the initial output was fine; however, cation mixing further proceeded by variation with time over cycles, and the crystal structure of the active material was deformed, and the surface of the active material reacted to be amorphous. Thus, degradation in cycle characteristics and an increase in resistance became pronounced.

It is to be noted that, in the above-described examples, the occupancies and the like in a discharged state in which each of the batteries was discharged at 0.1 C until the voltage reached 2.5 V after initial charge were determined; however, it is considered that, occupancies and the like and effects of the battery even after 10 cycles or in a commercially available unused state are equal or similar to the above-described results.

8. Other Embodiments

The present application is not limited to the above-described embodiments, and may be variously modified within a range not departing from the gist of the present application.

For example, numerical values, configurations, shapes, materials, raw materials, processes, and the like described in the above-described embodiments and examples are mere examples, and different numerical values, configurations, shapes, materials, raw materials, processes, and the like may be used, if necessary.

In addition, the configurations, methods, processes, shapes, materials, numerical values, and the like in the above-described embodiments and examples may be used in combination without departing from the gist of the present application.

In the secondary battery according to any of the embodiments of the present application, it is preferable that an electrochemical equivalent of the anode material capable of inserting and extracting lithium be larger than an electrochemical equivalent of the cathode to prevent lithium metal from being deposited on the anode during charge.

In the secondary battery according to any of the embodiments of the present application, an open-circuit voltage (that is, a battery voltage) under a fully-charged state may be designed to be, for example, within a range from about 3.60 V to about 6.00 V both inclusive, preferably within a range from about 4.25 V to about 6.00 V both inclusive, and more preferably within a range from about 4.30 V to about 4.55 V both inclusive. In the case where the open-circuit voltage under a fully-charged state is about 4.25 V or over in, for example, a battery using a layered rocksalt type lithium composite oxide including Ni and Co as cathode active materials, compared to a battery with an open-circuit voltage of 4.20 V, even if the same cathode active materials are used, an extraction amount of lithium per unit mass is larger; therefore, the amount of the cathode active material and the amount of the anode active material are adjusted to obtain high energy density. It is to be noted that the battery voltage is not limited to the range of the above-described battery voltage range.

In the fourth embodiment, the first to third manufacturing methods may be applied to formation of the electrolyte 66. Moreover, an electrolytic solution which is a liquid electrolyte may be used instead of the electrolyte 66. In the nonaqueous electrolyte batteries according to the second to fourth embodiments, the cathode lead 53 and the anode lead 54 may be drawn from a same side. Moreover, in the fourth embodiment, the separator 63 is disposed in the outermost layers of the laminate electrode body 60; however, the cathode 61 or the anode 62 may be disposed in the outermost layers. Moreover, the separator 63 may be disposed in one of the outermost layers of the laminate electrode body 60, and the cathode 61 or the anode 62 may be disposed in the other outermost layer of the laminate electrode body 60.

The technology of the present application may have the following configurations.

[1] A cathode active material including a first cathode material configured of a layered rocksalt type lithium metal oxide, the layered rocksalt type lithium metal oxide including lithium and a metal other than lithium, the metal configured of nickel (Ni), or nickel (Ni) and one or more selected from a group configured of cobalt (Co), iron (Fe), manganese (Mn), copper (Cu), zinc (Zn), aluminum (Al), chromium (Cr), vanadium (V), titanium (Ti), magnesium (Mg), and zirconium (Zr), in which a site occupancy of metal ions other than lithium at a 3a site obtained by Rietveld analysis of a powder X-ray diffraction pattern of the first cathode material in a cathode in a discharged state is about 5% or less, and a site occupancy of metal ions other than the metal occupying a part of a 3b site at the 3b site is about 1% or over, and the cathode active material is covered with a coating film, and an exposed amount of the cathode active material exposed from the coating film is within a range from about 0.05% to about 8% both inclusive.

[2] The cathode active material according to [1], in which the first cathode material is a lithium metal oxide represented by an expression (1):

$$Li_vM1_wM2_xM3_yO_z \quad \text{Expression (1)}$$

where v, w, x, y, and z satisfy $0.8<v<1.2$, $w+x+y\leq 1$, $0.45\leq w\leq 1$, $0\leq x\leq 1$, $0\leq y\leq 1$, and $0<z<3$, M1 is nickel (Ni), and each of M2 and M3 is one or more kinds selected from a group configured of cobalt (Co), iron (Fe), manganese (Mn), copper (Cu), zinc (Zn), aluminum (Al), chromium (Cr), vanadium (V), titanium (Ti), magnesium (Mg), and zirconium (Zr).

[3] The cathode active material according to [1] or [2], further including a second cathode material configured of a spinel type lithium metal oxide including lithium and manganese.

[4] The cathode active material according to [3], in which the second cathode material is a lithium metal oxide represented by an expression (2):

$$Li_aM4_bMn_cO_4 \qquad \text{Expression (2)}$$

where M4 is one or more kinds selected from a group configured of aluminum (Al), cobalt (Co), nickel (Ni), magnesium (Mg), zirconium (Zr), and titanium (Ti), and a, b, and c satisfy $0.8<a<1.2$, $b+c\leq 2$, $0\leq b$, and $c\leq 2$.

[5] The cathode active material according to [3] or [4], in which $0<a$ mass ratio of the first cathode materia$\leq 40$ and $60\leq a$ mass ratio of the second cathode material$<100$ is satisfied, where a total of the mass ratio of the first cathode material and the mass ratio of the second cathode material is 100.

[6] The cathode active material according to any one of [3] to [5], in which
a crystal structure of the first cathode material is a unitary structure belonging to an R-3m space group, and
a crystal structure of the second cathode material is a unitary structure belonging to an Fd3m space group.

[7] The cathode active material according to any one of [1] to [6], in which the X-ray diffraction pattern of the first cathode material does not have a diffraction peak at a diffraction angle $2\theta$=about $31°\pm 1°$.

[8] The cathode active material according to any one of [1] to [7], in which an intensity ratio IA/IB between an intensity of a peak A at a diffraction angle $2\theta$=about $18.5°\pm 1°$ and an intensity of a peak B at a diffraction angle $2\theta$=about $44.4°\pm 1°$ in the X-ray diffraction pattern of the first cathode material is about 1.5 or over.

[9] The cathode active material according to any one of [1] to [8], in which a volume of a regular octahedron structure that is obtained by Rietveld analysis of the powder X-ray diffraction pattern of the first cathode material in the cathode in the discharged state and is configured of the 3b site occupied by the metal and oxygen is within a range from about 9 cubic angstroms to about 10.5 cubic angstroms both inclusive.

[10] The cathode active material according to any one of [1] to [9], in which an average of a half-value width of a (003) plane, a half-value width of a (101) plane, and a half-value width of a (104) plane of the first cathode material determined by the powder X-ray diffraction pattern of the first cathode material in the cathode in the discharged state is within a range from about 0.135 to about 0.155 both inclusive.

[11] A cathode provided with a cathode active material, the cathode active material including a first cathode material configured of a layered rocksalt type lithium metal oxide, the layered rocksalt type lithium metal oxide including lithium and a metal other than lithium, the metal configured of nickel (Ni), or nickel (Ni) and one or more selected from a group configured of cobalt (Co), iron (Fe), manganese (Mn), copper (Cu), zinc (Zn), aluminum (Al), chromium (Cr), vanadium (V), titanium (Ti), magnesium (Mg), and zirconium (Zr),
in which a site occupancy of metal ions other than lithium at a 3a site obtained by Rietveld analysis of a powder X-ray diffraction pattern of the first cathode material in a cathode in a discharged state is about 5% or less, and a site occupancy of metal ions other than the metal occupying a part of a 3b site at the 3b site is about 1% or over, and
the cathode active material is covered with a coating film, and an exposed amount of the cathode active material exposed from the coating film is within a range from about 0.05% to about 8% both inclusive.

[12] A battery including:
a cathode;
an anode; and an electrolyte,
in which the cathode includes a cathode active material, the cathode active material includes a first cathode material configured of a layered rocksalt type lithium metal oxide, the layered rocksalt type lithium metal oxide including lithium and a metal other than lithium, the metal configured of nickel (Ni), or nickel (Ni) and one or more selected from a group configured of cobalt (Co), iron (Fe), manganese (Mn), copper (Cu), zinc (Zn), aluminum (Al), chromium (Cr), vanadium (V), titanium (Ti), magnesium (Mg), and zirconium (Zr),
a site occupancy of metal ions other than lithium at a 3a site obtained by Rietveld analysis of a powder X-ray diffraction pattern of the first cathode material in the cathode in a discharged state is about 5% or less, and a site occupancy of metal ions other than the metal occupying a part of a 3b site at the 3b site is about 1% or over, and
the cathode active material is covered with a coating film, and an exposed amount of the cathode active material exposed from the coating film is within a range from about 0.05% to about 8% both inclusive.

[13] A battery pack including:
the battery according to [12];
a control section controlling the battery; and
a package containing the battery.

[14] An electronic apparatus provided with the battery according to [12] and receiving electric power from the battery.

[15] An electric vehicle including:
the battery according to [12];
a converter receiving electric power from the battery and then converting the electric power into driving force for vehicle; and
a controller performing information processing relating to vehicle control based on information on the battery.

[16] An electric storage apparatus provided with the battery according to [12] and supplying electric power to an electronic apparatus connected to the battery.

[17] The electric storage apparatus according to [16] further including an electric power information controller transmitting and receiving signals to and from other apparatuses through a network,
in which charge-discharge control of the battery is performed based on information received by the electric power information controller.

[18] An electric power system receiving electric power from the battery according to
[12] or supplying electric power from a generator or an electric power network to the battery.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery comprising:
a cathode;
an anode; and
an electrolyte,
wherein the cathode includes a cathode active material, the cathode active material includes a first cathode material comprising a lithium metal oxide having a layered rocksalt structure, the lithium metal oxide including lithium and a metal other than lithium, the metal comprising nickel and at least one selected from the group consisting of iron, zinc, and zirconium, a site occupancy of metal ions other than lithium at a 3a site obtained by Rietveld analysis of a powder X-ray diffraction pattern of the first cathode material in the cathode in a discharged state is about 5% or less, a site occupancy of metal ions other than the metal occupying a part of a 3b site at the 3b site is 1% or over, the cathode active material is covered with a coating film including a resolvent of an electrolyte salt and a resolvent of the electrolyte solvent, and an exposed amount of the cathode active material exposed from the coating film is within a range from about 0.05% to about 8% both inclusive.

2. A battery pack comprising:

a battery including a cathode, an anode, and an electrolyte, the cathode including a cathode active material;

a control section controlling the battery; and a package containing the battery, wherein the cathode active material includes a first cathode material comprising a lithium metal oxide having a layered rocksalt structure, the lithium metal oxide including lithium and a metal other than lithium, the metal comprising nickel and at least one selected from the group consisting of iron, zinc, and zirconium, a site occupancy of metal ions other than lithium at a 3a site obtained by Rietveld analysis of a powder X-ray diffraction pattern of the first cathode material in the cathode in a discharged state is about 5% or less, a site occupancy of metal ions other than the metal occupying a part of a 3b site at the 3b site is 1% or over, the cathode active material is covered with a coating film including a resolvent of an electrolyte salt and a resolvent of an electrolyte solvent, and an exposed amount of the cathode active material exposed from the coating film is within a range from about 0.05% to about 8% both inclusive.

3. An electronic apparatus comprising:

a battery, the electronic apparatus receiving electric power from the battery, the battery including a cathode, an anode, and an electrolyte, and the cathode including a cathode active material, wherein the cathode active material includes a first cathode material comprising a lithium metal oxide having a layered rocksalt structure, the lithium metal oxide including lithium and a metal other than lithium, the metal comprising nickel and at least one selected from the group consisting of iron, zinc, and zirconium, a site occupancy of metal ions other than lithium at a 3a site obtained by Rietveld analysis of a powder X-ray diffraction pattern of the first cathode material in the cathode in a discharged state is about 5% or less, a site occupancy of metal ions other than the metal occupying a part of a 3b site at the 3b site is 1% or over, the cathode active material is covered with a coating film including a resolvent of an electrolyte salt and a resolvent of an electrolyte solvent, and an exposed amount of the cathode active material exposed from the coating film is within a range from about 0.05% to about 8% both inclusive.

4. An electric vehicle comprising:

a battery including a cathode, an anode, and an electrolyte, the cathode including a cathode active material;

a converter receiving electric power from the battery and then converting the electric power into driving force for vehicle; and a controller performing information processing relating to vehicle control based on information on the battery, wherein the cathode active material includes a first cathode material comprising a lithium metal oxide having a layered rocksalt structure, the lithium metal oxide including lithium and a metal other than lithium, the metal comprising nickel and at least one selected from the group consisting of iron, zinc, and zirconium, a site occupancy of metal ions other than lithium at a 3a site obtained by Rietveld analysis of a powder X-ray diffraction pattern of the first cathode material in the cathode in a discharged state is about 5% or less, a site occupancy of metal ions other than the metal occupying a part of a 3b site at the 3b site is 1% or over, the cathode active material is covered with a coating film including a resolvent of an electrolyte salt and a resolvent of an electrolyte solvent, and an exposed amount of the cathode active material exposed from the coating film is within a range from about 0.05% to about 8% both inclusive.

5. An electric storage apparatus comprising:

a battery, the electric storage apparatus supplying electric power to an electronic apparatus connected to the battery, the battery including a cathode, an anode, and an electrolyte, the cathode including a cathode active material, wherein the cathode active material includes a first cathode material comprising a lithium metal oxide having a layered rocksalt structure, the lithium metal oxide including lithium and a metal other than lithium, the metal comprising nickel and at least one selected from the group consisting of iron, zinc, and zirconium, a site occupancy of metal ions other than lithium at a 3a site obtained by Rietveld analysis of a powder X-ray diffraction pattern of the first cathode material in the cathode in a discharged state is about 5% or less, a site occupancy of metal ions other than the metal occupying a part of a 3b site at the 3b site is 1% or over, the cathode active material is covered with a coating film including a resolvent of an electrolyte salt and a resolvent of an electrolyte solvent, and an exposed amount of the cathode active material exposed from the coating film is within a range from about 0.05% to about 8% both inclusive.

6. The electric storage apparatus according to claim 5, further comprising an electric power information controller transmitting and receiving signals to and from other apparatuses through a network, wherein charge-discharge control of the battery is performed by the electric power information controller based on information received by the electric power information controller.

7. An electric power system configured to receive electric power from a battery or supplying electric power from a generator or an electric power network to the battery, the battery including a cathode, an anode, and an electrolyte, the cathode including a cathode active material, the cathode active material comprising a first cathode material comprising a lithium metal oxide having a layered rocksalt structure, the lithium metal oxide including lithium and a metal other than lithium, the metal comprising nickel and at least one selected from the group consisting of iron, zinc, and zirconium, wherein a site occupancy of metal ions other than lithium at a 3a site obtained by Rietveld analysis of a powder X-ray diffraction pattern of the first cathode material in the cathode in a discharged state is about 5% or less, a site occupancy of metal ions other than the metal occupying a part of a 3b site at the 3b site is 1% or over, the cathode active material is covered with a coating film including a resolvent of an electrolyte salt and a resolvent of an electrolyte solvent, and an exposed amount of the cathode active material exposed from the coating film is within a range from about 0.05% to about 8% both inclusive.

8. The cathode according to claim 1, wherein the exposed amount of cathode active material is determined based on X-ray photoelectron spectroscopy on the cathode.

9. The cathode active material according to claim 1, wherein a mole ratio of lithium to the metal in the lithium metal oxide ranges from about 1.0 to about 1.15.

10. The cathode active material according to claim 1, wherein the metal comprises zirconium.

* * * * *